(12) United States Patent
Braunstein

(10) Patent No.: US 7,844,416 B2
(45) Date of Patent: Nov. 30, 2010

(54) INTELLIGENT MODULAR TRANSPORT SYSTEM WITH OBJECT BEHAVIORAL PATTERN RECOGNITION AND TRAFFIC MANAGEMENT

(76) Inventor: Zachary Leonid Braunstein, 1422 Oaks Ct., San Marcos, CA (US) 92069

( * ) Notice: Subject to any disclaimer, the term of this patent is extended or adjusted under 35 U.S.C. 154(b) by 329 days.

(21) Appl. No.: 12/016,206

(22) Filed: Jan. 18, 2008

(65) Prior Publication Data

US 2008/0221828 A1  Sep. 11, 2008

Related U.S. Application Data

(60) Provisional application No. 60/905,378, filed on Mar. 7, 2007.

(51) Int. Cl.
*G01B 21/12* (2006.01)
(52) U.S. Cl. .................... 702/155; 340/506; 702/150
(58) Field of Classification Search .............. 702/57, 702/150, 155, 173; 340/506, 521; 348/143; 455/66.1; 701/117
See application file for complete search history.

(56) References Cited

U.S. PATENT DOCUMENTS 6,246,320 B1 * 6/2001 Monroe ................. 340/506

\* cited by examiner

*Primary Examiner*—John H Le

(57) ABSTRACT

Invention describes apparatus as closed-loop intelligent Object Transport System with Object Behavioral Pattern analysis and recognition for applications, including automatic self-check-out lanes at grocery, retail stores. Invention calculates Objects Behavioral Patterns, Object Expected Behavioral Pattern ranges for each Object or Group of Objects and stores information at central data base. Invention, based on Object barcode, obtains from central data base Expected Object Behavioral Pattern and compares to calculated real-time Objects Behavioral Pattern, and based on preset acceptance criteria, the System automatically without intervention by operator, executes real-time process controls to regulate traffic of Objects. Example of acceptance criteria: protection of fragile Objects from colliding with heavy Objects and rejection of Object outside the range of Object Expected Behavioral Patterns. Invention performs real-time Object traffic management, regulating acceleration, deceleration, speed and direction of motion of Objects. Invention performs process control over Objects, including application of heat.

13 Claims, 42 Drawing Sheets

Figure 1:
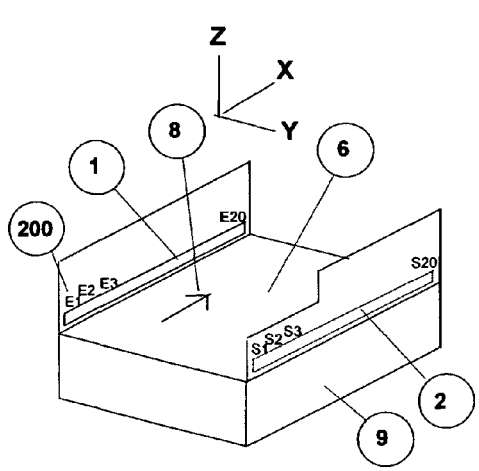

INTELLIGENT MODULAR TRANSPORT SYSTEM WITH OBJECT BEHAVIORAL PATTERN RECOGNITION AND TRAFFIC MANAGEMENT

CROSS-REFERENCE TO RELATED APPLICATIONS

I claim the benefits of Provisional Application No. 60/905,378 filed on Mar. 7, 2007, title "Intelligent self-tuning modular conveyor system".

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

There are number of applications, which do not require high intensity or high accuracy of Object detection as hi-cost "security" Systems offer, but rather require an Object detection System which would serve as "deterrent" System or device aimed at improving business performance. An example—Object detection System installed for automatic check out lines in super-markets and other stores. In these types of applications the automatic check out line could, in addition to typical devices such as: ATM, barcode scanners, etc., include: conveyor System, which among other Objectives, could increase throughput of Processing Objects at a given check-out line. Addition of conveyor(s) complicates the task of Object detection and monitoring, as well as makes it more challenging to protect purchased Objects integrity, while also detecting un-Expected Objects, including Objects which were possibly not paid for.

Existing Systems, although most equipped with sufficient computing powers, have insufficient information about the Process, and as result, are inefficient in terms of providing Customers with most safe, reliable and timely services. The existing Systems security depends on static measurements of Objects parameters, such as weight, size.

This application covers an "Intelligent Modular Transport System with Object Behavioral Recognition and Process Control", which could be defined as a stand-alone System, which could consist of a number of intelligent devices, which could be grouped together and controlled as a closed-loop System in a such a matter, that: could direct the flow and proper initial positioning of Objects; advance an Object or Objects placed on top of it's Track, or advance Objects along a Track by other means, such as Objects being suspended from a trolley, etc.; and could identify Object Behavioral Parameters such as: weight, physical shape, etc.; and could monitor and control position of Objects placed on the Track. The System could use obtained Object Behavioral Parameters after each Object Transaction in a such matter as to: record, store and analyze the Object Behavioral patterns in a centralized data base under an Object Identification number or code, which could be attached to an Object via barcode label; and the System could use the stored Behavioral Pattern to properly identify a respective Object next time it is introduced into the System, based on the Objects Identification, such as its barcode information; record, store and analyze in a centralized data base System's own performance in terms of selected or set criteria, and could compare the stored data to real-time performance data, and make self-calibration adjustments, as needed, in order to sustain required performance repeatability, including Objects related measurements, etc.; and could optimize Object Acceptance criteria, with objectives, which could include achieving most reliable and efficient Object Detection while performing transportation of Objects along it's Track with most attainable throughput, and maintaining Object safety throughout the entire Process.

The IMTS System Controller could communicate with a Host computer, and communications interface could be implemented to comply with PC industry term of "plug-and-play devices", as needed.

In this application, I will demonstrate the advantages of the IMTS over existing Systems, which include such features:

a) Object Behavioral analysis during Transactions to establish Pattern of Object's Behavior b) Dynamic Object Behavioral Recognition, to ensure Objects are Processed properly c) Dynamic Object Traffic Management, to ensure Objects safety and prompt Processing d) Dynamic System Control to achieve maximum efficiency in completing Transactions e) Networked remote Systems data sharing for most optimum operation of any System f) System real-time self-diagnostics, and self-calibration, as needed

BRIEF SUMMARY OF THE INVENTION

In summary, the IMTS key features:

a) Intelligent, in addition to sufficient computing power, the System could have unique abilities via respective Sensors, such as OFTS, which could strategically placed along the Transport track, and could be used by Controller to: initially establish the Expected Behavioral parameters for each Object upon its entry; and then promptly detect and recognize Objects based on their Dynamic Behavioral parameters throughout a Transaction; and then in a timely matter make required decision, which could include: accepting detected Object; issuing a warning; rejecting detected Object, as a Violation, etc. The System could also execute real-time Traffic Management of Objects placed inside of it, to ensure their safe and prompt delivery to specified destination.

b) Self-tuning, underlines the ability of the System to study the Objects during Transactions, including storing Objects Dynamic Behavioral parameters in a local or centralized Data Base, and then based on respective real-time Object Behavioral Data during a Transaction and based on defined Acceptance Criteria, the System could improve its efficiency of properly identifying Objects in a timely matter as they appear again. System could also monitor via dedicated Calibration Objects its own Sensors repeatability, and make required self-adjustments of selected parameters, such as: Conveyors belt tension, Scale weight measurements offset, OFTS Beam intensity, etc. as needed.

c) Modular, which allows most efficient and effective implementations for each specific application, including System's manufacturability, transportation, installation, maintenance to achieve best results.

d) Control, availability of OFTS and other Sensors, ensures that the System Controller and/or Host Controller are informed about status of respective System devices, as well as of the Objects introduced into it, and has sufficient computing power locally and/or remotely to make proper timely decisions to achieve required objectives.

e) System, underlines inner-connectivity and communication between Controller, Controllers and various intelligent devices, Sensors, etc. to allow execution of the most efficient Algorithm to achieve required objectives.

f) Network, underlines ability to interconnect Systems into a closed-loop Network, with each System having ability to share: its performance data; Object detection data and results; etc., as well as to use available data from other Systems and Network Controller to improve its own performance

BRIEF DESCRIPTION

Drawing Content and Listing

My application contains drawings listed in Table 1, below.

TABLE 1

List of Drawings.

| FIG. | Description |
| --- | --- |
| 1 | Entry Module |
| 2 | Transfer Module |
| 3 | Exit Module |
| 4 | Side transport conveyor Module |
| 5 | OFTS Dual-rows Emitter/Sensor PC-boards |
| 6 | OFTS Low-profile Object Detection Emitter and Sensor PC-boards |
| 7 | OFTS Single-row Emitter/Sensor PC-boards |
| 8 | OFTS Selected-rows Emitter/Sensor PC-boards |
| 9 | Process Module |
| 10 | Scale Sensor |
| 11 | Entry Module with Scale Sensor |
| 12 | Process Component |
| 13 | Object Transaction System with OFTS |
| 14 | Object Transaction System with OFTS and Side-conveyor |
| 15 | Object Transaction System with OFTS and Entry Module Scale |
| 16 | Object Processing System with OFTS |
| 17 | OFTS Straight-scanning, Step 1 |
| 18 | OFTS Straight-scanning, Step 2 |
| 19 | OFTS Straight-scanning, Step 3 |
| 20 | OFTS Interlacing-scanning, Step 1 |
| 21 | OFTS Interlacing-scanning, Step 2 |
| 22 | OFTS Interlacing-scanning, Step 3 |
| 23 | OFTS Status - no Object |
| 24 | OFTS Status - Object approaching Top of Entry Transport Conveyor, Case 1 |
| 25 | OFTS Status - Object approaching Top of Entry Transport Conveyor, Case 2 |
| 26 | OFTS Status - Object approaching Top of Entry Transport Conveyor, Case 3 |
| 27 | OFTS Status - Object on Top of Entry Transport Conveyor, Case 1 |
| 28 | OFTS Status - Object on Top of Entry Transport Conveyor, Case 2 |
| 29 | OFTS Tracking One Object |
| 30 | OFTS Tracking Two Objects |
| 31 | OFTS Tracking Two Objects, Time T17 and T18 |
| 32 | OFTS Tracking One Rolling Object |
| 33 | OFTS Violation Detection - Entry Module |
| 34 | OFTS Violation Detection - Transfer Module |
| 35 | OFTS Tracking Prior to Violation, Time T1-T16 |
| 36 | OFTS Violation Detection between Objects, Time T17-T18 |
| 37 | Object Behavioral Detection |
| 38 | Falling Object Behavioral Detection |
| 39 | Low-profile Object Behavioral Detection |
| 40 | System Status, Time T1 |
| 41 | System Status, Time T2 |
| 42 | System Status, Time T3 |
| 43 | System Status, Time T4 |
| 44 | System Status, Time T5 |

TABLE 1-continued

List of Drawings.

| FIG. | Description |
| --- | --- |
| 45 | System Status, Time T6 |
| 46 | OFTS Status, Time T1 |
| 47 | OFTS Status, Time T2 |
| 48 | OFTS Status, Time T3 |
| 49 | OFTS Status, Time T4 |
| 50 | OFTS Status, Time T5 |
| 51 | Existing System Layout |
| 52 | Object Static Weight Measurements |
| 53 | Object Static and Dynamic Weight Measurements |
| 54 | IMTS with Entry Module, Transfer Module and Exit Module |
| 55 | OFTS Detection of an Object at the Entry Module |
| 56 | Controller Entry Module OFTS Sampling |
| 57 | Controller Entry Module Scale Sampling |
| 58 | Example of Object shapes |
| 59 | IMTS Detected Object Data Processing, Time Interval T1 |
| 60 | IMTS Detected Object Data Processing, Time Interval T4 |
| 61 | IMTS Detected Object Data Processing, Time Interval T5 |
| 62 | Object Behavioral Pattern Recording, Processes 20000 |
| 63 | Object Behavioral Pattern Recording, Processes 21000 |
| 64 | Object Behavioral Pattern Recording, Processes 22000 |
| 65 | Transaction with Object Behavioral Pattern Recognition, Processes 10000 |
| 66 | Transaction with Object Behavioral Pattern Recognition, Processes 10200 |
| 67 | Transaction with Object Behavioral Pattern Recognition, Processes 30000 |
| 68 | Transaction with Object Behavioral Pattern Recognition, Processes 31000 |
| 69 | Object Processing, Processes 40000 |
| 70 | Object Processing, Processes 41000 |
| 71 | Object Weight Measurement |
| 72 | Weight Sensors Interconnection Diagram |
| 73 | Scale Calibration Flow-chart, Processes 50000 |

Drawing Convention and Format

Drawings with this application, in addition to USPTO requirements, are:

a) Not to scale.

b) Referenced to "X-Y-Z" coordinate System, which is consistent throughout all Drawings.

DEFINITIONS

My application contains definitions of specific components or Processes, which are scripted in "bold italic", and which are listed below. Definitions are used and expanded in greater details in later paragraphs, as needed.

Acceptance Algorithm

Could be defined as an Algorithm, which could be preset for Controller in its non-volatile memory or could be downloaded via LAN to Controller from a Computer in real-time or as needed, and which could be used by Controller to either accept or reject Object(s). For Object Transactions, the Acceptance Algorithm could be based on comparison of:

1) Object(s) Expected Behavioral Data, which could be preloaded into Controller non-volatile memory or could be downloaded via LAN to Controller from a Computer in real-time or as needed, based on Object's identification via barcode label, and 2) Obtained Object(s) real-time Actual or Transaction Behavioral Data by Controller during the Object(s) real-time Transaction.

In real terms, for any given Object, its real-time Transaction Behavioral Data may not be exactly the same as the Expected Behavioral Data, obtained from previous Transactions. In practical terms, Acceptance Algorithm or Criteria could be based on acceptable deviations of Transaction vs. Expected based on which, Object(s) real-time Behavioral Data could be either accepted or rejected. Acceptance Algorithm, in general, or for any given Object, could be pre-defined or established empirically. Acceptance Algorithm could evaluate a number of Object-specific Profiles, which could include: Static Profiles, Dynamic Profiles, Section Profiles, Transition Profiles, etc. An Object acceptance decision by the Algorithm, could be based on acceptable deviations of each of the Object Profiles obtained during a Transaction compared to the respective Object Expected Profiles. An Object rejection decision by the Algorithm, could be based on unacceptable deviation of one of the Object Profiles obtained during a Transaction compared to the respective Object Expected Profiles, which could result in invoking respective Object Rejection Process.

EXAMPLE

Transaction of an Object (600). Once the Object (600) was scanned-in and Transaction started, the respective Expected Behavioral Parameters (Table 1) and Expected Behavioral Range (Table 2) could be downloaded to Controller via LAN. Obtained Object's (600) Classification Parameters could be considered by Controller in terms of executing proper Traffic Management Algorithm, with an Objective to retain Objects (600) qualities and value throughout the entire Transaction. As Object (600) enters the Systems Entry Module and then throughout the entire Transaction, Controller could obtain real-time Object's Actual Behavioral Data, Process them and analyze them, and then compare them to respective Expected Behavioral Parameters. If calculated Actual Parameters fall within respective Expected Range, Controller could accept or validate Object (600). If any of Actual Parameters fall out of the Expected Range, Controller, depending on severity of the Violation, could either: a) Stop Transaction and execute Object Rejection Procedure; b) Suspend Transaction and execute Object Violation Warning Procedure; c) Continue Transaction, reflecting the Violation in the Transaction Report.

In general, the Acceptance Algorithm could be implemented by:
a) Comparing of an Object respective samples of Expected Raw Data of Dimensional Profile and "W-profile" records vs. real-time respective samples of the same Object in Transaction, and then decision made to either Accept or Reject an Object based on respective Proximity Analysis.
b) Comparing respective calculated Expected Behavioral Parameters vs. real-time accumulated Actual Behavioral Parameters of an Object in Transaction, and then decision made to either Accept or Reject an Object based on respective Proximity Analysis.
c) By utilization of both—Raw Data per-sample comparison (a) and cumulative Behavioral Parameters comparison (b), described above, and then decision made to either Accept or Reject an Object based on respective Proximity Analysis. Acceptance Algorithm could be also implemented by utilization of only either Dimensional Profile Data comparison, or "W-profile" Data comparison. Controller could select the most appropriate Acceptance Algorithm based on Object's "Complexity Rating". For Objects with unstable Dimensional Profile, the Acceptance Algorithm could be based on sole verification of Objects Initial "W-profile"

For Processes, the Acceptance Algorithm could be based on:
1) Specific Group Profiles of Objects, which could be preloaded into Controller non-volatile memory or could be downloaded via LAN to Controller from a Computer in real-time or as needed, and
2) Obtained Object(s) real-time Actual or Process Behavioral Data by Controller during the Object(s) real-time Process.

In real terms, for any given Object, its real-time Process Behavioral Data may not be exactly the same as the Expected Group or Object Behavioral Data, obtained from previous Processes. In practical terms, Acceptance Algorithm or Criteria could be based on acceptable deviations of Process vs. Expected based on which, Object(s) real-time Behavioral Data could be either accepted or rejected. Acceptance Algorithm, in general, or for any given Object, could be pre-defined or established empirically. Acceptance Algorithm could evaluate a number of Object-specific Profiles, which could include: Static Profiles, Dynamic Profiles, Section Profiles, Transition Profiles, etc. An Object acceptance decision by the Algorithm, could be based on acceptable deviations of each of the Object Profiles obtained during a Transaction compared to the respective Object Expected Profiles. Once an Object is Accepted, then Controller could execute respective Process Controls at various positions of an Object within the Transport System, otherwise the Object is Rejected and no Process Control is executed.

Activity

Could be defined as a condition when Controller has detected that: at least one of the discrete Sensor Components is Blocked, and/or Weight Sensor or Sensors indicated a change in weight Beam Number For simplicity, all Beams or Streams within OFTS could be numbered in-sequence along the Tracks of the Transport System, from starting point of an Entry Module to the very last Beam of an Exit Module. In a multi-row configuration, respective rows of Beams could be alphabetically labeled. When an Object has entered or placed into the Transport System, which could be a part of: a Transaction-based, or Process-based, or combination of both—each Object's location could be referenced along the Tracks by the largest number of a Beam the Objects has interrupted, or broken.

Behavioral Analysis

Could be defined as a Process of analyzing of stored Behavioral Data with an objectives to establish typical or Expected Behavioral Parameters for an Object, which could include:
a) Minimum and maximum number of Beam Broken at the time the Object was entering the Entry Module
b) Minimum and maximum number of Gaps at the time the Object was entering the Entry Module
c) Minimum and maximum size of each Gap at the time the Object was entering the Entry Module
d) Minimum and maximum number of Beam Broken while the Object present at the Entry Module
e) Minimum and maximum number of Beam Broken while the Object present at the Transfer f) Minimum and maximum number of Beam Broken while the Object present at the Exit Module
g) Minimum and maximum number of Gaps while the Object present at the Entry Module
h) Minimum and maximum number of Gaps while the Object present at the Transfer Module
i) Minimum and maximum number of Gaps while the Object present at the Exit Module
j) Minimum and maximum size of each Gap while the Object present at the Entry Module
k) Minimum and maximum size of each Gap while the Object present at the Transfer Module
l) Minimum and maximum size of each Gap while the Object present at the Exit Module
m) Minimum, maximum and average "W-profile" obtained via Scale of the Entry Module while the Object remained on top of Entry Module Conveyor Behavioral Parameters Could be defined as an Object related Behavioral Data, which could include Object's "Weight-profile", "Dimensional Profiles", etc., and which could be used by Controller to effectively recognize an Object by IMTS during its Transaction, within pre-defined accuracy goals. For simplicity, in majority of illustrations and descriptions, only Object "W-profile" and "X-profile" are used. Each Objects individual Behavioral Parameter, such as "Initial W-profile", "Initial X-profile", "Dynamic W-profile", "Dynamic X-profile", etc. could be stored individually as raw Data, and could be then analyzed or Quantified, to provide more compressed discrete number of parameters, which could be used to distinguish Objects. Quantified "Dynamic X-profile" could have—Max number of Beams Broken, Min number of Beams Broken, Max number of Gaps, Min number of Gaps, Max size of a Gap, Min size of a Gap, Size of each Gap, etc. Behavioral Parameters of an Object such as "X-profile" and "W-profile" for any given Transaction could depend on the System itself, which is executing the Transaction. To eliminate that dependency, the Behavioral Parameters could be normalized or converted to respective common measurable units of Object's "X-profile" and "W-profile". To convert a System specific Behavioral Parameter, such as "X-profile", the respective number of Blocked Beams for each Module should be multiplied by the resolution of the OFTS for that Module. Example: Max "X-profile" of 3 Beams for OFTS of the Entry Module with resolution of 0.5" would produce: 3 times 5"=1.5" of normalized Max "X-profile". For simplicity, unless specifically stated, Object's Behavioral Parameters described in this application, should be considered as normalized, and hence—applicable for any System.

Example of an Object (600) Behavioral Parameters, which could be represented via Table below:

TABLE 1

| Object (600) Behavioral Parameters | | |
|---|---|---|
| Parameter | Units | Value |
| Complexity Rating | u | 1 |
| Fragile Rating | % | 0 |
| Liquid Rating | % | 60 |
| Initial "X-profile" max | Inch | 1.5 |
| Initial "X-profile" min | Inch | .5 |
| Initial "X-profile" typical | Inch | 1.5 |
| Initial "X-profile" settle time min | ms | 30 |
| Initial "X-profile" settle time max | ms | 40 |
| Initial "X-profile" settle time typical | ms | 35 |
| Number of Initial Gaps min | u | 0 |

TABLE 1-continued

| Object (600) Behavioral Parameters | | |
|---|---|---|
| Parameter | Units | Value |
| Number of Initial Gaps max | u | 0 |
| Number of Initial Gaps typical | u | 0 |
| Initial "W-profile" min | Lb | .4 |
| Initial "W-profile" max | Lb | .6 |
| Initial "W-profile" typical | Lb | .5 |
| Initial "W-profile" settle time min | ms | 70 |
| Initial "W-profile" settle time max | ms | 85 |
| Initial "W-profile" settle time typical | ms | 75 |
| Dynamic "X-profile" max | Inch | 1.6 |
| Dynamic "X-profile" min | Inch | 1.4 |
| Dynamic "X-profile" typical | Inch | 1.5 |

For Objects with Gaps, more Behavioral Data could be added, describing their min/max/typical number, and min/max/typical size for each Gap. To make sure the normalized Behavioral Parameters are accurate, the System which is used for establishing the Expected Behavioral Parameters should have the same or higher resolution of its Scale and OFTS vs. the System being used for regular Transactions. During a Transaction, the Controller could compare the Actual Behavioral Data values to Expected Behavioral Data values, and based on Acceptance Algorithm, make proper decision whether to accept or reject the Object Behavioral Gap Could be defined as a Gap, which is used to describe an Dimensional Profile of an Object, and as such, could be considered as one of Objects Behavioral Parameters.

Behavioral Range

Could be defined as a Range of each of individual Expected Behavioral Data values for an Object. Behavioral Range for an Objects specific Behavioral Parameter could be measured as variance between the Parameters maximum and minimum values. The larger the Behavioral Range of an Object, the more challenging to properly recognize the Object during a Transaction. Example of an Object (600) Behavioral Range, which could be represented via Table below:

TABLE 2

| Object (600) Behavioral Range | | | |
|---|---|---|---|
| Parameter | Units | Min | Max |
| Initial "X-profile" max | Inch | 1.2 | 1.6 |
| Initial "X-profile" min | Inch | .4 | .6 |
| Initial "X-profile" typical | Inch | 1.4 | 1.6 |
| Initial "X-profile" settle time min | ms | 25 | 35 |
| Initial "X-profile" settle time max | ms | 35 | 45 |
| Initial "X-profile" settle time typical | ms | 30 | 40 |
| Number of Initial Gaps min | u | 0 | 0 |
| Number of Initial Gaps max | u | 0 | 0 |
| Number of Initial Gaps typical | u | 0 | 0 |
| Initial "W-profile" min | Lb | .3 | .5 |
| Initial "W-profile" max | Lb | .5 | .7 |
| Initial "W-profile" typical | Lb | .5 | .6 |
| Initial "W-profile" settle time min | ms | 60 | 80 |
| Initial "W-profile" settle time max | ms | 80 | 90 |
| Initial "W-profile" settle time typical | ms | 70 | 80 |
| Dynamic "X-profile" max | Inch | 1.4 | 1.6 |
| Dynamic "X-profile" min | Inch | 1.3 | 1.5 |
| Dynamic "X-profile" typical | Inch | 1.4 | 1.5 |

As for any Object, the Object (600) Expected Behavioral Parameters (Table 1) and Expected Behavioral Range (Table 2) could be represented in an efficient computerized format, with an Objective to optimize respective Data storage and Processing time.

Behavioral Recording

Could be defined as a Process of a System obtaining Objects Behavioral Data based on the Object Transactions through the System. During each Transaction, Controller via respective Sensors, such as Scale, OFTS, etc.—could Record respective Object Transaction related Data, which could include: Time-based sampling and storage of an Object's "D-profile" and/or "W-profile" real-time Behavioral Data during a Transaction; and/or Event base sampling, which could be based on Leading Edge Trigger base sampling, and then storage of an Object's "D-profile" and/or "W-profile" real-time Behavioral Data during a Transaction. Depending on the amount of Recorded Behavioral Data, Controller could store them in "chunks", and upload to remote Host Computer, as needed. For better accuracy, and with an Objective to provide universal normalized Object Behavioral Parameters, the System, used for Object's Behavioral Recording, should have the same or better resolution of its Sensors vs. the Systems intended to be used for regular Transactions.

Blocked Sensor

Could be defined as a status of a discrete Sensor Component of OFTS, which could occur when the Stream or Streams coming out of respective discrete Emitter Components are interrupted by an Object placed in-between respective Emitter or Emitters and Sensor.

Calibration Object

Could be defined as an Object, which could have repeatable Behavioral Pattern or Data. Calibration Object(s) could be selected from available Objects, or made to represent a specific shape, which could be required during Calibration Process Calibration Process Could be defined as a Process of verification and adjusting a System with an Objective to produce Expected Behavioral Data when respective Calibration Object are Transacted through the System.

Classification Parameters

Could be defined as an Object's Parameters, which could assist the System in proper Identification of the Object during a Transaction or a Process. Classification Parameters could include: "Complexity Rating", "Fragile Rating", "Liquid Rating", "Low-profile", etc. "Complexity Rating" could allow Controller to select the most optimum Object Acceptance Algorithm to achieve required criteria. "Fragile Rating" could allow Controller to select most optimum Traffic Management Algorithm during Object Transaction to sustain Object quality and value throughout the entire Transaction. "Liquid Rating" could allow Controller to select the most optimum Initial Object Acceptance Algorithm to achieve desired results within the shortest time. Classification Parameters, together with Object's "D-profiles" and "W-profiles", could be embedded into Object Identification Code, and/or could be stored and obtained from a centralized data base based on Object Identification Code, and could serve as foundation for establishing Objects Behavioral Parameters.

Combo Scanning

Could be defined as Sequence or logic, which could be executed by Controller, and which could include combination of Straight Scanning and scanning of adjacent Sensors, located at an angle from respective Emitters that were turned on. This technique could be used to increase or enhance resolution of an OFTS, as needed, for a given physical layout.

Consistent Profile

Could be defined as a Profile, such as Dimensional and/or Weight of an Object, which could be relatively stable every time the Object is Processed by an IMTS Controller Could be defined as an embedded device or PC, which could be assigned to control the IMTS, Including its Modules, Sensors, user interface, etc. it's respective Modules.

Coordinate System

Could be defined as a traditional three-dimensional X-Y-Z coordinate System. Throughout this application, for simplicity, the OFTS orientation is consistent. Emitter device is positioned with it's Emitting Components in-line with "X-axis". Sensor device is positioned across the Emitter device with it's Sensing Components in-line with "X-axis". The direction of parallel Streams from the Emitter to the Sensor is in-line with "Y-axis". The direction of an Object moving through the OFTS Sensing Area is along the "X-axis". Multiple location of rows of respective Emitters and Sensors is along "Z-axis"

Detectable Objects

Could be defined as physical Objects, which when placed or moved through the OFTS Sensing Area, could sufficiently block at least one Beam, which could be Detected by a Sensor. For simplicity, Objects considered in this application, contain at least one section which could be Detectable by respective Sensors Diagnostics Devices Could be defined as devices, such as solid-state LED's, which could be located along the entire Track or designated sections of a Track of an IMTS, and which could be used by Controller to visually display the status of the IMTS related to conditions along the Track, which could include: direction of motion along the Track; speed of motion of the Track; speed of motion of an Object along the Track; status of detection device along the Track, including whether a detection device is interfered with by an unexpected obstruction, or requires maintenance, etc.; status of Traffic of Objects along the Track, signaling the areas of concern for possible jams, or collisions; scanning sequence at reduced set ratio of OFTS devices; and other useful applications.

Data Networking

Could be defined as a Process of sharing Object Behavioral Data obtained by IMTS which could be located at different locations, of Transactions conducted on the designated Objects, or Group of Objects, with Objectives to achieve most optimum Object Transaction or Processing, which could include situations when Transactions conducted at previously installed IMTS could be helpful in effective installations of IMTS at the newer locations . . . .

Dimensional Profile

Could be defined as a combination of "X-profile" and "Z-profile" for an Object, which could be obtained by Controller during Transactions of the Object. For simplicity, Dimensional Profile of an Object could be referenced as a "D-profile"

Dynamic Profile

Could be defined as an Object Profile, which could be obtained when: a respective section of the Track of a Transport System where an Object is residing, is moving; or an Object is in-Process of being handled by an User; or an Object is in-Process of stabilizing its energy after being placed into a stationary section of the Transport System by an User . . . .

Distance

Could be defined as distance along "X-axis", which could be measured in terms of a number of consecutive Sensors, which are not Blocked, in-between: adjacent Objects, an Objects and a reference location of the Track, etc.

End-Recording Procedure

This Procedure could be defined as actions, which could be invoked or executed by Controller when a specific Object in-Process of being evaluated by the System in terms of its Behavioral Parameters, have reached the end point of the Track, or a sufficient number of samples were collected by Controller. This Procedure could include: evaluation of just recorded Behavioral Data; calculation of Behavioral Parameters (minimum, maximum, typical, etc.); update of the specific Object's Data Base, adjusting global Behavioral Parameters based on the last recorded session or Transaction. The Behavioral Data and/or Parameters of an Object could be stored in a centralized Data Base under Object's barcode information, and then updated or retrieved by the System, as needed.

Entry Profile

Could be defined as Objects Profile at the point of being introduced into Entry Module of an IMTS, and which could include Objects Behavioral Parameters, which could refer to a number of "D-profile" readings or samples from the point an Object is initially detected by OFTS. The number of samples could depend on sampling frequency by Controller of the OFTS. The Entry Profile could vary, depending on orientation of Object being placed on top of the Entry Module Conveyor. To ensure this parameter could be used by Controller in correct identification of an Object, proper Entry or Placement Instructions could be presented to Customer as soon as an Object's barcode is scanned in.

Entry Procedure

Entry Procedure could be defined as actions, which could be invoked by Controller when an Object is scanned in by a Customer, and could include: directions (via messages text/ video; illuminated shapes of Objects, etc.) on how to place just scanned Object on top of the Entry Module, so that the Transaction could proceed safely and efficiently.

Emitter

Could be defined as one of devices of the OFTS, which could emit via discrete emitting components Visible or not Visible to human eye Stream of electromagnetic waves, which could be Detected by the Sensor Component(s) of the OFTS. Each emitted Stream or Beam, as needed, could be: focused toward the respective Sensor Component by utilization of optical focusing lenses; and/or attenuated by optical components Event-Driven Logic Could be defined as logical procedures, which could be invoked by Controller when a specific Event, or Events have been detected. Example of Events: Object Detected or not; Object reached a specific location within the Transport System or not; Object moving or not; Object moving at designated speed or not; Process reached designated parameters or not; etc.

Occurrence of an Event could be established by Controller
a) By monitoring and analyzing data available from connected Sensors, such as OFTS, Scale, etc.
b) Information obtained from other Controller, or computer via LAN, etc Expected Activity Activity, which is defined for the Controller as the one Expected through the various IMTS modules. Definition could depend on application. Definition of Expected Activity could be set or could be adjusted in real-time, and could take advantage of Algorithm's ability of real-time tuning. Below are examples of Expected Activity for an application of transportation of grocery Objects through IMTS modules.
Example 1. Expected Activity—One Object of proper "Weight profile" and "X profile".
Example 2. Expected Activity—One Object of proper "X profile".

Expected Object

Expected Object could be the Expected Activity or one of possible Expected Activities. Expected Object is the next Expected to be handled by IMTS modules. This information could be established outside IMTS by other detection or control devices such as: barcode reader, etc. This information could be submitted to Controller prior to respective Object entering the Sensing Area of the IMTS modules. Expected Object specific Parameters and/or Object Recorded Data could be obtained by Controller from either local memory, or remote device, such as PC, and then could be used by Controller for executing Object-specific detection.

Final Acceptance

Could be defined as Object Acceptance, which could be implemented based on Object's "Weight Profile" and "D-profile" being within range of Expected Activity throughout the entire completed Transaction. Object's, which could be Partially Accepted, could fail the Final Acceptance, and as result, could be rejected by Controller, as soon as they fail Acceptance.

Fragile Procedure

Could be defined as a Procedure, which could be invoked by Controller, as needed, and which could minimize possibility of collisions between specific Objects, or prevent a specific Object from being hit by another Object being Processed by the System. Typically, the Fragile Procedure could be applied to Processing Fragile Object(s). Fragile Procedure could include: maintaining minimum Gap Size in-between Objects along the Track, and other preventive measures. When Fragile Procedure is invoked, Controller could: vary the speed of the Conveyors; stop Conveyor(s); issue warning message or signal to the operator, etc.

Gap

Could be defined as a case when for a given "D-profile" there is at least one or more of consecutively not Blocked Sensors in-between Blocked Sensors.

Gap Number

Gaps could be numbered in sequence. Behavioral Gaps could be numbered from Objects Leading Edge. Traffic Gaps could be numbered starting with the one furthest along the Track or "X-axis".

Group Acceptance

Could be defined as acceptance criteria, which could be applied to any Object placed into a Transport System of an Object Processing System, and which could be used by Controller to establish whether an Object belongs to the Group or not. If an Object belongs to the Group, the Object could be Processed accordingly, as would any member of the Group. Group acceptance could be based on Objects real-time Behavioral Parameters falling within the range of previously established Group Behavioral Parameters. Group acceptance could be used for Object Processing, where any Object Entering the System must have a Profile, which is within the Group Profile range, in order to be Processed.

Immunity

Could be defined as one of characteristic of the OFTS and Weight Sensors related to ability to operate properly within specified environment. For a given environment, Immunity could be achieved by proper selection of: sample frequencies, modulation techniques, known references, addition of correction and/or filtering components.

Initial "D-Profile"

Could be defined as the very first sample or samples of the Object Dimensional Profile, which could be detected by OFTS, which could take place before the Object reached the top surface of the Entry Module Conveyor.

Initial "W-Profile"

Could be defined as the very first sample or samples of the Object "W-profile" detected by Scale, which could take place as soon as the Object reached the top surface of the Entry Module Conveyor. The Initial "W-detection" could be Static. i.e. performed when Entry Module Conveyor is not moving, or Dynamic, i.e. performed when Entry Module Conveyor is moving.

Leading Edge

Could be defined as the front edge of an Object moving along the Track, which could be detected by OFTS. By its definition, the Leading Edge of an Object is reported by OFTS as the highest numbered Beam broken by that Object.

Leading Edge Trigger

Could be defined as a Process of gathering an Object Behavioral Data based on Sensor's sampling when the leading Edge of the Object has advanced along the Track and Triggered or Blocked. The advantage of using Leading Edge Trigger based Object Behavioral Data sampling is that the recorded Data could be synchronized in terms of location of an Object, or Objects, or Group of Objects to a specific location of them on the Track.

Low-Profile Object

Refers to an Object with minimum vertical profile, which could be detected by OFTS at designated Transition Points along the Track. Low-profile characteristic could be added to Objects Behavioral Parameters, and then considered once the Object is introduced into a System Low-Profile Procedure Could be defined as a Procedure, which could be invoked by Controller, when a Low-profile Object is introduced, or as needed. Since each Conveyor speed could be known to Controller, once the Low-profile Procedure is assigned by Controller to an Object, the Object could be monitored along the Track by timing its Expected appearances at various Transition Points along the Track. If the Low-profile Object timed-out at the next Expected Transition Point, then respective Time-out Procedure could be invoked by Controller to resolve the problem.

Object Identification

Could be defined as an information about the Object, which could be obtained either manually by entering respective Object Data into Controller prior to Object entering the Transport System, or automatically, by using designated Sensors, such as barcode readers, etc Process Control Could be defined as a Process, which could be applied to an Object or Objects, based on the respective Acceptance or Recognition Algorithm. Process could be executed by System Controller, or by a dedicated Process Controller, with an interface to System Controller. Once an Object or Objects are Accepted by System Controller, the pre-defined Process could be executed, while the respective Conveyor the Objects is located on, either stopped or continues to move, advancing the Object along its Track. An example of a Process: Spray coating, Heating, Pressured Air Cleaning, etc., which could be applied at designated locations to an Object or Objects located or moving along the Track of a Transport System.

Recording

Could be defined as a Process or a procedure, which could be conduced by Controller via System Sensor devices such as OFTS and/or Weight Sensors, of collecting raw Behavioral Data, pertaining to an Objects "X-profile", and/or "Z-profile", and/or "W-profile". The Controller could Process recorded information, and upload to a Host Computer over a System network, for storage at a centralized data base, and further Processing as needed Scale Profile Could be defined as an Object Profile, which could be combination of Static and/or Dynamic Profiles, which could be obtained when an Object is present within a Scale Section of the Transport System.

Scanning Sequence

Could be defined as Sequence or logic, which could be executed by Controller of turning on selected Emitter, or group of Emitters, and then test status of respective Sensor or group of Sensors located across the Track of the Transport System in respect to Emitters, to determined whether a Stream or Streams that were blocked by an Object or Objects present in between. Controller could turn on one or a selected group of OFTS Streams. The multiplexed logic could allow Controller to turn on OFTS Streams located far apart from each other, so that their respective Sensors would only be affected by the Stream generated by a designated Emitter across the Track of a Transport System. This could avoid "cross-affect" of one Beam impacting a status of several Sensors located across the Track, particularly for an OFTS layout with high resolution, where space between Emitter-Sensor combo pair could be very small.

Section Profile

Could be defined as an Object Profile, which could be combination of Static and/or Dynamic Profiles, which could be obtained when an Object is present within a specific Section of the Transport System. Example of Section Profiles: Entry Profile, Scale Profile; Transition Profile; etc. Sections could be designated to detect Object specific Behavioral Parameters, such as: Low-profile detection, etc.

Sensor

Could be defined as one of devices, which could include: OFTS, Weight Sensors, etc. which could detect presence of an Object within IMTS.

Sensor Component

Could be defined as a Sensor device, which could consist of a number of discrete Sensor Components, which could change their state when an Object is present within their respective Sensing Area.

Sensing Area
Could be defined as an area, which could be part of an IMTS, and which could be monitored by respective Sensor Devices, such as Position Sensors (OFTS), Weight Sensors, etc. for presence of an Object within it.

Specific Object
Could be defined as an Object, which was identified at a start of a Transaction prior to be placed onto a Track of an IMTS. Identification of an Object could be by reading its barcode label information via barcode reading devices of an IMTS.

Static Profile
Could be defined as an Object Profile, which could be obtained when a respective section of the Track of a Transport System where an Object is residing, is not moving, while the Object itself could be stationary.

Straight Scanning
Could be defined as Sequence or logic, which could be executed by Controller of turning on selected Emitter, or group of Emitters, and then testing status of respective Sensor or Sensors, which could be located straight across the Track from respective Emitter.

Stream
Could be defined as a directional emission of electromagnetic waves, visible or not visible to human eye, by one or more discrete emitting components of the Emitter device of an OFTS, which when not blocked by an Object, could be detected by the respective discrete sensing components of the Sensor device of an OFTS. Parameters of the stream, such as frequency, duration or intensity, focus or density, can be selected to ensure reliable and safe operation of the OFTS for a given application or environment. Each Emitted Stream could be focused toward the respective Sensor component by using optical focusing lenses. In this application, Stream could be also referred as Beam.

Study Runs
Could be defined as a designated number of times an Object could be Processed or transacted through an IMTS, and results of which could be used to establish empirically it's "Dimensional Profile" and "Weight-profile" parameters Test Transactions
Could be defined as Transactions, which could be used for System calibration or verification of System calibration, and which could include Transactions of specific Test or Calibration Objects with an established and a stable Behavioral Patterns. These Test Objects could include Objects with weight ranges from low to upper ends of the Scale range, with an Objective to verify and adjust as needed the Scale operation accuracy, repeatability, etc. These Test Objects could also include Objects with variety of "X-profiles" and/or "Z-profiles", to verify and adjust as needed the OFTS operation. The overall Objective of Test Transactions, including Object Processing, could be to verify that the respective System Module perform as required, and to allow to make required adjustment manually and/or automatically, as needed, so that regular Objects, which could be used for Transactions could be properly identified by Scale and OFTS, to allow Controller to obtain accurate Objects Behavioral Data during a Transaction. During Test Transaction the System Scale and OFTS devices could be adjusted manually and/or automatically, which could include: mechanical, such as location, level adjust, etc.; electrical, such as power, components compatibility, etc.; software control, such as proper signal gain selection, timing, etc.

Time-Driven Logic
Could be defined as logical procedures, which could be invoked by Controller when a specific time interval has elapsed. Controller, such as an embedded, could implement this Logic via available timers, which could be configured to interrupt and invoke respective logical procedure at specified intervals from a starting point in time, which could be unique for each timer. Example of Time Events logical procedures: Sample and store data from Scale Sensors every 10 ms from starting point; Sample and store data from OFTS every 10 ms from starting point plus 5 ms; Analyze stored sampled data from Scale, OFTS and other available Sensors every 100 ms from starting point; Perform self-diagnostics every 250 ms from starting point; etc.

Time-Out Procedure
Could be defined as actions, which could be invoked by Controller when an Expected event has not occurred within pre-defined time interval. There could be several Time-out Procedures, including: Object was scanned, but not detected by OFTS or Scale; Low-profile Object did not arrive on-time at the next Transition Point on the Track, etc. Depending on the cause of Time-out, Controller could implement required steps to ensure the respective cause was properly addressed by the System, and Transaction Process could continue, as needed.

Track
Section of an IMTS, which could be designated for transporting Object(s) by IMTS transport components, such as Conveyors from a point of entry to point of pick-up. There could be IMTS configurations, which could have several Tracks, running in parallel, to increase overall System capacity and throughput. The Tracks, based on its width along the "Y-axis", could be classified as Main (largest width), and Secondary. Secondary Track could be designated for handling special type of Objects, which could include: Low-profile, Fragile, low-cost small Objects, etc.

Traffic Gap
Could be defined as a Gap, which could be used by Controller to describe space observed between Objects, and as such, could be used by Controller for executing Traffic Management.

Traffic Management
Could be defined as ability of the IMTS Controller to properly execute the Object introduction onto the Track of the Entry Module, followed by Object transportation through respective Tracks, and its delivery for pick-up at the end. To achieve set Objectives, which could include: productivity, quality, safety, etc.—Controller during a Transaction or Processing of Objects could use:
  a) Visual and/or audible signals to direct Customer in proper placement of Object(s) onto the Track of the Entry Module
  b) Object(s) location information, which could be obtained via OFTS and other Sensors, as needed
  c) Motion controls for each Conveyor, which could allow Controller to vary respective motion control parameters (such as speed, etc.) of each Conveyor
  d) Process parameters, which could be obtained from respective Process Sensors and/or dedicated Process Controllers Transaction
Could be defined as a number of control steps, which could be executed by a System once an Object is introduced and/or detected within it. Transaction could vary from as simple as transporting an Object within a System from one location to another to more complicated Transactions, which could include Object Processing at various locations within a System Transaction Profile Could be defined as an Object Profile, which could be obtained during a Transaction, when an Object with a known identification, or un-identified Object has entered the Transport System and was Processed through the entire Track.

Transition Profile

Could be defined as an Object Profile, which could be combination of Static and/or Dynamic Profiles, which could be obtained when an Object is present within a specific Transition Section of the Transport System. Example of Transition Sections: sections in-between adjacent Transport mechanisms along the Track; designated sections for detecting specific Behavioral Parameters of an Object, such as: Low-profile Section; etc.

Transport System

Could be defined as an electromechanical System, which could include: conveyor, or conveyors belt-type on top of which Objector Objects could be transported, or trolley type from which an Object or Objects could be supported and transported, etc. which, under direction of System Controller, could be used to advance Object or Objects along its Tracks, as part of a Transactions of known Objects, or Process Control of known or unknown Objects or Group of Objects.

Violation

Could be defined as an event, when Controller via OFTS and/or Weight Sensors has Detected an Unexpected Object or Activity not considered or defined as normal operating condition. Violations could include: Detected Object has exceeded: maximum "D-profile"; no Object was Expected, but an Object was detected; more Objects than Expected were Detected; etc.

Violation Procedure

Could be defined as actions, which could be invoked or executed by Controller when an Invalid Activity or Violation is detected. This Procedure could include number of checks and controls that the System and Controller could execute to establish the nature of the Violation, which could include: Unexpected Object or Activity is detected; faulty component of OFTS detected or suspected, etc.

"X-Profile"

Could be defined as one of Behavioral Parameters or Data of an Object, which could reflect the Objects appearance along a Track of a Transport System, or "X-axis" in reference to a surface, which could be a top of a Conveyor, and which could be measured by Controller via OFTS, as the Object is: entered into a Transport System; stationary on the Track of a Transport System; or is moving along the Track during a Transaction. At any given position along the Track, the "X-profile" of an Object could be measured by Controller as a combination of: a number of horizontal Beams along a Track the Object has broken, and number and size if each Gap the Object has created in-between broken Beams.

"Z-Profile"

Could be defined as one of Behavioral Parameters or Data of an Object, which could reflect its appearance along the "Z-axis" in reference to a surface, which could be a top of a Conveyor, and which could be measured by Controller via OFTS, as the Object: entered into a Transport System; stationary on the Track of a Transport System; or is moving along the Track during a Transaction. At any given position along the Track, the "Z-profile" of an Object could be measured by Controller as a combination of: a number of vertical Beams the Object has broken, and number and size if each Gap the Object has created in-between broken Beams.

Weight Profile

Weight Profile or "W-profile" could be defined as one of Behavioral Data of an Object, which could reflect its appearance as seen by Controller via Weight Sensors or Scale device, which could be typically installed at an Entry Module, and which could measure additional weight placed on the top of the Entry Module Conveyor. The Scale could be sampled by Controller at a predefined rate, which could be selected to achieve required accuracy and speed of Dynamic Recognition of Objects placed on top of the Entry Module Conveyor. The "W-profile" of an Object could be described as function describing additional weight reported by the Scale to Controller after an Object was detected by OFTS vs. the respective sample number by Controller of the Scale.

DETAILED DESCRIPTION OF THE INVENTION

FIG. 1 through FIG. 12 illustrates variety of System Modules and support components, which could be used in designing an Object Transaction Transport System, and/or Object Processing Transport System. For illustration purposes, the OFTS is shown as a combination of optical Emitter-Receiver Devices, which could be located opposite from each other across the Track.

FIG. 1—Entry Module (9), which could include OFTS. As needed, OFTS components could be mounted required distance from the top surface of the Track, which could allow detection of Objects being placed onto the Track before they reach the top surface of the Track. Based on OFTS, Controller could within Entry Module: Detect Object approaching the top of the Track; Establish Objects X-profile and Objects X-speed; Detect presence of other Object(s); etc.

Figure elements are labeled as follows:

1—Emitter devices of the OFTS, which could be numbered in sequence. As shown, the illustrated Entry Module could have 20 Emitter devices labeled E1 through E20

2—Sensor devices of the OFTS, which could be numbered in sequence in respect to the corresponding Emitter devices located across the Track. As shown, the illustrated Entry Module could have 20 Sensor devices labeled S1 through S20

6—Top of the Track, which could be top of a Conveyor

7—Opening, which could be used for passing through electrical cables, etc.

8—Direction of motion of the Transport System

Figure 2:
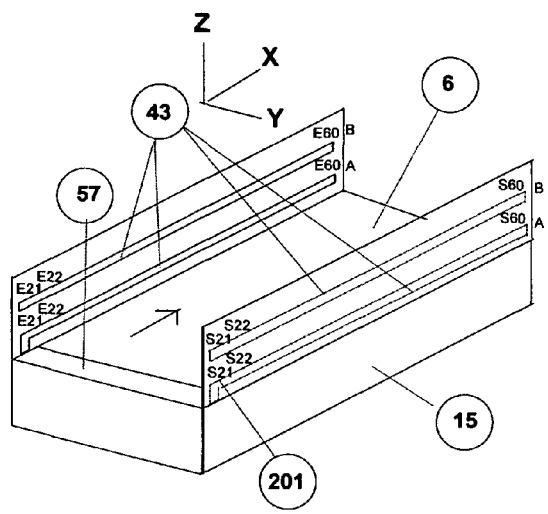
Figure 3:
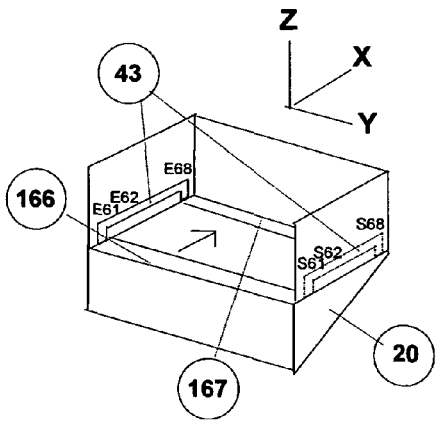

200—First Emitter/Sensor pair of devices of the Track, labeled as E1/S1 respectively FIG. 2—Transfer Module (15), which could include OFTS (43), which could consist of a dual-row set of Emitters and respective Sensors across the Track (6), with each row labeled as "A" and "B". Addition of row "B" of OFTS devices could allow Controller to perform variety of scanning techniques of OFTS devices, which could include multi-row interlacing, frequency modulation, etc. to effectively utilize low-cost optical detection devices, and to achieve rather sophisticated Object detection and recognition, which could include "Z-profiling" of an Object or Objects present or moving along the Track (6) of the Transfer Module (15). Based on OFTS, Controller could within the Transfer Module: Detect presence of an Object; Establish Objects "X-profile" and Objects X-speed; Detect presence of other Object(s); Detect an Object unique features, such as a narrow section within an Object, opening, etc.; Detect an Object orientation along "Z-axis"; etc. As shown, Emitter/Sensor couple (201) labeled respectively E21/S21, which could be located at the entrance point of the Transfer Module's Track, could be used for detection of Low-profile Objects, as they enter the Track of the Transfer Module in the direction of the Transport System, and pass through the Registered Surface (57). The illustration is one of the examples, which underlines uniqueness of proposed System, and its capabilities to perform real-time sophisticated Object Behavioral Recognition based on utilization of relatively low-cost detection devices, such as the ones used in the example.

Figure elements are labeled as follows:

43—Emitter/Sensor devices of the OFTS, which could be numbered in sequence. As shown, the illustrated Transfer module could have two rows "A" and "B" of 40 Emitter/Sensor device combo's in each row, which could be labeled E21/S21 through E60/S60 respectively FIG. 3—Exit Module (20), which could include OFTS. Based on OFTS, Controller could within the Exit Module: Detect presence of an Object; Establish Object's X-profile, Objects X-speed; Detect presence of other Object(s); etc. As shown, Emitter/Sensor couple labeled respectively E61/S61, which could be located at the entrance point of the Exit Module's Track, could be used for detection of LoW-profile Objects, as they enter the Track of the Exit Module in the direction of the Transport System over the Registered Surface (166), while Emitter/Sensor couple labeled respectively E68/S68, which could be located at the end point of the Exit Module's Track, could be used for detection of LoW-profile Objects, as they could remain on top of the Registered Surface (167) at the end of Track of the Exit Module.

Figure elements are labeled as follows:

43—Emitter/Sensor device combo of the OFTS, which could be numbered in sequence. As shown, the illustrated Exit Module could have 8 Emitter/Sensor device combo's labeled E61/S61 through E68/S68 respectively FIG. 4—Secondary Transport System (47), which could be used for handling small low-value Objects, small fragile Objects, etc, which may present a challenge when placed on the Main Transport System. As illustrated, a discrete Sensor (45) could placed at the entry point and another discrete Sensor (73) at the exit location. As shown, both Sensors could be optical, reflective type, with the Beam emitted from respective Sensor reflected back by Reflective Component (44), one for each Sensor.

Based on these Sensors, Controller could within the Secondary Transport System: Detect presence of an Object at the entry point and at the end point; Establish time required for an Object to travel from the entry point to the end point, and if the time has exceeded a set limit, which could be based on the speed of the Secondary Transport System Track, then a corrective procedure could be executed to correct the problem. The traffic of Objects into the Secondary Transport System could be controlled or indicated by the Traffic Light (49), which when turned on, could indicate that an Object could be placed at the entry point of the Track of the Secondary Transport System. The Secondary Transport System could be mounted to the side of a Transaction Transport System, with Customer access from the side as indicated by (14).

Figure 5:
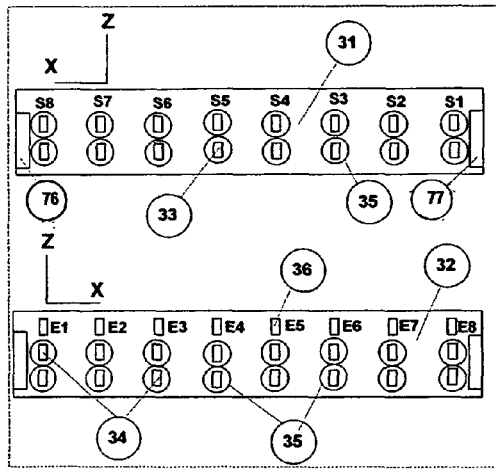

FIG. 5—Illustrates OFTS components based on optical combo of Emitter/Sensor, which could be mounted onto respective PC-boards. As shown, the PC-board for Emitters (32) and Sensors (31) could be designed as dual row, and contain eight columns. The lower row on both PC-boards could be used for detection of Low-profile Objects, or could be used to expand the detection zone vertically in relationship to the Track of a Transport System. Both PC-boards could be designed for passing through via respective connectors (74, 75) required power and control signals to these respective PC-board assemblies, as well as other similar PC-board assemblies interconnected into a continuous OFTS along the entire Track of an Object Transport System, as needed.

Figure elements are labeled as follows:

33—Sensor component, which could be labeled in sequence from S1 through S8

34—Emitter component, which could be labeled in sequence from E1 through E8

35—Optical component, which could be designed to control aperture, attenuation, etc. of the Beam passing from Emitter to respective Sensor

36—Visible optical Emitters, which could be used by Controller to indicate visually the scanning sequence of the Emitter/Sensor combo, or for other purposes as needed.

Figure 6:
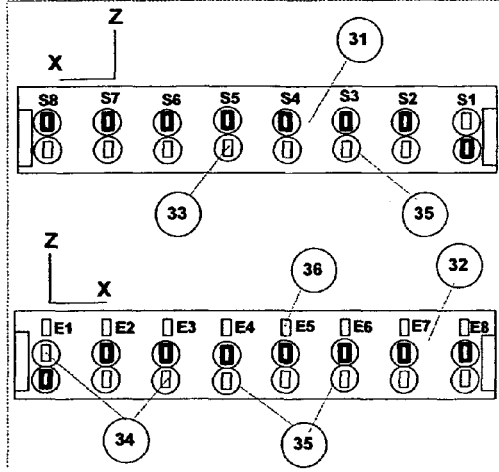

74—Interface connector, which could be used for providing required: power, addressing, control, etc. for Emitter PC-board, and pass-through FIG. 6—Illustrates OFTS PC-board assemblies presented on FIG. 5, which could be populated with respective components—Emitters and Sensors, respectively. As shown, Emitter/Sensor combo labeled E1/S1 respectively could be used for detection of Low-profile Objects. Remaining elements are labeled same as on FIG. 5.

Figure 7:
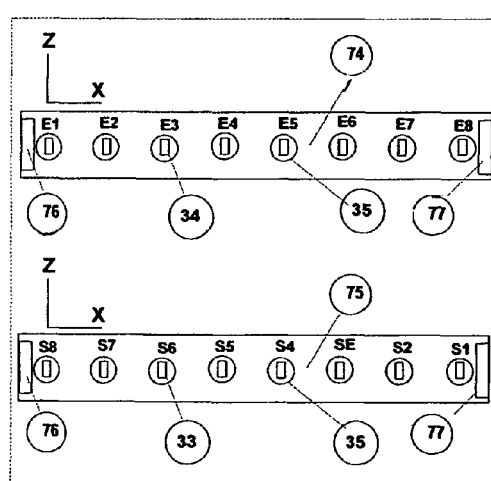

FIG. 7—Illustrates OFTS components based on optical combo of Emitter/Sensor, which could be mounted onto respective PC-boards. As shown, the PC-board for Emitters (34) and Sensors (33) could be designed as a single row, and contain eight each. Both PC-boards could be designed for passing through via respective connectors (76, 77) required power and control signals to these respective PC-board assemblies, as well as other similar PC-board assemblies interconnected into a continuous OFTS along the entire Track of an Object Transport System, as needed.

Figure 8:
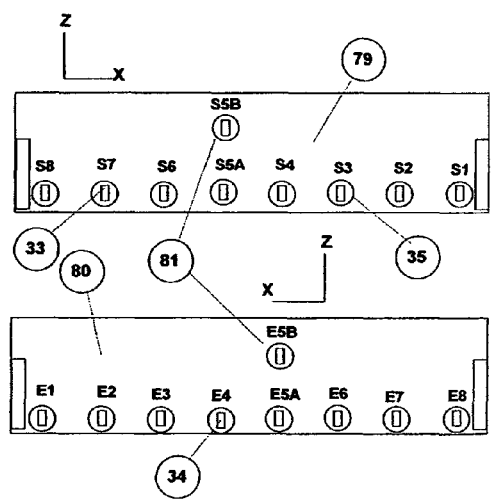

FIG. 8—Illustrates OFTS components based on optical combo of Emitter/Sensor, which could be mounted onto respective PC-boards, which could be layout out to detect specific features of an Object or group of Objects, as needed. As shown, the PC-board for Emitters (80) and Sensors (79) could be designed, with a dual Emitter/Sensor couple (81) of E5A/E5B and S5A/S5B, which could be used to detect unique feature of an Object 168 at designated locations along the Track. Control of power to Emitters E5A and E5B could implemented in-parallel, while interface to respective Sensors S5A and S5B could be implemented individually, as needed. There could be a number of PC-board layouts designed, and then installed along the Tracks, so that Controller could detect specific features of Objects at designated locations, which could be timed from the moment an Object has been detected to the moment it is Expected to reach the designated location along the Track, based on the speed of the Track advancing Objects on top of it. Remaining elements are labeled same as on FIG. 7

Figure 9:
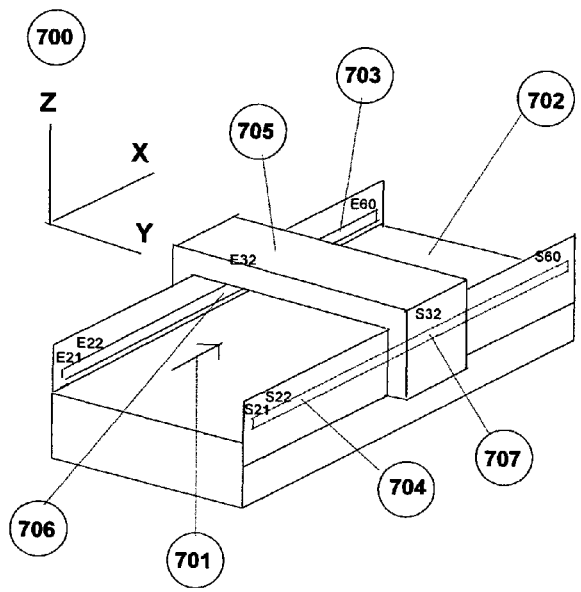

FIG. 9—Illustrates an example of an Object Transport and Processing Module (700). The distance between respective Emitter/Sensor pairs along the Track (702), and their scanning control sequence by Controller could be selected to provide required accuracy and resolution at designated locations along the Track. For a more accurate positioning of Objects at the Process Module (705), these parameters could be selected to allow Controller to start the Process when Object or Objects are within specified locations, with required degree of accuracy.

Figure elements are labeled as follows:

701—Direction of motion of the Transport System

702—top surface of the Transport System Track, which could be used for placing and transporting Objects, as needed

703—OFTS Emitter components of the Object Transport and Processing System, which could be labeled in sequence from E21 to E60

704—OFTS Sensor components of the Object Transport and Processing System, which could be labeled in sequence from S21 to S60

Figures 10, 11, 12:
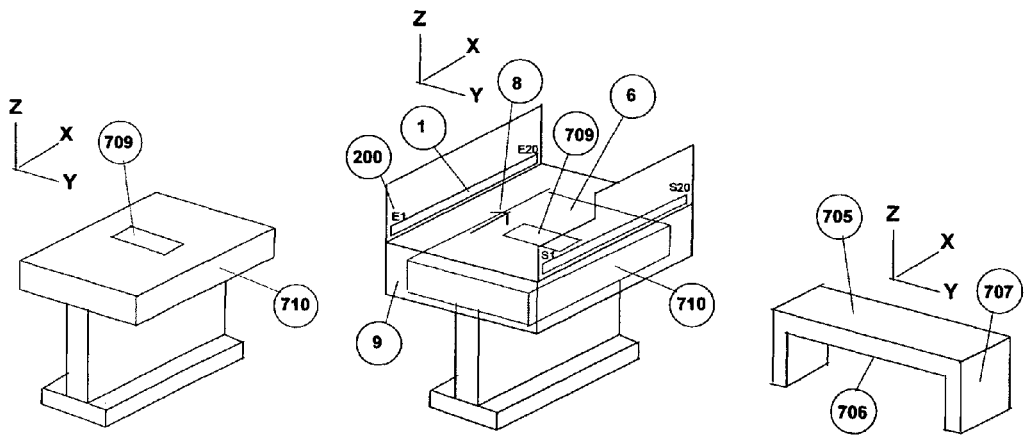

705—Object Processing Module, which could be attached to the Transport System, and could be used by Controller to execute required Process Control when an Objector Objects reach designated location within the Process Area along the Track, which is as shown, begins with Emitter/Sensor combo labeled E32/S32 respectively FIG. 10—Illustrates Scale components, which could be used for verification of an Object or Objects weight, when placed on top.

Figure elements are labeled as follows:

709—Weight Sensor, which could be based on known technology of strain gauges, load cells, etc., which could be properly selected to provide required performance parameters such as: Range of weights; Accuracy; Response time; etc.

710—Scale base assembly, which could be designed to support required section of a Transport System FIG. 11—Illustrates Scale components, which could be used to install an Object Entry Module (9) on top of the Scale Platform (710), so that the weight of an Object or Objects placed on top of the Entry Module Track (6) could be measured by Controller connected to Scale Sensors (709). The Scale Sensors could be calibrated, as needed. Figure elements are labeled same as on FIG. 1 and FIG. 10.

FIG. 12—Illustrates an example of an Object Processing Module (705), which could have Process Sensors (707) installed, as needed. Controller could use Process Sensors (707) to activate and control the Process when an Object or Objects have entered the Process Area under the section of the Process Module (706). Process Module of one type, or a variety of Process Modules could be installed at designated location or locations along the Transport Track, as needed.

FIG. 13 through FIG. 16 illustrates variety of configurations, which could be used for designing an Object Transaction and/or Object Processing Transport System. For illustration purposes, the OFTS is shown as a combination of optical Emitter-Receiver Devices, which could be located opposite from each other across the Track.

Figure 13:
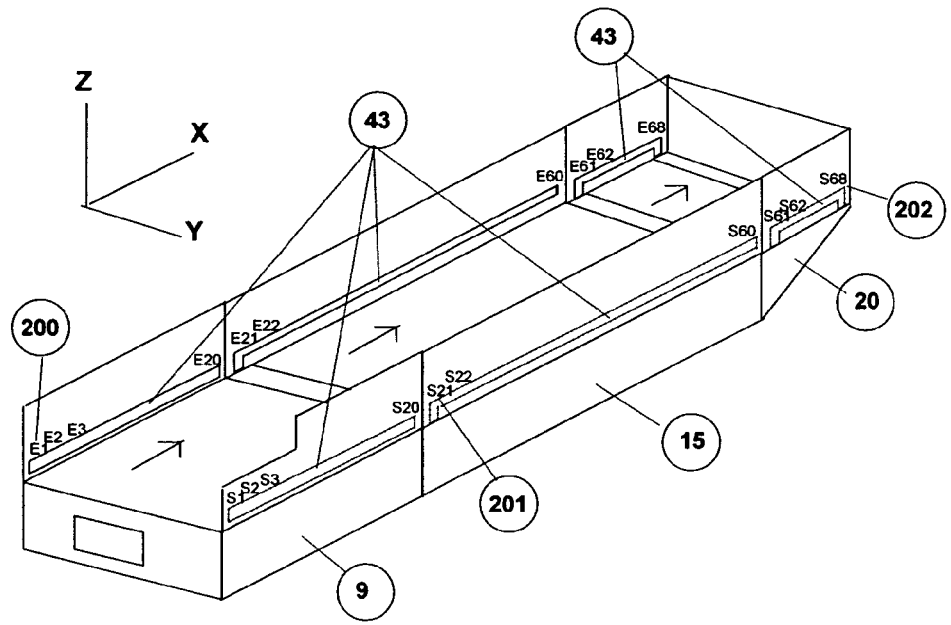

FIG. 13—Illustrates an example of an Object Transaction System, which could include: Entry Module (9); Transfer Module (15); Exit Module (20); OFTS (43) installed along the entire Object Transport Track, with ability to detect LoW-profile Objects at designated Transition points and at the end of the Track, as needed.

Figure elements are labeled as follows:

200—the first OFTS Emitter/Sensor couple labeled E1/S1 respectively of the entire OFTS

201—the first OFTS Emitter/Sensor couple labeled E21/S21 respectively of the Transfer Module (15), which could be used for detection of Low-profile Objects traveling from the Entry Module (9) and entering Transfer Module (15)

202—the last OFTS Emitter/Sensor couple labeled E68/S68 respectively of the OFTS (43), which could be used for detection of Low-profile Objects remaining at the end of the Track of the Exit Module (20)

Figure 14:
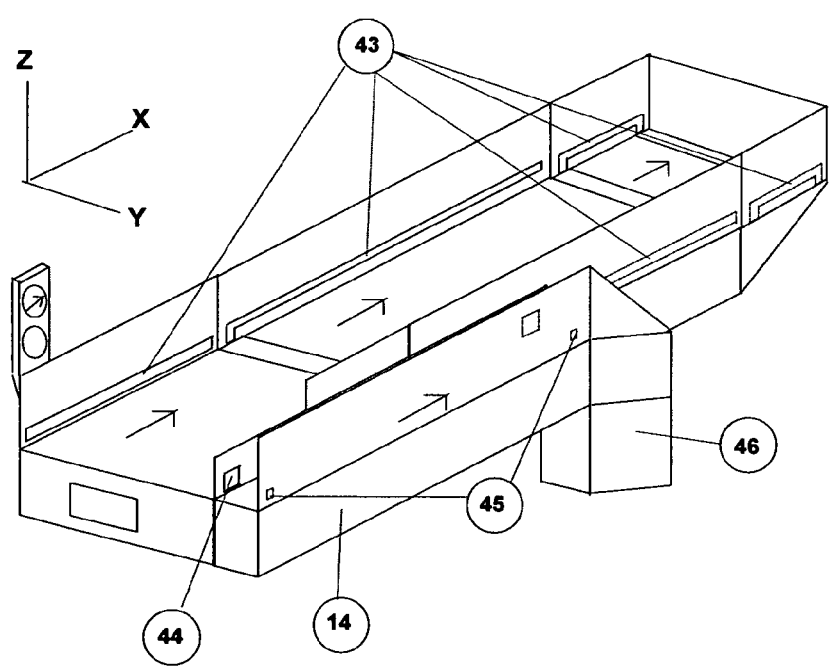

FIG. 14—Illustrates an example of an Object Dual-Transport Transaction System (48), which could include: Main Transport System (78) with OFTS (43) installed along the entire Main Transport Track, with ability to detect Low-profile Objects at designated Transition points and at the end of the Track, as needed; Secondary Transport System (47), which could be used for transporting small Objects, including fragile. Remaining elements are labeled same as on FIG. 4.

Figure 15:
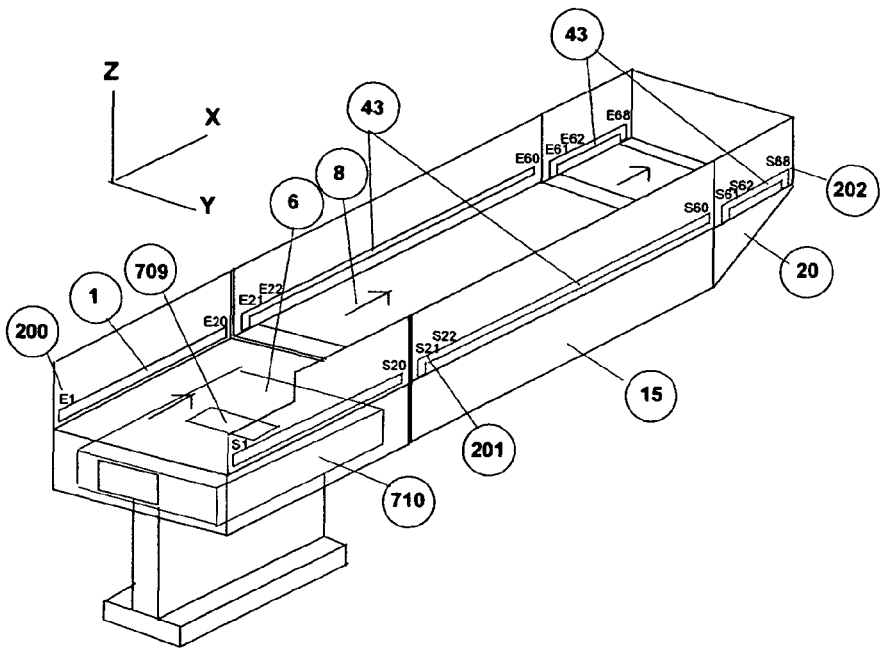

FIG. 15—Illustrates an example of an Object Transaction System shown on FIG. 13, but with an addition of Scale Components (709, 710) for the Entry Module, which could have its OFTS components (1) mounted required distance from the top surface of the Track (6), so that Objects could be reliably detected by OFTS before they reach the top surface of the Track. Remaining Figure elements are labeled same as on FIG. 13. In addition, other parameters of the OFTS (1) of the Entry Module, such as distance between adjacent Emitter/Sensor couples, as well as respective parameters of the Scale Sensors, could be selected to achieve required reliability of analyzing Dynamic Behavor of an Object being placed into the Entry Module, and then being advanced along the Track by the Transport System.

Figure 4:
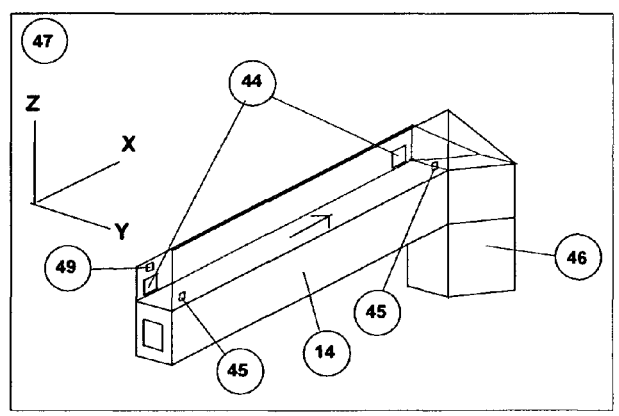

Remaining elements are labeled same as on FIG. 4.

Figure 16:
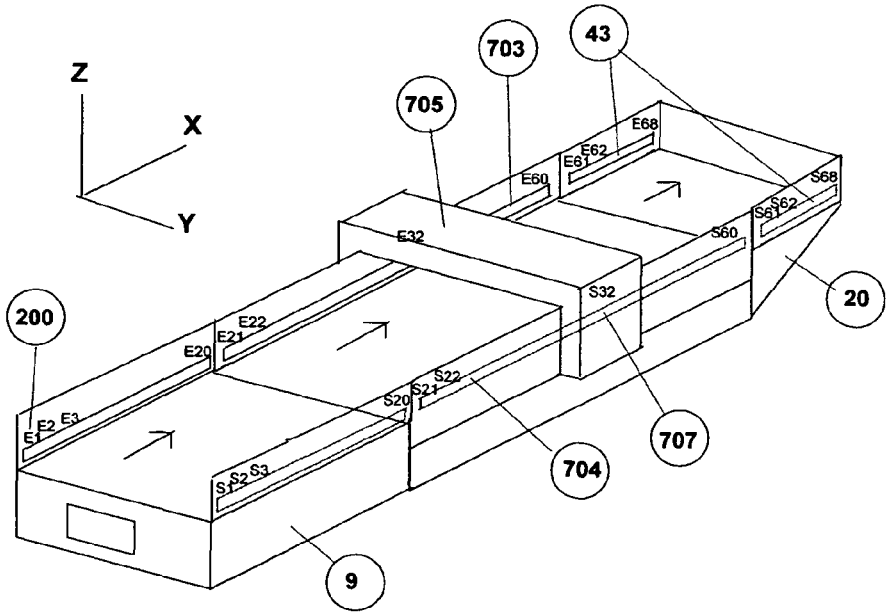

FIG. 16—Illustrates an example of an Object Transport and Processing System, which could include: Entry Module (9); Transport and Processing section (700) with a Process Module (705); Exit Module (20); OFTS (43) installed along the entire Object Transport Track. Remaining elements are labeled same as on FIG. 8.

Figure 17:
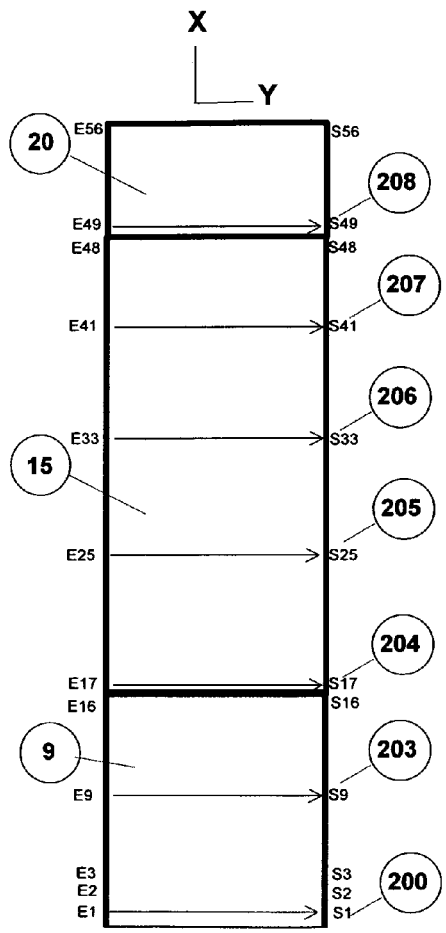
Figure 18:
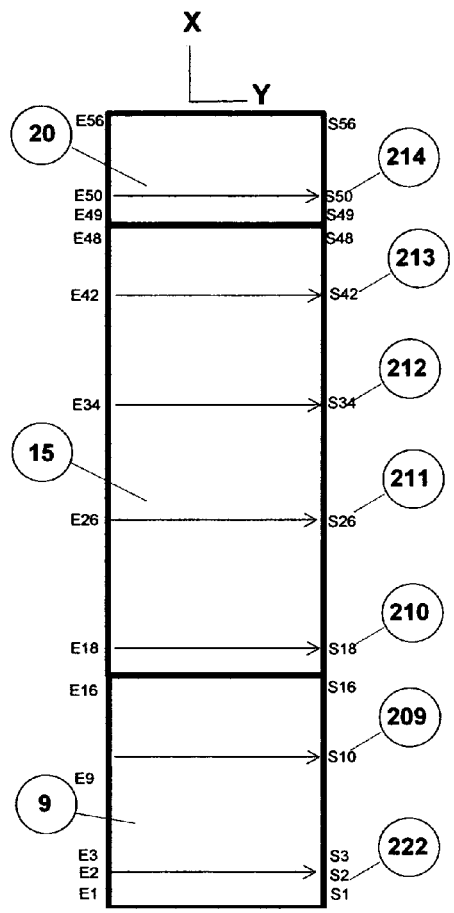
Figure 19:
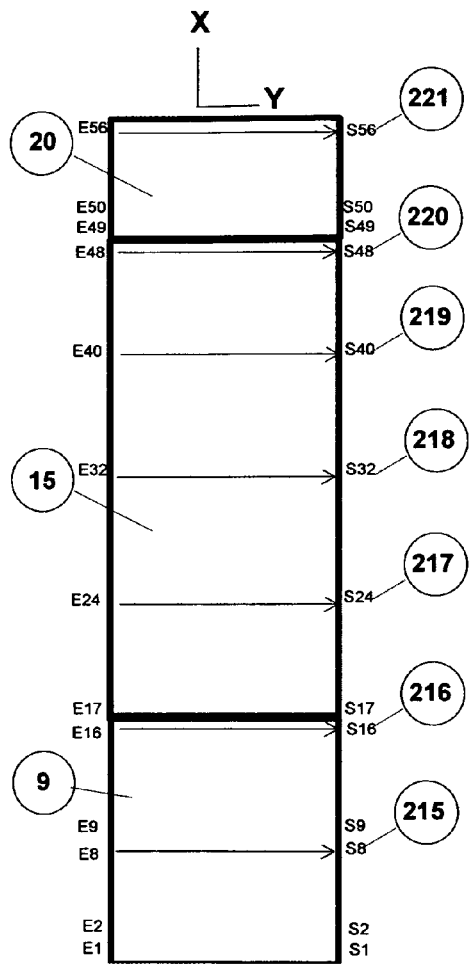
Figure 20:
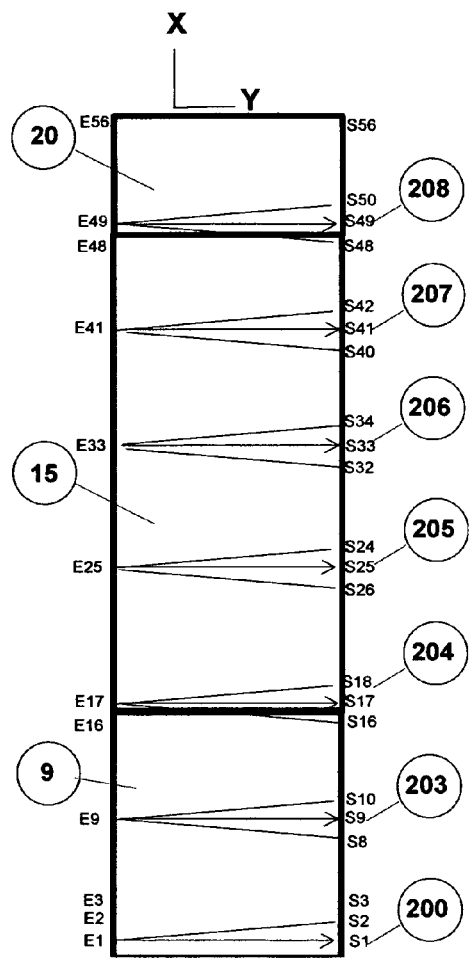
Figure 21:
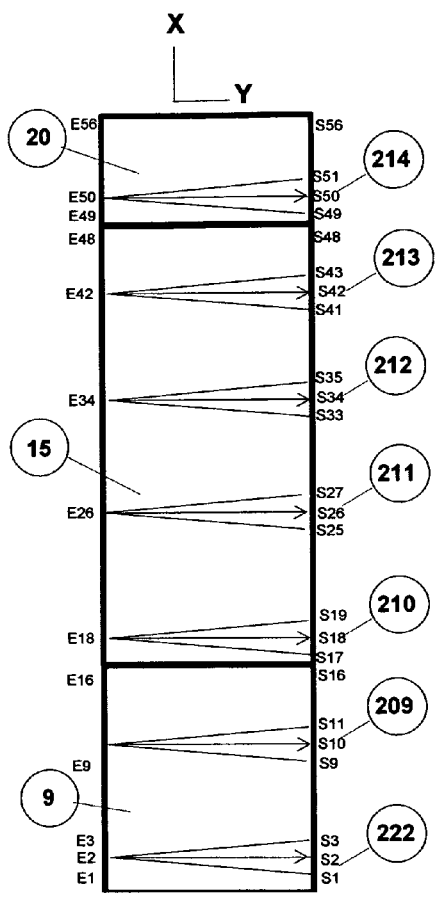
Figure 22:
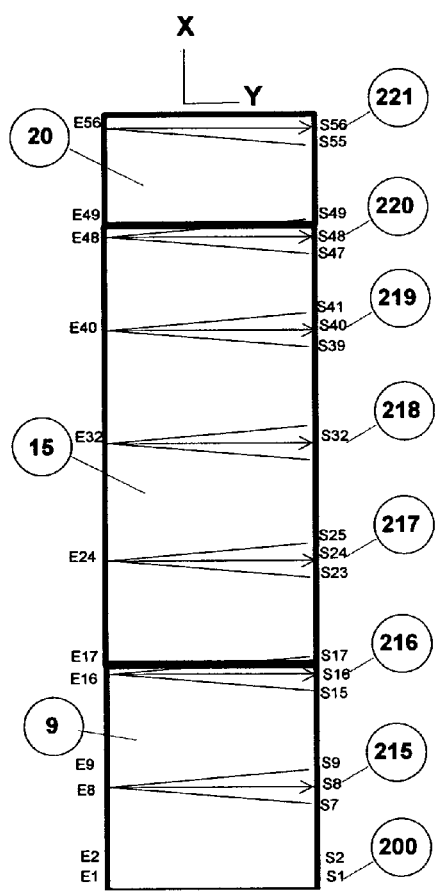

FIG. 17 through FIG. 22 illustrates variety of OFTS Layouts, based on Emitter/Sensor type of Object detection devices, and available scanning sequences of the OFTS, which could be used to achieve required accuracy and reliability, which could be utilized for an Object Transaction and Object Processing Systems, as needed. For simplicity, all examples are based on an Object Transport System, which could consist of: Entry Module (9) with OFTS devices labeled from E1/S1 through E16/S16; Transfer Module (15) with OFTS devices labeled from E17/S17 through E48/S48; Exit Module (20) with OFTS devices labeled from E49/S49 through E56/S56. To achieve required performance, including: System throughput, Dynamic Object Behavioral detection; etc.—an appropriate scanning technique could be selected. For examples illustrated on FIG. 17 through FIG. 21, the following could be considered:

a) For simplicity—single-row layout of PC-boards for Emitters and Sensors could be used, as illustrated on FIG. 7, with quantity 8 of Emitter components installed on each Emitter PC-board, and respectively quantity 8 of Sensor components installed on each Sensor PC-board. In the illustrated examples—there is 7 Emitter PC-boards and 7 Sensor PC-boards. In addition, control of Emitters and Sensors will be limited to: turning Emitters ON/OFF, and checking the status of Sensors (BLOCKED/NOT BLOCKED). Only the Process of controlling and gathering of Data from OFTS is considered.

b) Assembled Emitter PC-boards could be mounted along the Track, and Emitter's power and control signals could be daisy-chained from the Emitter PC-board nearest to Controller to the Emitter PC-board furthest. The Emitter components could be assigned a reference number in sequence, starting with E1 at the starting point of the Track and ending with E56 (in this example) at the end of the Track. Similarly, assembled Sensor PC-boards could be mounted along the Track, and Sensor's power and control signals could be daisy-chained from the Sensor PC-board nearest to Controller to the Sensor PC-board furthest. The Sensor PC-boards could be aligned across the Track, so that for each Emitter component, there is one Sensor component located straight across the Track. Both Emitter and Sensor components could be assigned a reference number in sequence, starting with E1/S1 at the starting point of the Track and ending with E56/S56 (in this example) at the end of the Track.

c) Controller could utilize a 3-bit addressing method, which could be part of control interface daisy-chaining Emitter PC-boards, and which could allow Controller to select simultaneously one Emitter component on each of the Emitter PC-boards, with maximum of 8 total Emitters selected, based on 3-bit addressing limit. In the illustrated examples—the number of simultaneously addressable Emitters is equal to 7.

d) Controller could utilize a 3-bit addressing method, which could be independent of the 3-bit addressing bits used for Emitters, and which could be part of control interface daisy-chaining Sensor PC-boards, and which could allow Controller to select simultaneously one Sensor component on each of the Sensor PC-boards, with maximum of 8 total Sensors selected, based on 3-bit addressing limit. In the illustrated examples—the number of simultaneously addressable Sensors is equal to 7.

e) Controller could utilize available hardware/software resources to execute a Scanning Sequence, which, as illustrated, could implement a Straight Scanning (FIG. 17 through FIG. 19), or Combo Scanning (FIG. 20 through FIG. 22).

f) The Straight Scanning logic could be implemented by Controller as follows:

Step 1—FIG. 17: Via 3-bit addressing select and turn ON the first Emitters on each Emitter PC-board E1, E9, E17, E25, E33, E41, E49; Via same 3-bit addressing select the first Sensors on each Sensor PC-board S1, S9, S17, S25, S33, S41, S49; Wait for the respective Beams B1, B9, B17, B25, B33, B41, B49, generated by respective Emitters to stabilize; Read and store status of selected Sensors S1, S9, S17, S25, S33, S41, S49;

Step 2—FIG. 18: Via 3-bit addressing select and turn ON the next Emitters on each PC-board E2, E10, E18, E26, E34, E42, E50; Via same 3-bit addressing select the next Sensors on each PC-board S2, S10, S18, S26, S34, S42, S50; Wait for the respective Beams B2, B10, B18, B26, B34, B42, B50, generated by respective Emitters to stabilize; Read and store status of selected Sensors S2, S10, S18, S26, S34, S42, S50;

Steps 3 through 7: Continue the Straight Scanning logic described above.

Step 8—FIG. 19: Via 3-bit addressing select and turn ON the last Emitters on each Emitter PC-board E8, E16, E24, E32, E40, E48, E56; Via same 3-bit addressing select the last Sensors on each Sensor PC-board S8, S16, S24, S32, S40, S48, S56; Wait for the Beams B8, B16, B24, B32, B40, B48, B56, generated by respective Emitters to stabilize; Read and store status of selected Sensors S8, S16, S24, S32, S40, S48, S56;

Step-9: Perform required Process of stored DATA, and then repeat steps 1 through 9, as required, to support Object Detection along the Tracks, or self-diagnostics when Objects are not present.

g) The Combo Scanning logic could be implemented by Controller as follows:

Step 1—FIG. 20: Via 3-bit Emitter addressing select and turn ON the first Emitters on each Emitter PC-board E1, E9, E17, E25, E33, E41, E49; Via 3-bit Sensor addressing select the first Sensors on each Sensor PC-board S1, S9, S17, S25, S33, S41, S49; Wait for the respective Beams B1, B9, B17, B25, B33, B41, B49, generated by respective Emitters to stabilize; Read and store status of selected Sensors S1, S9, S17, S25, S33, S41, S49; Via 3-bit Sensor addressing select the next Sensors on each Sensor PC-board S2, S10, S18, S26, S34, S42, S50, read and store their status;

Step 2—FIG. 18: Via 3-bit Emitter addressing select and turn ON the next Emitters on each PC-board E2, E10, E18, E26, E34, E42, E50; Wait for the respective Beams B2, B10, B18, B26, B34, B42, B50, generated by respective Emitters to stabilize; Read and store status of previously selected Sensors S2, S10, S18, S26, S34, S42, S50; Via Sensor 3-bit addressing select Sensors on each PC-board S1, S9, S17, S25, S33, S41, S49, read and store their status; Via 3-bit Sensor addressing select the next Sensors on each Sensor PC-board S3, S11, S19, S27, S35, S43, S51, read and store their status;

Steps 3 through 7: Continue the Combo Scanning logic described above.

Step 8—FIG. 19: Via 3-bit Emitter addressing select and turn ON the last Emitters on each Emitter PC-board E8, E16, E24, E32, E40, E48, E56; Wait for the Beams B8, B16, B24, B32, B40, B48, B56, generated by respective Emitters to stabilize; Read and store status of previously selected Sensors S7, S16, S23, S31, S39, S47, S55; Via 3-bit Sensor addressing select the last Sensors on each Sensor PC-board S8, S16, S24, S32, S40, S48, S56, read and store status their status;

Step-9: Perform required Process of stored DATA, and then repeat steps 1 through 9, as required, to support Object Detection along the Tracks, or self-diagnostics when Objects are not present.

Figure elements are labeled as follows:
200—OFTS Emitter/Sensor couple labeled E1/S1
203—OFTS Emitter/Sensor couple labeled E9/S9
204—OFTS Emitter/Sensor couple labeled E17/S17
205—OFTS Emitter/Sensor couple labeled E25/S25
206—OFTS Emitter/Sensor couple labeled E33/S33
207—OFTS Emitter/Sensor couple labeled E41/S41
208—OFTS Emitter/Sensor couple labeled E49/S49
222—OFTS Emitter/Sensor couple labeled E2/S2
209—OFTS Emitter/Sensor couple labeled E10/S10
210—OFTS Emitter/Sensor couple labeled E18/S18
211—OFTS Emitter/Sensor couple labeled E26/S26
212—OFTS Emitter/Sensor couple labeled E34/S34
213—OFTS Emitter/Sensor couple labeled E42/S42
214—OFTS Emitter/Sensor couple labeled E50/S50
215—OFTS Emitter/Sensor couple labeled E8/S8
216—OFTS Emitter/Sensor couple labeled E16/S16
217—OFTS Emitter/Sensor couple labeled E24/S24
218—OFTS Emitter/Sensor couple labeled E32/S32
219—OFTS Emitter/Sensor couple labeled E40/S40
220—OFTS Emitter/Sensor couple labeled E48/S48
221—OFTS Emitter/Sensor couple labeled E56/S56

FIG. 23 through FIG. 28 illustrates principals of Object detection and Tracking by OFTS. For simplicity, only Sensors are shown as clear circles, with their status when blocked by an Object from the Beam of the Emitter across, indicated via black circle.

Figure 23:
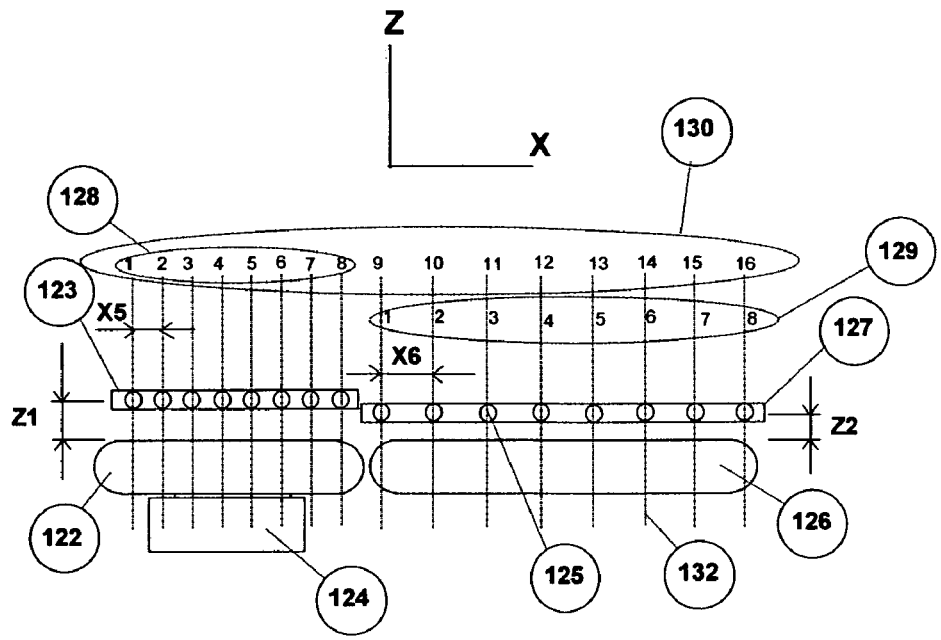

FIG. 23—Illustrates a side view of an OFTS configuration for Entry and Transfer Modules.

Figure elements are labeled as follows:

122—Section of the Transport System of the Entry Module, which could transport Objects placed on top of it toward the section of the Transport System of the Transfer Module (126)

123—OFTS of Entry Module, which could be configured for most optimum detection and Tracking of Objects "X-profile" when Objects are placed on top of the Conveyor of the Entry Module 124—Scale component of Entry Module, which could be used for most optimum measurement of Objects "Weight-profile" when Objects are placed on top of the Conveyor of the Entry Module 125—Symbol, representing an OFTS Sensor, which for illustration purposes, could be numbered in sequence with #1 at the start of the Track and #16 at the end of the Track. For simplicity, respective Emitter components are not shown.

126—Section of the Transport System of the Transfer Module, which could transport Objects placed on top of it toward the next Module, such as Exit Module (not shown, for simplicity)

127—OFTS of Transfer Module, which could be configured for most optimum detection and Tracking of Objects "X-profile" when Objects are placed on top of the Conveyor of the Transfer Module 128—OFTS Sensor numbers along the Track of the Entry Module, which could be numbered in sequence along the "X-axis", as shown 129—OFTS Sensor numbers along the Track of the Transfer Module, which could be numbered in sequence along the "X-axis", as shown 130—OFTS Sensor numbers for the Track of the Entry and Transfer Module, which could be numbered in sequence along the "X-axis", as shown Z1—Vertical offset of the OFTS Sensors from the top of Conveyor of the Entry Module. This important parameter could be selected to optimize the efficiency of the OFTS initial "X-profile" detection of an Object being placed on top of the Entry Module. This distance could be selected to allow Controller to timely capture (via respective OFTS) and Process Objects Scan Data prior to Objects reaching the top surface of the Track at the Entry Module.

Z2—Vertical offset of the OFTS Sensors from the top of the Track of the Transfer Module. This important parameter could be selected to optimize the accuracy of OFTS Tracking Objects, including Low-profile Objects, such as greeting cards, etc., along the top of Conveyor of the Transfer Module. This distance could be also selected to allow Controller to timely capture (via respective OFTS) and Process Objects Scan Data as Objects move along the Track at specified speeds.

X5—Resolution of the OFTS along "X-axis" for Entry Module, which could be selected to effectively detect presence of small Objects on being placed on top of the Track of the Entry Module, as needed.

X6—Resolution of the OFTS along "X-axis" for Transfer Module, which could be selected to allow OFTS to effectively detect presence of small Objects on top of the Track of the Transfer Module, as needed. The resolution of OFTS of Transfer Module could also be selected to allow Controller to accurately capture (via respective OFTS) and Process Objects Scan Data as Objects move along the Track at specified speeds.

Figure 24:
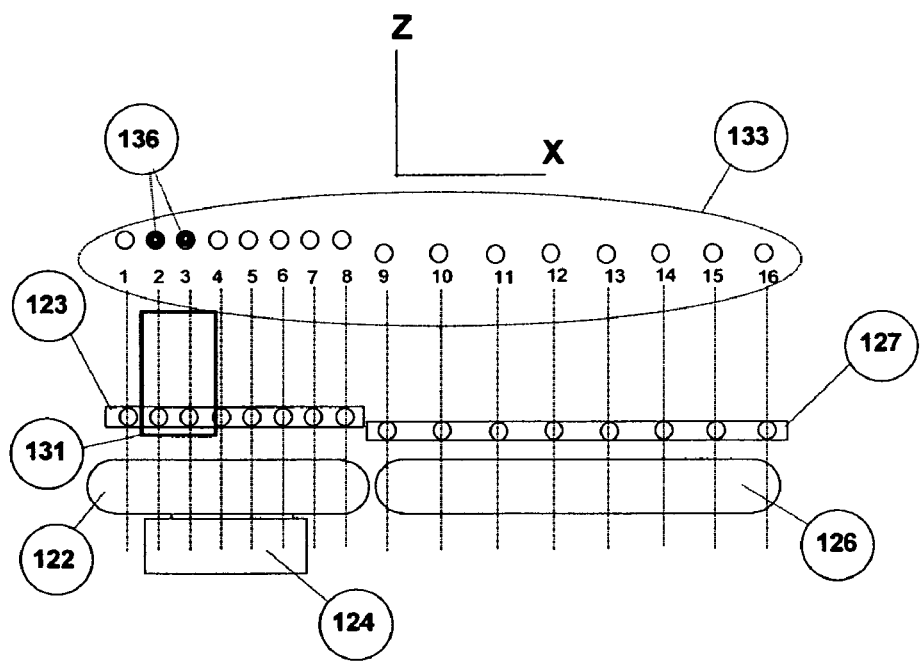

FIG. 24—Illustrates an example of how an Object (131) could be detected by OFTS Sensors #2 and #3, shown as Blocked (represented as dark circle), of the Entry Module during the Object entry into the OFTS sensing area. Note, the Object is detected prior of being placed on top of the Track.

Figure elements are labeled as follows:

133—OFTS overall status of Sensors

Remaining Figure elements are labeled same as on FIG. 23

Figure 25:
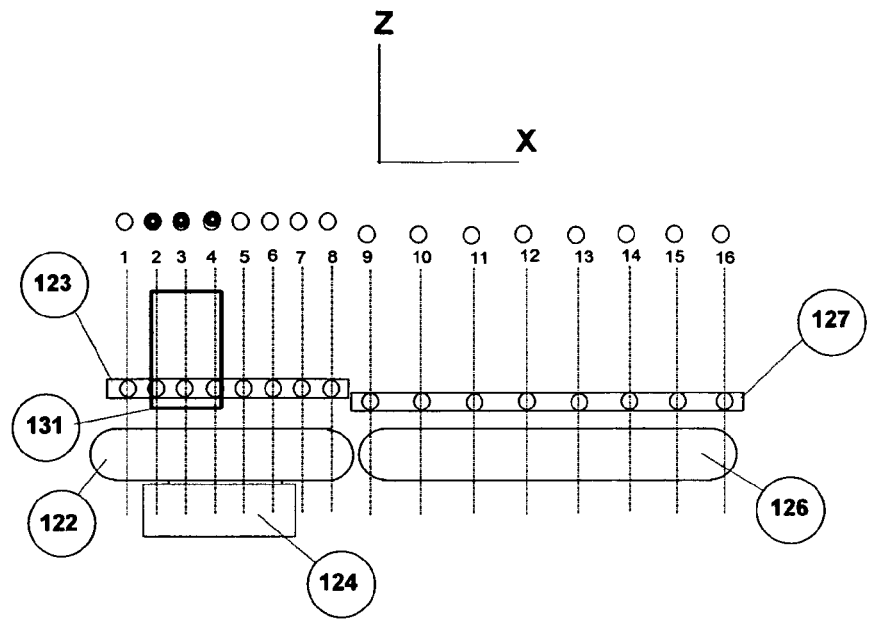

FIG. 25—Illustrates another example of how an Object (131) could be detected by OFTS Sensors #2, #3 and #4, shown as Blocked, of the Entry Module during the Object entry into the OFTS sensing area. Note, the Object is detected prior of being placed on top of the Track.

Remaining Figure elements are labeled same as on FIG. 23 and FIG. 24

Figure 26:
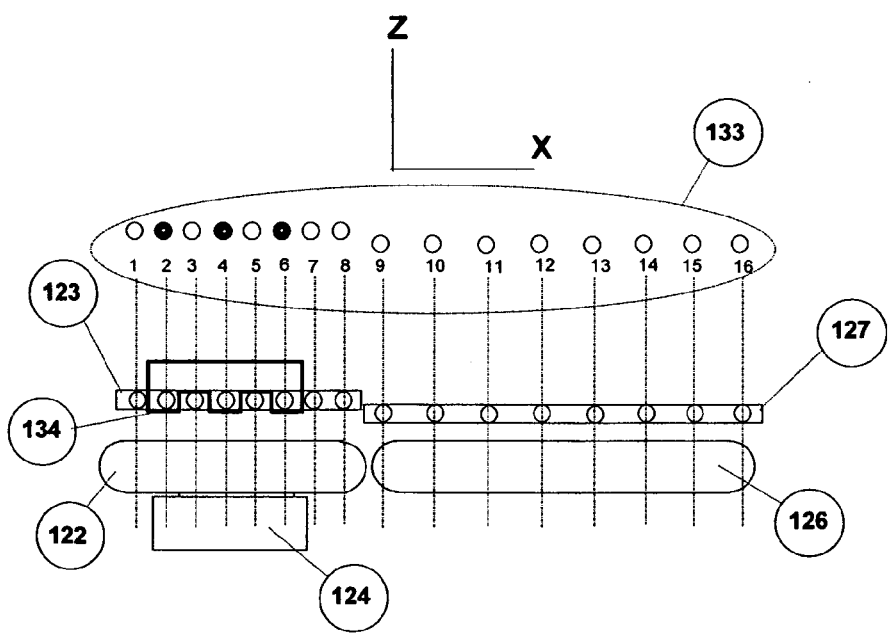

FIG. 26—Illustrates example of how an Object (134) could be detected by OFTS Sensors #2, #4 and #6, shown as Blocked, of the Entry Module during the Object entry into the OFTS sensing area. Note, the Object is detected prior of being placed on top of the Conveyor.

Remaining Figure elements are labeled same as on FIG. 23 and FIG. 24

Figure 27:
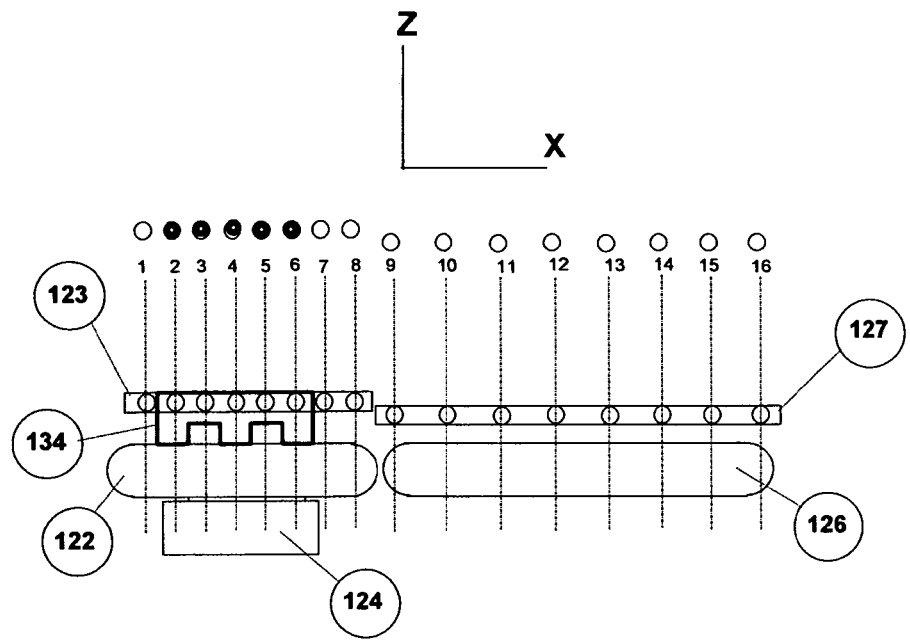

FIG. 27—Illustrates example of how an Object (134) could be detected by OFTS Sensors #2 through #6, shown as Blocked, of the Entry Module when the Object is placed on top of the Track. The OFTS Status is different from FIG. 28. This change could be one of the "X-profile" parameters associated with the Object. Remaining Figure elements are labeled same as on FIG. 23 and FIG. 24

Figure 28:
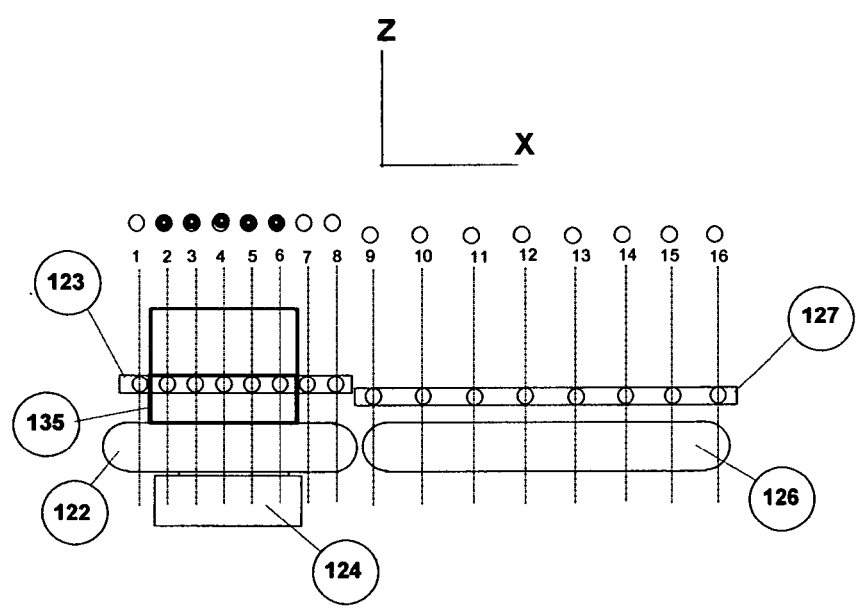

FIG. 28—Illustrates example of how an Object (135) could be detected by OFTS Sensors #2 through #6, shown as Blocked, of the Entry Module during the Object entry into the OFTS sensing area. Note, the Object is detected prior of being placed on top of the Track.

Remaining Figure elements are labeled same as on FIG. 23 and FIG. 24

FIG. 29 through FIG. 32—Illustrates examples of Object Tracking Principals, which could be used by Controller by taking data from OFTS in regard to: Object or Objects "X-profile"; Location of Object or Objects along the X-axis; Distance between Objects along "X-axis"; Speed of Objects along "X-axis", etc. and then applying an Algorithm to ensure most effective, safe and efficient transportation of Objects along the Tracks of the Transport System. The OFTS Sensor Status could be represented in binary mode by 1's and 0's, with 1's being associated with Blocked Sensors and 0's being associated with the Sensors, which are not Blocked. The Controller could be connected via hi-speed network to Host Computer. The Host Computer could have Expected Profiles of respected Objects stored in its non-volatile memory, and could provide this information to Controller, as needed. Controller could properly identify each Object by comparing its measured "X-profile" and "W-profile" to Expected, obtained from Computer. For simplicity, the Transport System could be considered as a belted Conveyor.

Figure 29:
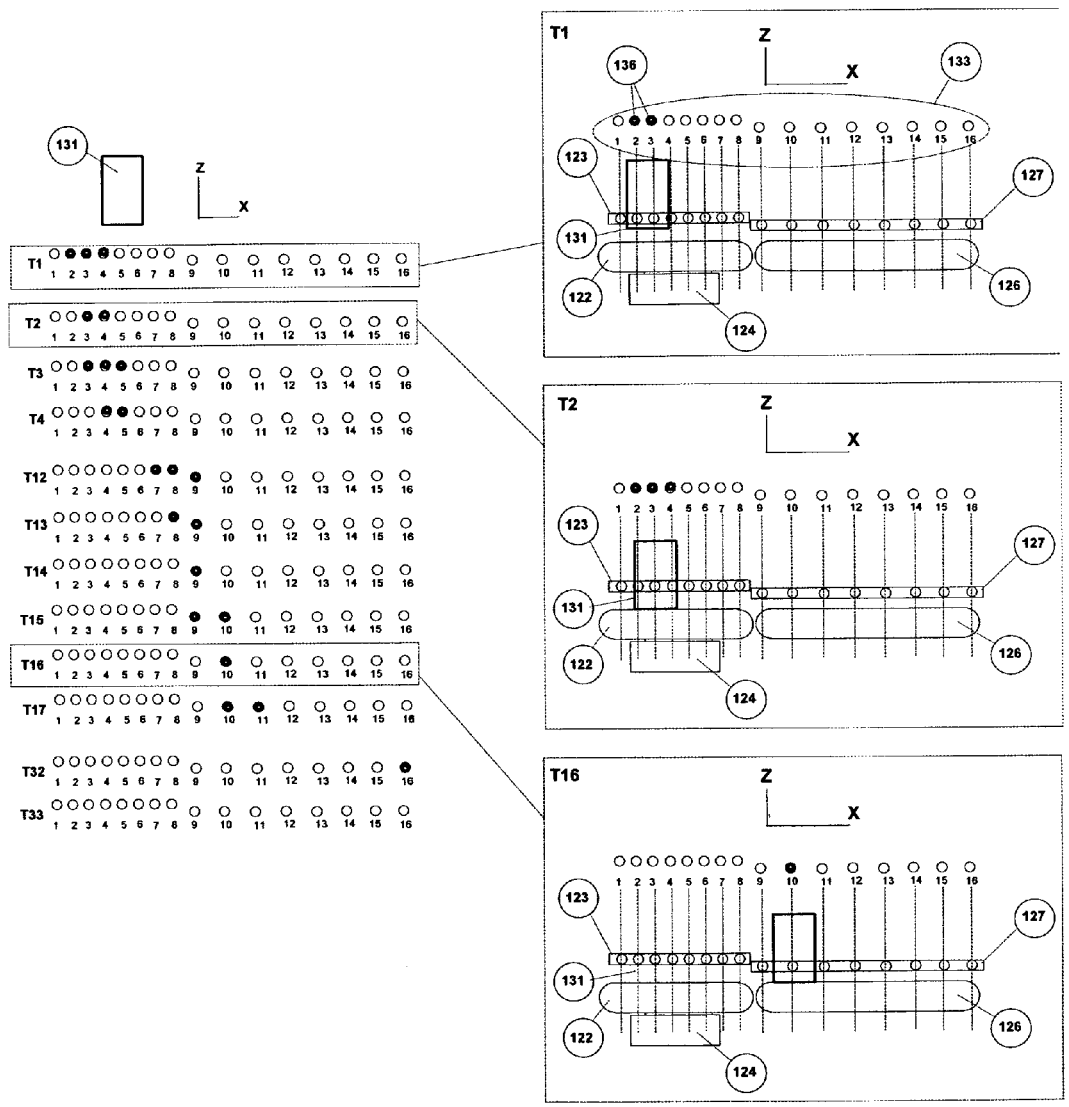

FIG. 29—Example of Object (#131) Tracking by OFTS. The Object #131, while being advanced by Transport System, could generate an "X-profile" of OFTS Statuses, which could characterize the Object. The Objects "X-profile" could be stored by Controller and then analyzed by Controller and/or PC. When this Object is introduced the next time into the Transport System, its "X-profile" could be compared to the one that was stored, and if it is within acceptable range—the Object could be accepted as the one Expected. Otherwise, the Object could be rejected.

Figure elements are labeled as follows:

T1—represents OFTS Status, which is "0111000000000000", at time-mark "T1" when Object#131 was placed on top of the Track of the Entry Module T2—represents OFTS Status at time-mark "T2" when Object #131 has moved by Transport System of the Entry Module and caused a first change of OFTS Status from "0111000000000000" to "0011000000000000"

T3—represents OFTS Status at time-mark "T3" when Object #131 has moved by Transport System of the Entry Module and caused the next change of OFTS Status from "0011000000000000" to "0011100000000000"

T4 through T33—represent OFTS Statuses at respective time-marks, at which points the Status has changed, as result of Object being advanced by Transport System.

Figure 30:
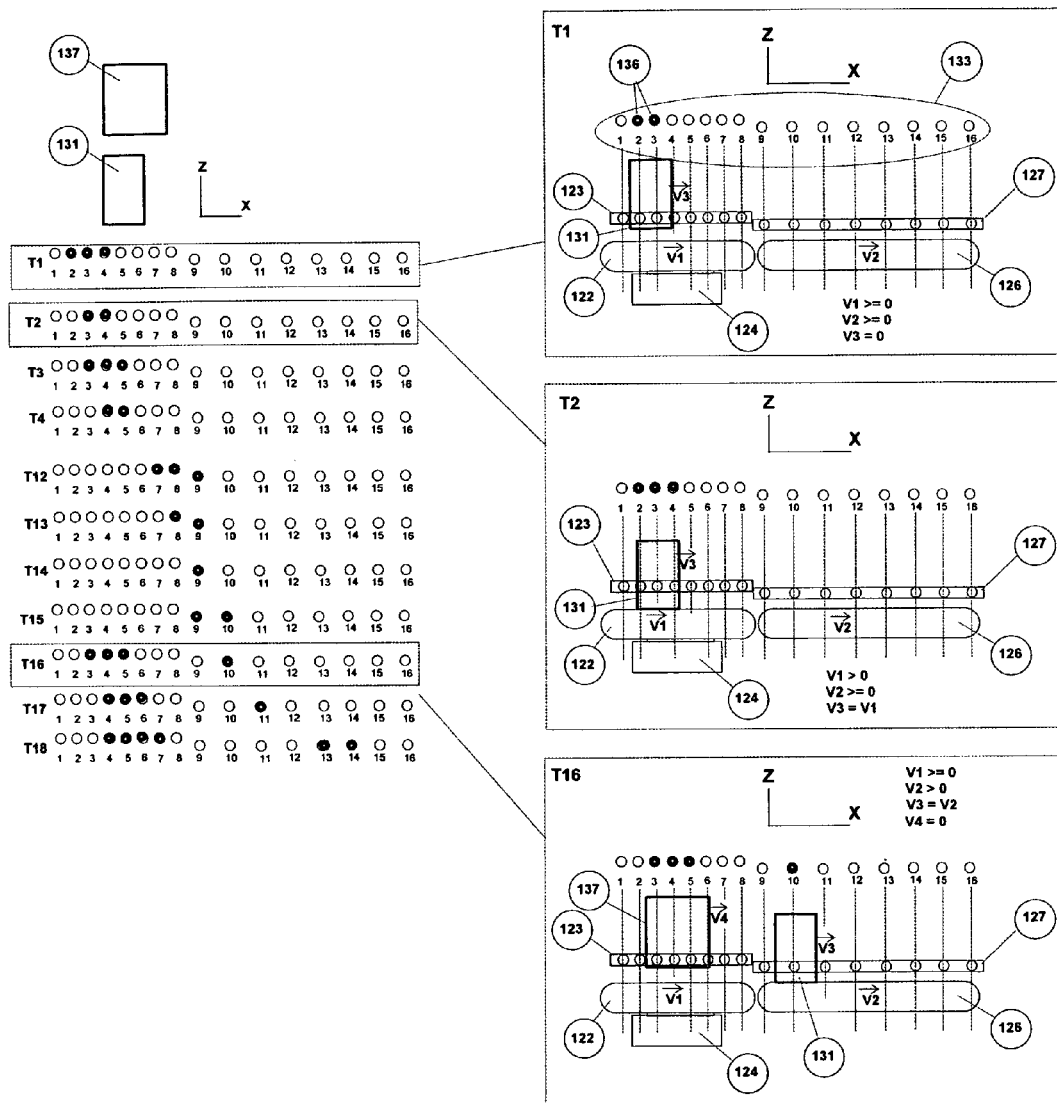

FIG. 30—Illustrates an example of OFTS Tracking Objects (131) and (137) at discrete moments of time, marked T1 through T18. For simplicity, few discrete time conditions—T1, T2 and T16 of the Objects location within Transport System and represented by OFTS status, and are shown in detail on this Figure. In this example:
  a) Object (131) and Object (137) have Non-Overlapping Expected "Weight-profile"
  b) Objects acceptance/rejection will be based on whether its respective "X-profile" is within Expected Range based on OFTS of the Entry Module only
  c) Object's (131) Expected Range of "X-profile" for Entry Module is 2 or 3, while for the Transfer Module is 1 or 2.
  d) Object's (137) Expected Range of "X-profile" for Entry Module is 3 or 4, while for the Transfer Module is 2 or 3.

NOTE: According to Expected "X-profiles" (c) and (d) above, both Objects have an Overlapping Expected "X-profile". The Controller could properly identify each Object by their Non-Overlapping "Weight-profile", as will be illustrated later in this document.

Figure elements are labeled as follows:

T1—time mark, Object (131) is in Process of being placed toward top of Entry Module Conveyor (122), and is in position, that its body has blocked OFTS Sensors 2 and 3, as pointed by (136). Remaining Sensors of the OFTS are not blocked. Entry Module Conveyor (122) could have its speed V1=0. Transfer Module Conveyor (126) could have its speed V2=0. Objects (131) speed V3=0. The Object (131) is accepted by Controller since its initial "X-profile", as two consecutively blocked Sensors, is within the Expected Range.

Since the Object was accepted, the Controller could start moving the Entry Module Conveyor.

T2—time mark, Object (131) has reached the top of Entry Module Conveyor (122), which is moving at speed V1. As shown, Object (131) in this position, blocked OFTS Sensors 2, 3 and 4. Remaining Sensors of the OFTS are not blocked. Objects (131) speed V3=V1.

The Object (131) is accepted by Controller since its verified "X-profile", as three consecutively blocked Sensors, is within the Expected Range. Since the Object was accepted, the Controller could start the Transfer Module Conveyor.

T16—time mark, Object (131) has reached the top of Transfer Module Conveyor (126), which is moving at speed V2. As shown, Object (131) in this position, blocked OFTS Sensor 10. Object (137) is in Process of being placed toward top of moving Entry Module Conveyor (122), and is in position, that its body has blocked OFTS Sensors 3, 4 and 5. Remaining Sensors of the OFTS are not blocked. Objects (131) speed V3=V2, Objects (137) speed V4=0. The Object (137) is accepted by Controller since its initial "X-profile", as three consecutively blocked Sensors, is within the Expected Range. Since the Object (137) was accepted, the Controller could continue moving the Entry Module Conveyor at speed V1.

123—OFTS section of the Entry Module

124—Scale of the Entry Module, which is shown here for reference only

127—OFTS section of the Transfer Module

Figure 31:
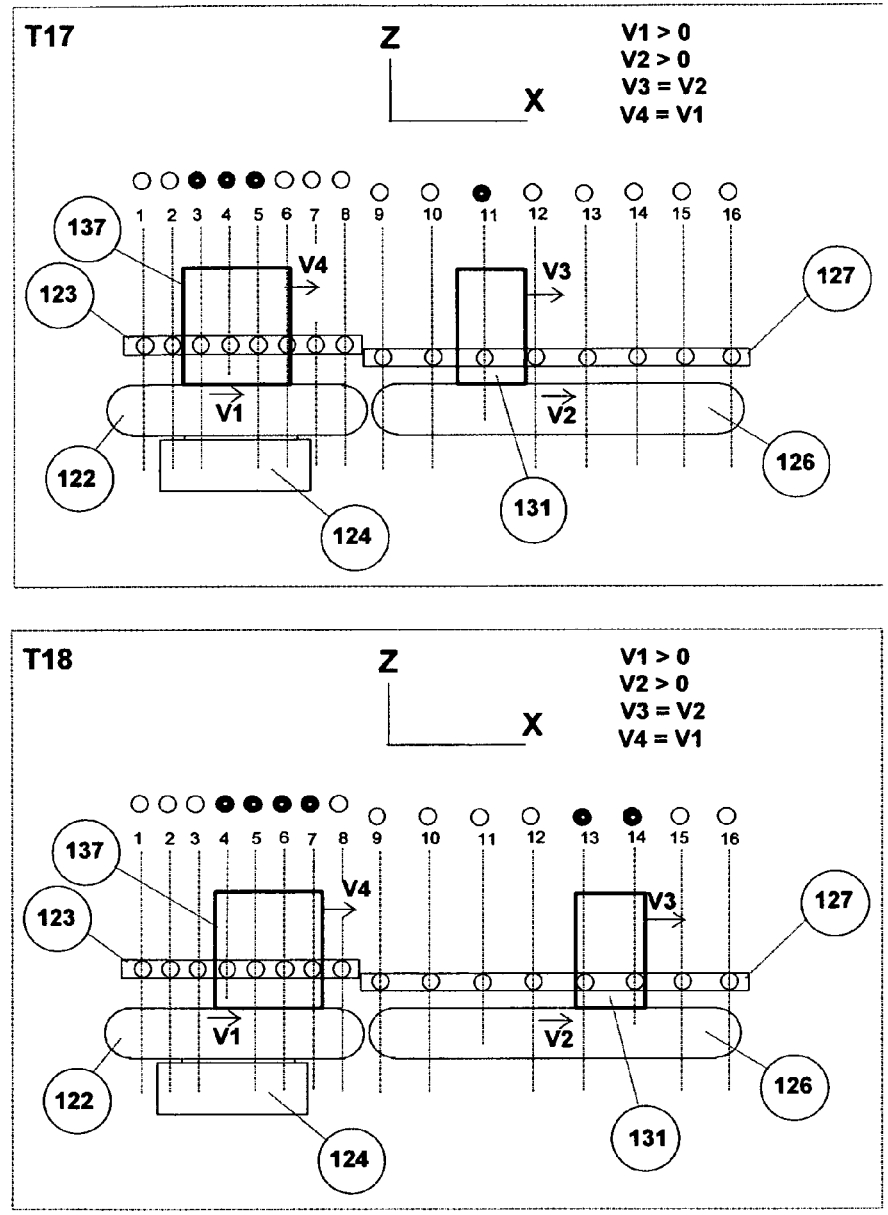

FIG. 31—is continuation of FIG. 30, and is illustrates OFTS Tracking Objects (131) and (137) at discrete moments of time, marked T17 and T18.

Figure elements are labeled as follows:

T17—time mark, Object (131) continues to move along the top of Transfer Module Conveyor (126) at speed V2. As shown, Object (131) in this position, blocked OFTS Sensor 11. Object (137) has reached the top of Entry Module Conveyor (122), and is in position, that its body has blocked OFTS Sensors 3 through 5. Remaining Sensors of the OFTS are not blocked. The Object (137) is accepted by Controller since its verified "X-profile", as three consecutively blocked Sensors, is within the Expected Range. Since the Object (137) was accepted, the Controller could continue to move the Entry Module Conveyor.

T18—time mark, Object (131) continues to move along the top of Transfer Module Conveyor (126) at speed V2. As shown, Object (131) in this position, blocked OFTS Sensors 13 and 14. Object (137), moving along the top of Entry Module Conveyor (122), and is in position, that its body has blocked OFTS Sensors 4 through 7. Remaining Sensors of the OFTS are not blocked. Both Object's "X-profiles" are within the Acceptable Range, allowing the Controller to move them along the Track at the most efficient speeds. Remaining elements are labeled same as on FIG. 30.

Figure 32:
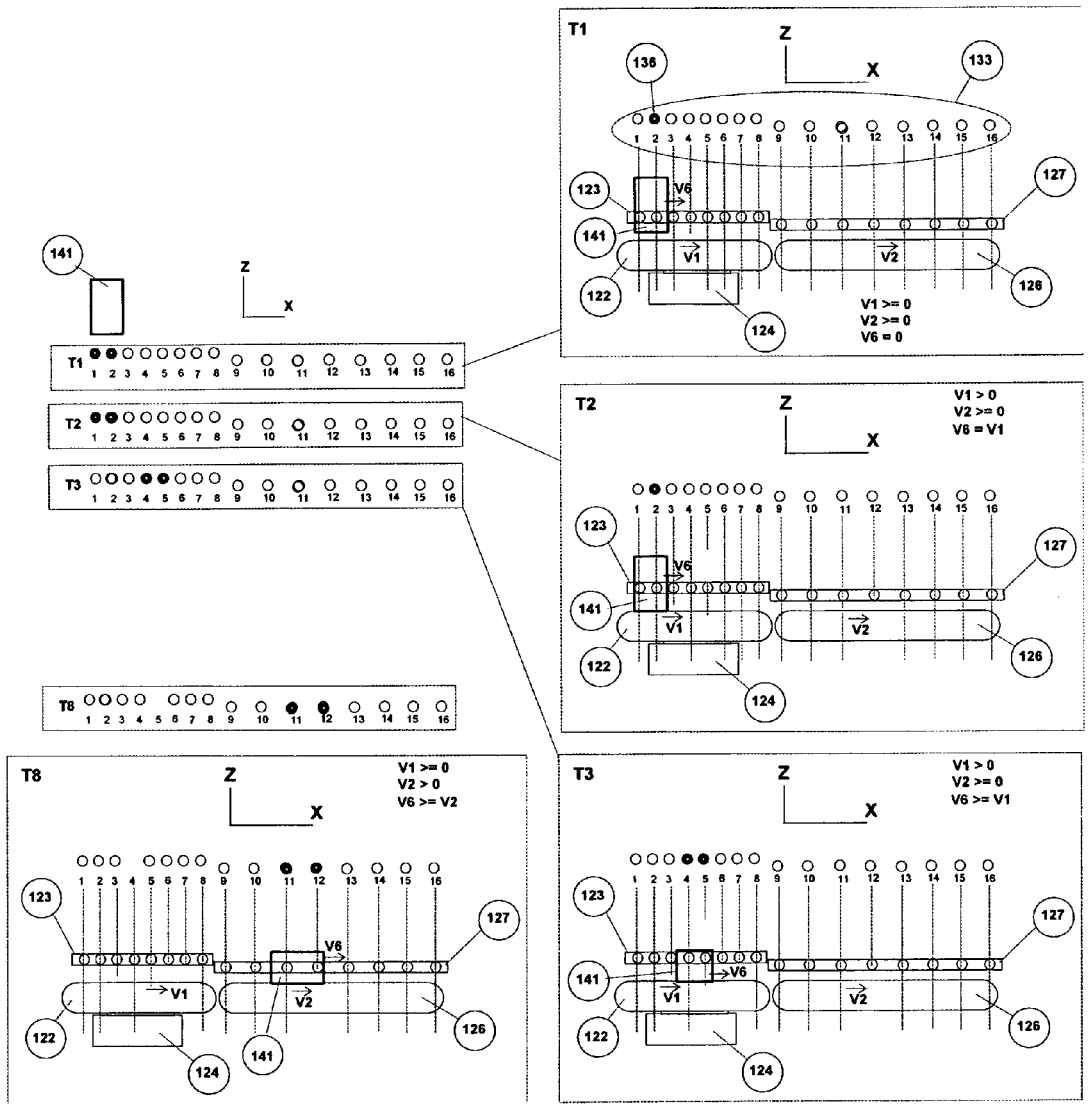

FIG. 32—Illustrates an example of OFTS Tracking of Object (141), which could flip over and roll, while being on top of a moving Conveyor. An example of Object (141) could be a small water bottle. In this example:
  a) Object (141) acceptance/rejection will be based on whether its respective "X-profile" is within Expected Range based on OFTS of the Entry Module only
  b) Object's (141) Expected Range of "X-profile" for Entry and Transfer Modules is 1 or 2.

Figure elements are labeled as follows:

T1—time mark, Object (141) is in Process of being placed toward top of Entry Module Conveyor (122), and is in position, that its body has blocked OFTS Sensor 2, as pointed by (136). Remaining Sensors of the OFTS are not blocked. Entry Module Conveyor (122) could have its speed V1=0. Transfer Module Conveyor (126) could have its speed V2=0. Objects (141) speed V6=0. The Object (141) is accepted by Controller since its initial "X-profile", as one blocked Sensor, is within the Expected Range. Since the Object was accepted, the Controller could start moving the Entry Module Conveyor.

T2—time mark, Object (141) is on top of Entry Module Conveyor (122), and is in position, that its body has blocked OFTS Sensor 2. Remaining Sensors of the OFTS are not blocked. Objects (141) speed V6=V1. The Object (141) is accepted by Controller since its verified "X-profile", as one blocked Sensor, is within the Expected Range. As result, Controller could start moving the Transfer Module Conveyor at speed V2.

T3—time mark, Object (141) has flipped over on top of Entry Module Conveyor (122), and is in position, that its body has blocked OFTS Sensor 4. Remaining Sensors of the OFTS are not blocked. Objects (141) Speed V6 could be >=V1, since Object (141) in this position could roll down the Conveyor. The Object (141) is accepted by Controller since its verified "X-profile", as one blocked Sensor, is within the Expected Range.

T8—time mark, Object (141) has reached the top surface of the Transfer Module Conveyor, and continues to roll along its Track at Speed V6>=V2. In position shown, its body has blocked OFTS Sensor 12. Remaining Sensors of the OFTS are not blocked.

NOTE: Since there is no other Objects on the Track, Controller could only focus on safe transportation of Object (141), making sure the Object is not stocked, or is not moving at a Speed considered above the set limit. Remaining elements are labeled same as on FIG. 30.

FIG. 33 through FIG. 36—Illustrates abilities of IMTS Controller via OFTS to detect Violations, which could include detection of Unexpected Object(s) landed on top of Entry Module and/or Transfer Module Tracks. When Violation is detected, depending on the level of the Violation severity, Controller could perform any or all of the following:

a) Inform the Host Computer via hi-speed network, and await for further instructions
b) Inform the business supervisor via visual and/or audible signals, and await for further instructions
c) Directly execute an appropriate warning or emergency routine, which could include: stoppage of Transport System(s), turning off Traffic Light(s), etc.

Figure 33:
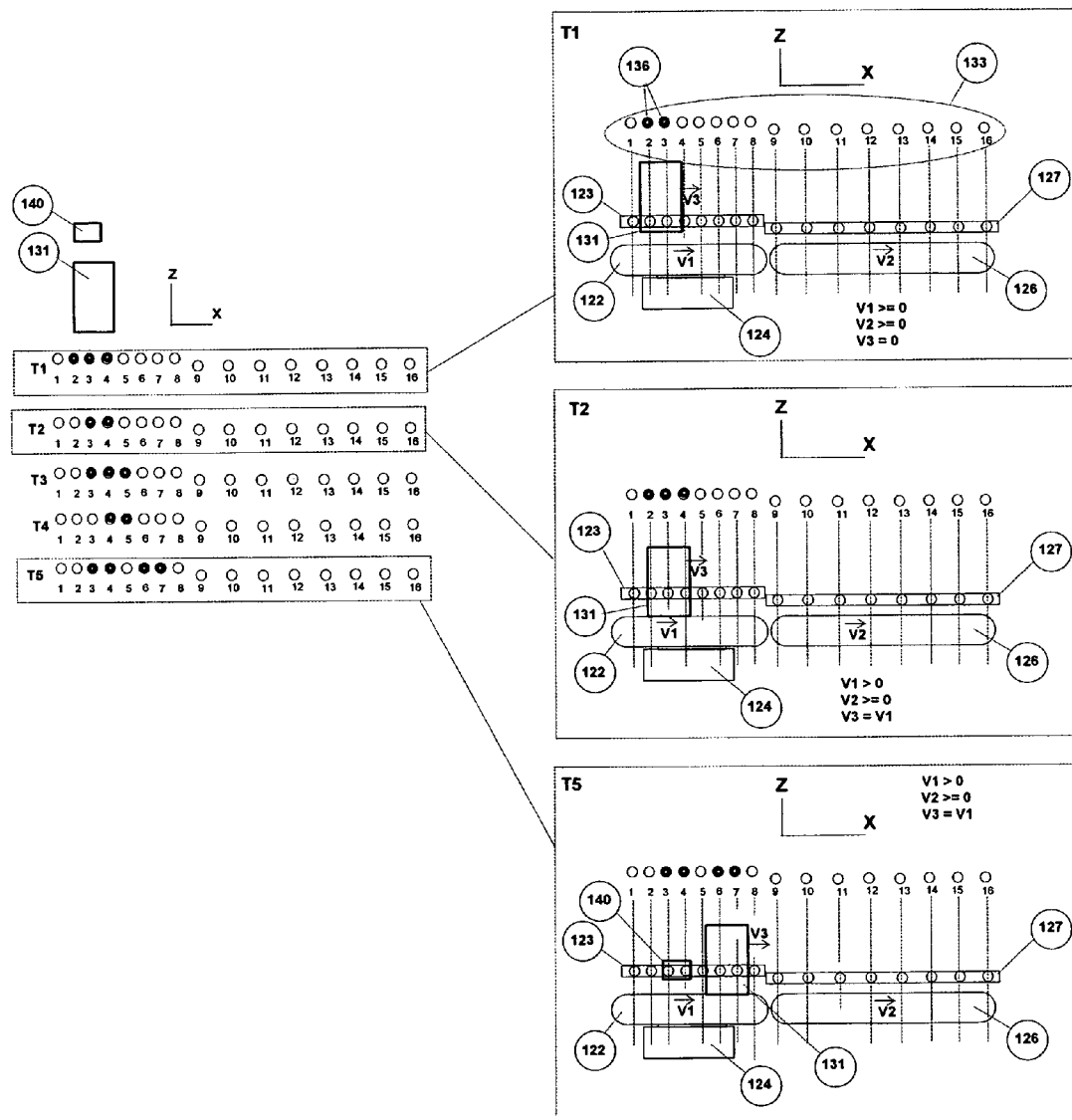

FIG. 33—Illustrates an example of OFTS Tracking Object (131), with Unexpected Object (140) being detected by Controller via OFTS immediately at its point of entry into IMTS.

Figure elements are labeled as follows:

T1—time mark, Object (131) is in Process of being placed toward top of Entry Module Conveyor (122), and is in position, that its body has blocked OFTS Sensors 2 and 3, as pointed by (136). Remaining Sensors of the OFTS are not blocked. Entry Module Conveyor (122) could have its speed V1=0. Transfer Module Conveyor (126) could have its speed V2=0. Objects (131) speed V3=0. The Object (131) is accepted by Controller since its initial "X-profile", as two consecutively blocked Sensors, is within the Expected Range. Since the Object was accepted, the Controller could start moving the Entry Module Conveyor.

T2—time mark, Object (131) has reached the top of Entry Module Conveyor (122), which is moving at speed V1. As shown, Object (131) in this position, blocked OFTS Sensors 2, 3 and 4. Remaining Sensors of the OFTS are not blocked. Objects (131) speed V3=V1.

The Object (131) is accepted by Controller since its verified "X-profile", as three consecutively blocked Sensors, is within the Expected Range. Since the Object was accepted, the Controller could start the Transfer Module Conveyor.

T5—time mark, Object (131) has advanced along the Track by Entry Module Conveyor (122), which is moving at speed V1. As shown, Object (131) blocked Sensors 6 and 7, confirming its acceptance. At about the same time, Unexpected Object (140) is detected entering OFTS of the Entry Module by blocking Sensors 3 and 4. As soon as this Violation is detected, Controller, as instructed, could stop both Conveyors from advancing, and inform respective authority of detected Violation.

Remaining elements are labeled same as on FIG. 29 through FIG. 32.

Figure 34:
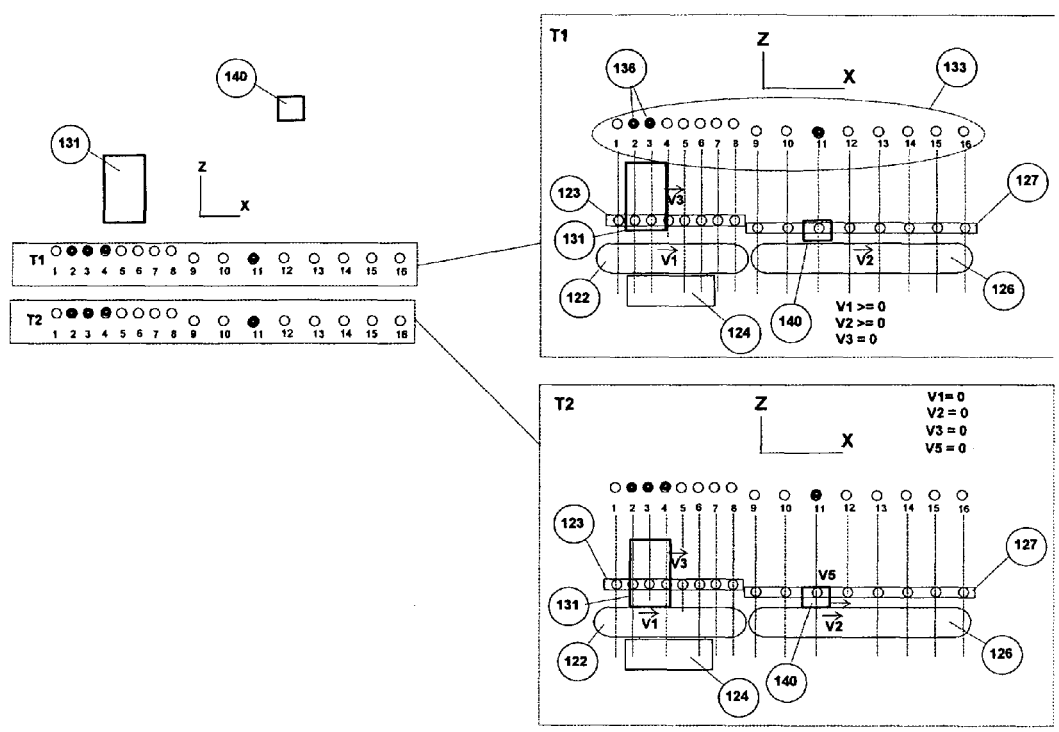

FIG. 34—Illustrates another example of OFTS Tracking Object (131), with Unexpected Object (140) being detected by Controller via OFTS immediately at its point of entry into IMTS.

Figure elements are labeled as follows:

T1—time mark, Object (131) is in Process of being placed toward top of Entry Module Conveyor (122), and is in position, that its body has blocked OFTS Sensors 2 and 3, as pointed by (136). At about the same time, Unexpected Object (140) is detected entering OFTS of the Transfer Module by blocking Sensor 11. Remaining Sensors of the OFTS are not blocked. As soon as this Violation is detected and confirmed by Controller, the Controller, as instructed, could stop both Conveyors from advancing, and inform respective authority of detected Violation.

T2—time mark, Object (131) is on top of Entry Module Conveyor (122) blocking Sensors 2 and 3, and Unexpected Object (140) is on top of Transfer Module Conveyor (126) blocking Sensor 11. Both Conveyors are stopped by Controller, awaiting further instructions, which could be provided manually by attendant, or remotely by supervisor, via Computer connected via hi-speed network to Controller. Remaining elements are labeled same as on FIG. 33.

Figure 35:
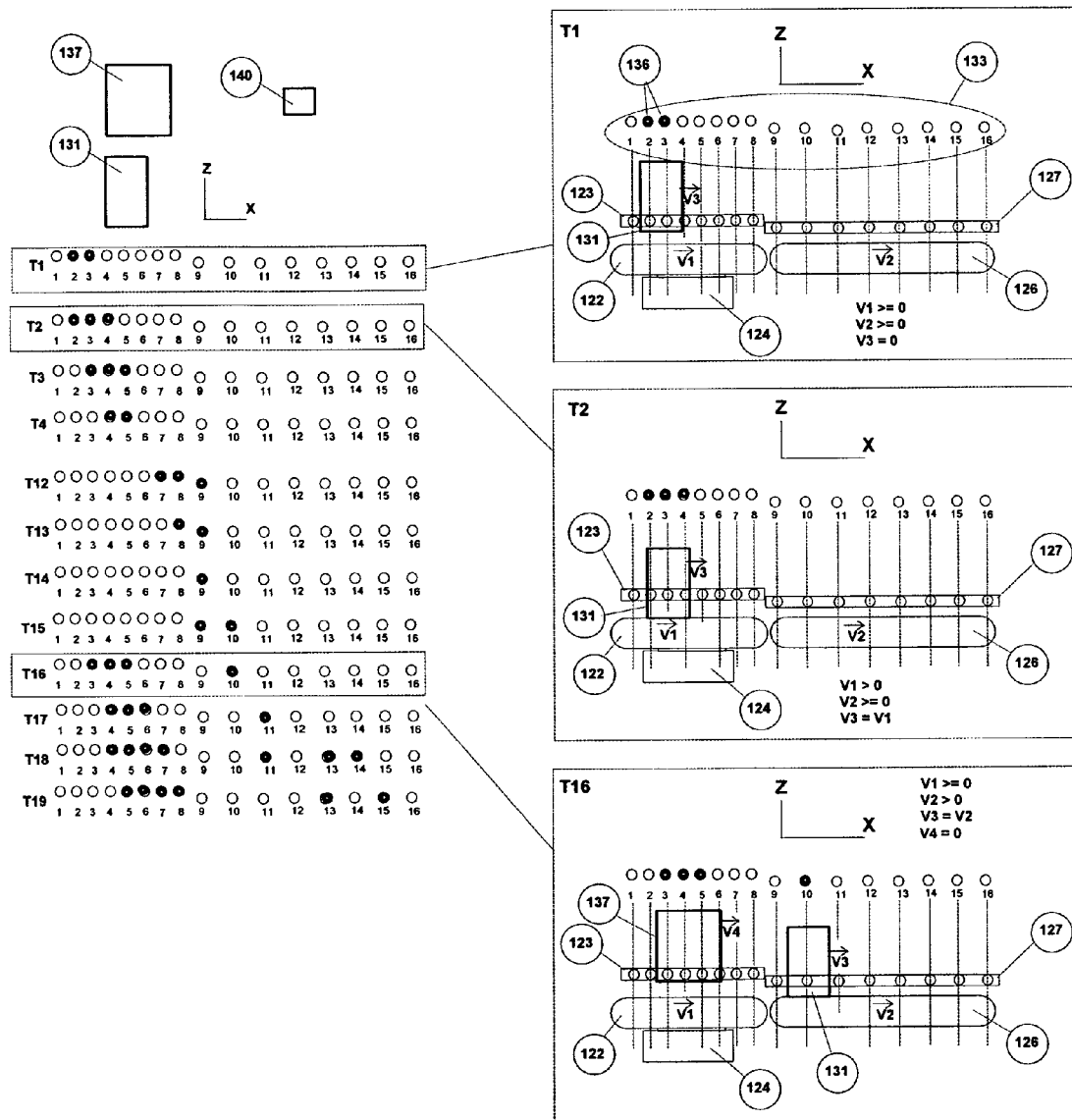

FIG. 35—Illustrates another example of OFTS detecting and reporting to Controller presence of an Unexpected Object, immediately at its point of entry into IMTS.

Figure elements are labeled as follows:

T1—time mark, Object (131) is in Process of being placed toward top of Entry Module Conveyor (122), and is in position, that its body has blocked OFTS Sensors 2 and 3, as pointed by (136). Remaining Sensors of the OFTS are not blocked. The Object (131) is accepted by Controller since its initial "X-profile", as two consecutively blocked Sensors, is within the Expected Range. Since the Object was accepted, the Controller could start moving the Entry Module Conveyor.

T2—time mark, Object (131) has reached the top of Entry Module Conveyor (122), which is moving at speed V1. As shown, Object (131) in this position, blocked OFTS Sensors 2, 3 and 4. Remaining Sensors of the OFTS are not blocked. Objects (131) speed V3=V1.

The Object (131) is accepted by Controller since its verified "X-profile", as three consecutively blocked Sensors, is within the Expected Range. Since the Object was accepted, the Controller could start moving the Transfer Module Conveyor.

T16—time mark, Object (131) has advanced along the Track by Entry and Transfer Module Conveyors. As shown, Object (131), moving at speed V3=V2, blocked Sensor 10. At about the same time, Expected Object (137) is detected entering OFTS of the Entry Module by blocking Sensors 3, 4 and 5. Objects (137) speed V4=0. Remaining Sensors of the OFTS are not blocked. The Object (137) is accepted by Controller since its detected "X-profile", as three consecutively blocked Sensors, is within the Expected Range.

Figure 36:
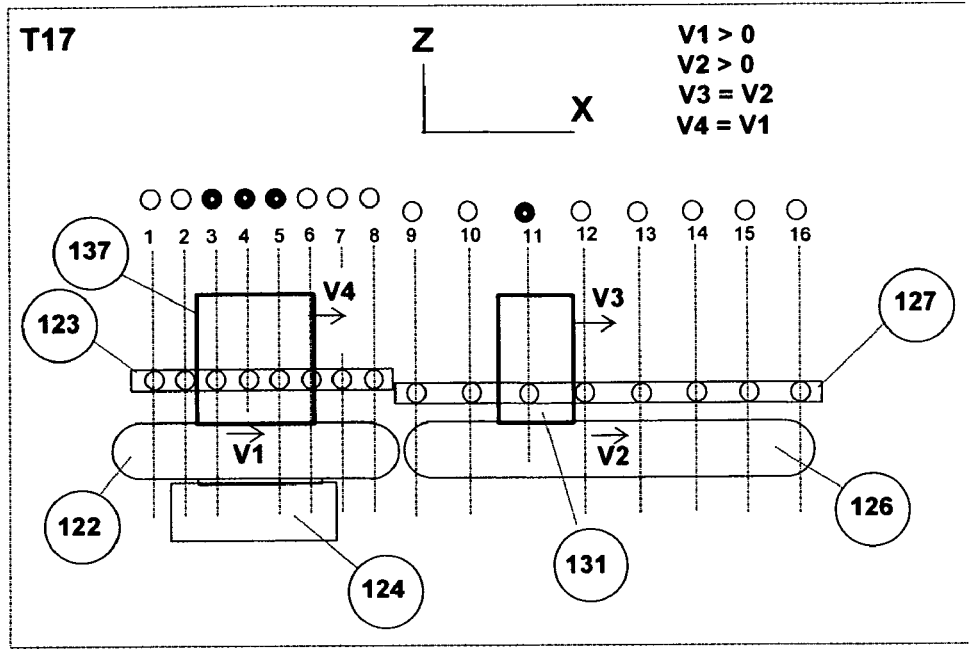
Figure 36:
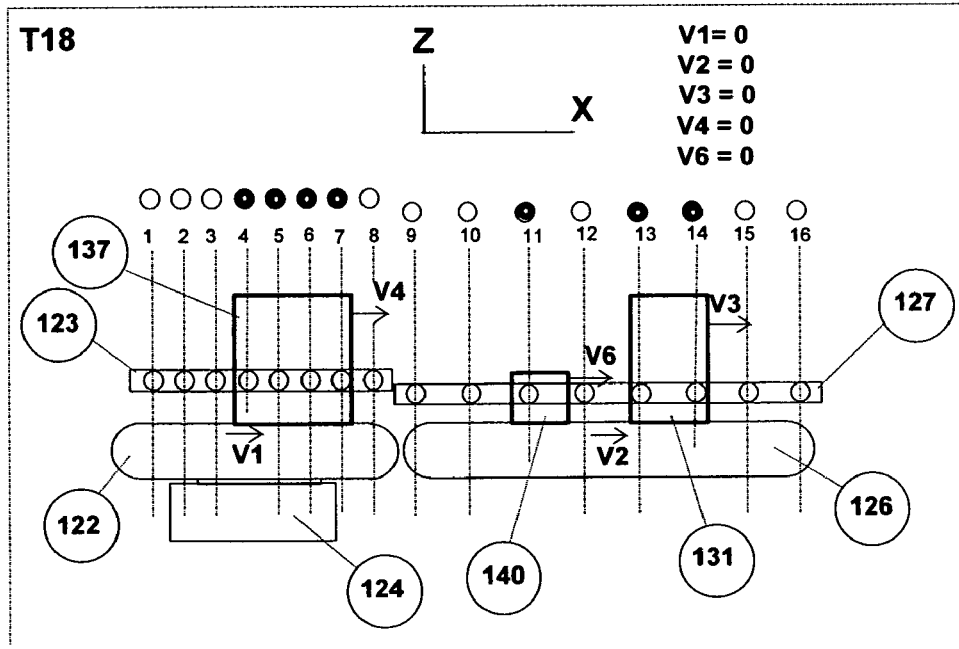

FIG. 36—continuation of Process described on FIG. 35.

Figure elements are labeled as follows:

T17—time mark, Object (137) has reached the top of Entry Module Conveyor (122), which is moving at speed V1. As shown, Object (137) in this position, blocked OFTS Sensors 3, 4 and 5. As shown, Object (131), moving at speed V3=V2, blocked Sensor 11. Remaining Sensors of the OFTS are not blocked. The Object (137) acceptance is confirmed by Controller since its detected "X-profile", as three consecutively blocked Sensors, is within the Expected Range.

T18—time mark, Object (131) moved along the Track on top of Transfer Module Conveyor (126), and is in position, that its body has blocked OFTS Sensors 13 and 14. Object (137) moved along the Track on top of Entry Module Conveyor (123), and is in position, that its body has blocked OFTS Sensors 4, 5, 6 and 7. At about the same time, Unexpected Object (140) is detected entering OFTS of the Transfer Module by blocking Sensor 11. Remaining Sensors of the OFTS are not blocked. As soon as this Violation is detected and confirmed by Controller, the Controller, as instructed, could stop both Conveyors from advancing, and could inform respective authority of detected Violation.

Remaining elements are labeled same as on FIG. 31.

Figure 37:
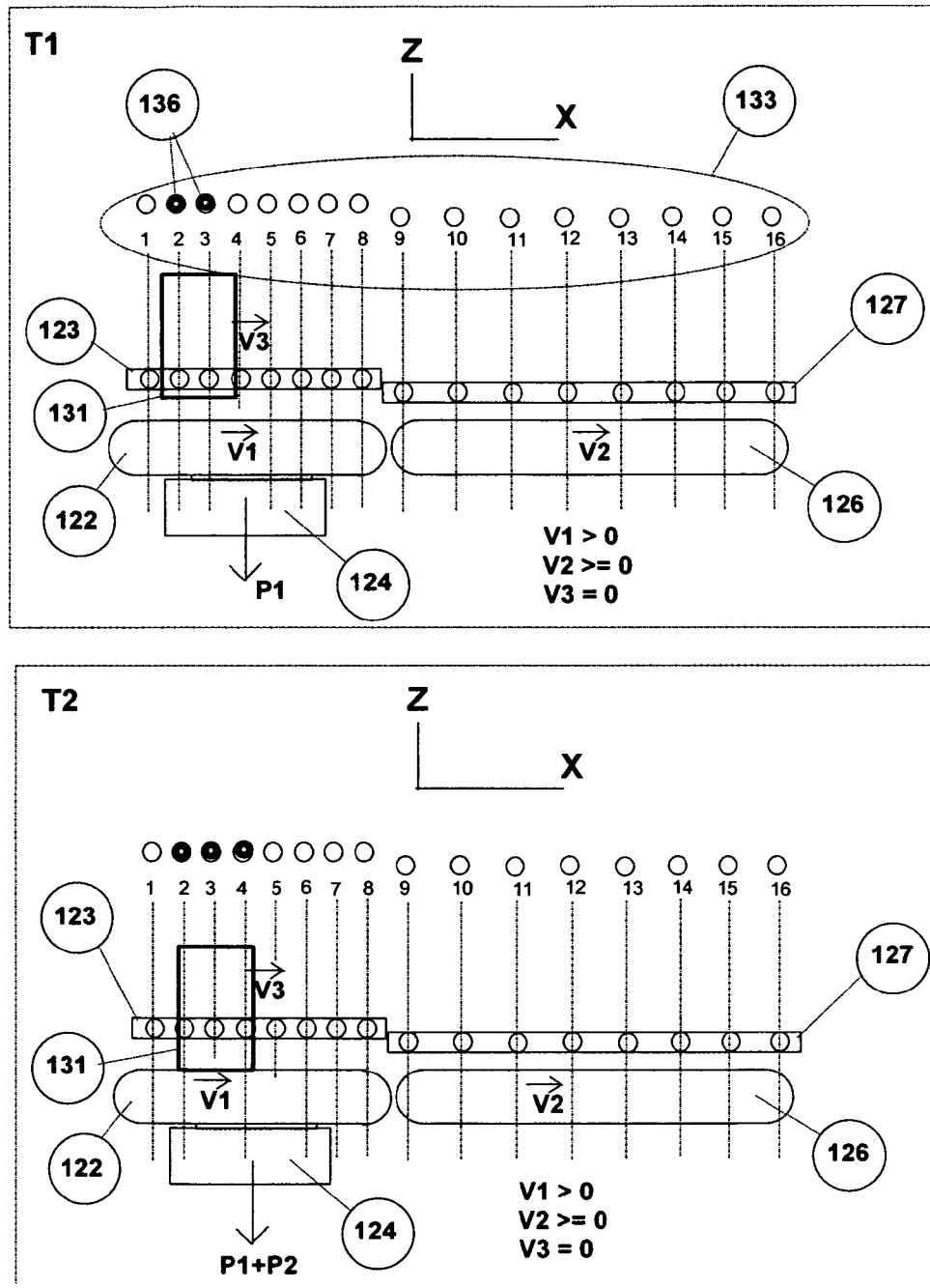
Figure 38:
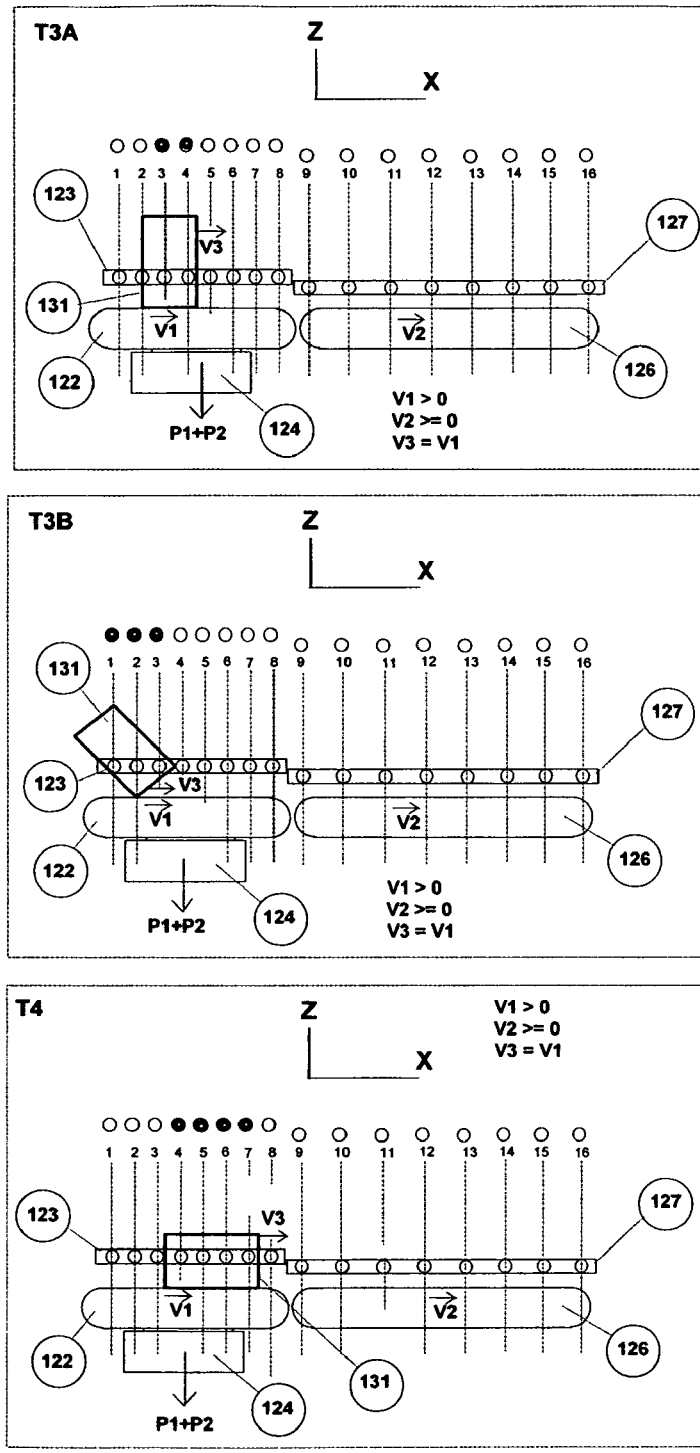
Figure 39:
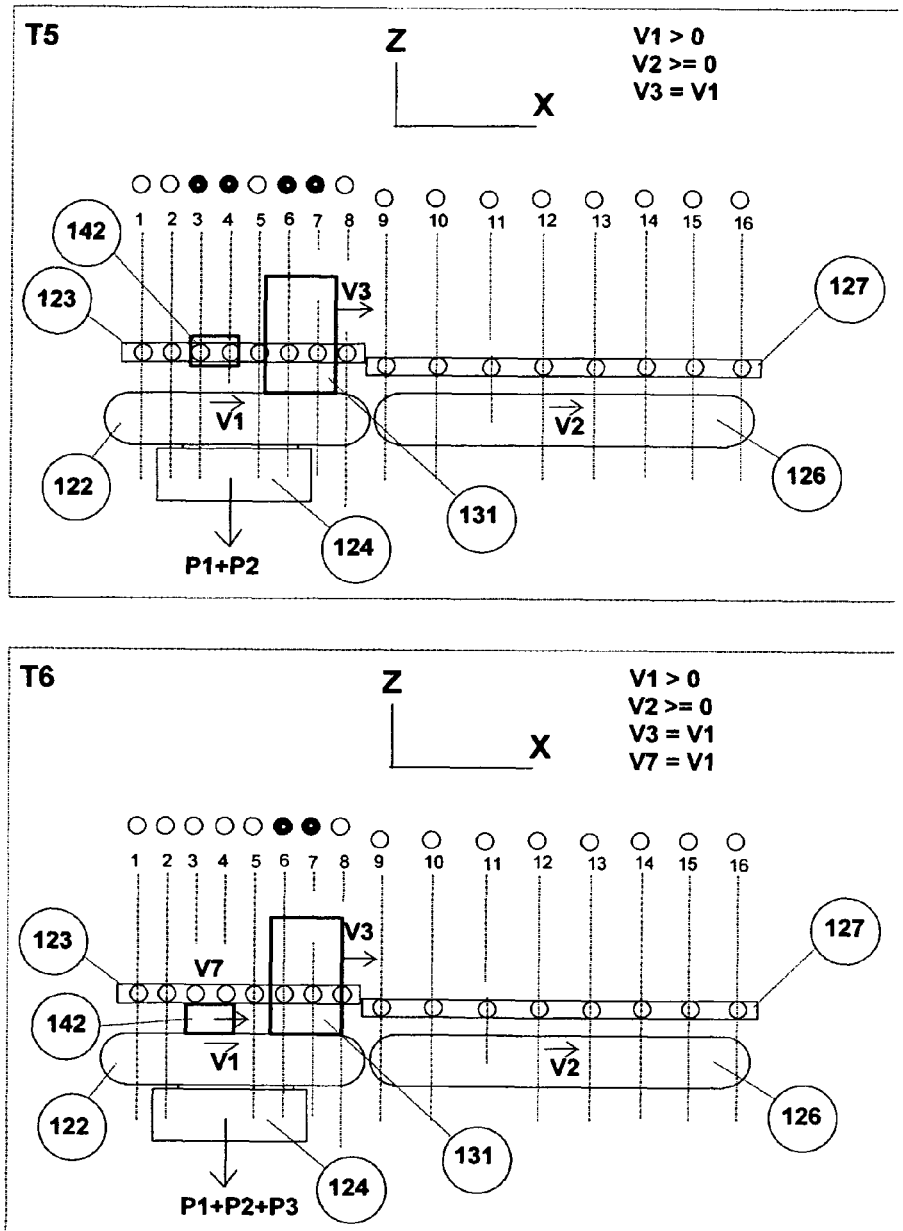

FIG. 37 through FIG. 39—Illustrates Object Behavioral Detection Principals, which could be used by IMTS Controller via OFTS (133) and Scale (124) components of the Entry Module to perform effectively Dynamic Object Recognition, or Object Behavioral Recognition with an Objective to achieve maximum throughput of Transactions through IMTS, while sustaining required level of security and safety. In illustrated examples, to maximize throughput, IMTS Controller could start moving the Entry Module Conveyor as soon as an Objects barcode is scanned into the System, which could happen before the Object is actually placed on top of the Entry Module Conveyor. The presence of OFTS makes IMTS Controller and Host Computer significantly more informed of Activities within IMTS, and as result, make the proper decisions more accurately within shortest time possible, which is one of the biggest advantages compared to existing Systems. In this example:

a) Objects acceptance/rejection will be based on whether its respective "X-profile", obtained via OFTS (133), and its "Weight-profile", obtained via Scale (124), both are within their respective Expected Range b) Object's (131) "X-profile", established based on previous Transactions of this Object, for Entry Module is 2, 3 or 4, while for the Transfer Module is 1, 2 or 3 consecutively blocked Sensors c) Object's (131) Expected Range of "Weight-profile", established based on previous Transactions of this Object, is P2±3%, with a Bouncing Effect of ±10%, d) Scales (124) reading of weight without any Object placed on top of its Conveyor, is equal P1 e) Object's (131), based on previous Transactions, could be placed on top of moving Conveyor of the Entry Module, and as result, could flip along the "X-axis", without any danger of causing damage to the Object itself, or the System f) Object's (142) "X-profile", established based on previous Transactions of this Object, for Entry Module is 1 or 2 consecutively blocked Sensors, while for the Transfer Module is 1 blocked Sensor g) Object (142) is based on previous Transactions, could be considered as Low-profile, which could be detected by OFTS at the time of being placed on top of Entry Module Conveyor, and then Tracked by OFTS at Transition Points, which are not shown for simplicity h) Object's (142) Expected Range of "Weight-profile", established based on previous Transactions of this Object, is P3±3%, with a Bouncing Effect of ±3%, i) Scales (124) reading of weight without any Object placed on top of its Conveyor, is equal P1

FIG. 37—Illustrates Controller Tracking of Object (131) via OFTS (133) for Objects "X-profile" and Scale (124) for Objects "Weight-profile". The illustrated example also includes the case when Object (131), due to sudden acceleration at the time of reaching the top of the Entry Module Conveyor, falls backward along the "X-axis".

Figure elements are labeled as follows:

T1—time mark, Object (131) is in Process of being placed toward top of moving Entry Module Conveyor (122), and is in position, that its body has blocked OFTS Sensors 2 and 3, as pointed by (136). Remaining Sensors of the OFTS are not blocked. The Objects (131) is accepted by Controller, since its initial "X-profile", as two consecutively blocked Sensors, is within the Expected Range.

T2—time mark, Object (131) has just reached the top of Entry Module Conveyor (122), which is moving at speed V1. As shown, Object (131) in this position, blocked OFTS Sensors 2, 3 and 4. Remaining Sensors of the OFTS are not blocked. Objects (131) speed V3=0.

The Object (131) is accepted by Controller since its verified "X-profile", as three consecutively blocked Sensors, and it's measured via Scale (124) initial "Weight-profile" equal to P2, are both within their respective Expected Range. Since the Object was accepted, the Controller could start moving the Transfer Module Conveyor. At this point, Object (131) could experience a sudden force in direction of "X-axis" applied through friction between the bottom of Object (131) and respective top section of the moving Conveyor (122) it is directly positioned over. During acceleration of Object (131) toward the speed of Conveyor (122), the Object could either maintain its position, as shown by time mark—T3A, or fall backward, as shown on time mark—T3B, as shown on FIG. 38.

FIG. 38—illustrates continuation from FIG. 37 of Object (131) Tracking by Controller, using OFTS and Scale components of IMTS.

Figure elements are labeled as follows:

T3A—time mark, Object (131) has just started to accelerate to reach speed V3=V1.

Object (131) was able to maintain its vertical position, and was advanced a short distance along the Track by Entry Module Conveyor (122). As shown, Object (131) in this position, blocked OFTS Sensors 3 and 4. Remaining Sensors of the OFTS are not blocked. The Object (131) is accepted by Controller since its verified "X-profile", as two consecutively blocked Sensors, and its measured via Scale (124) second reading of the "Weight-profile" are both within their respective Expected Range.

T3B—time mark, Object (131) has just started to accelerate to reach speed V3=V1. Object (131) was not able to maintain its vertical position, and while moving a short distance along the Track, started to fall backward along "X-axis". As shown, Object (131) in this position, blocked OFTS Sensors 1, 2 and 3. Remaining Sensors of the OFTS are not blocked. The Object (131) is accepted by Controller since its verified "X-profile", as three consecutively blocked Sensors, and its measured via Scale (124) second reading of the "Weight-profile" are both within their respective Expected Range.

T4—time mark, following the case described by time mark T3B above. Object (131), has advanced along the Track and just reached its horizontal position on the top of moving Conveyor (122). Object (131) in this position, blocked OFTS Sensors 4, 5, 6 and 7. Remaining Sensors of the OFTS are not blocked.

The Object (131) is accepted by Controller since it's:
a) Verified "X-profile", as four consecutively blocked Sensors, is within Expected Range, and
b) Obtained from Scale (124) readings of the "Weight-profile", including Bouncing Effect as result of the Object falling backward are both within their respective Expected Range.

Remaining elements are labeled same as on FIG. 29 through FIG. 32.

FIG. 39—illustrates continuation from FIG. 37 of Object (131) Tracking by Controller, using OFTS and Scale components of IMTS, when Controller detects an un-Expected LoW-profile Object (142) placed on top of Entry Module Conveyor (122), which could be result of an Expected activity, or a Violation.

Figure elements are labeled as follows:

T5—time mark, Object (131) has advanced along the Track on the top of moving Conveyor (122). Object (131) in this position, blocked OFTS Sensors 6 and 7. At about the same time, another Object (142), Expected by Controller, was detected by OFTS prior to the Object_(142) reaching the top of the Entry Module Conveyor (122). As shown, Object (142) in this position, blocked OFTS Sensors 3 and 4. Remaining Sensors of the OFTS are not blocked.

The Object (131) is accepted by Controller since it's:
a) Verified "X-profile", as two consecutively blocked Sensors, is within Expected Range, and
b) Obtained from Scale (124) readings of the Object's "Weight-profile" of P2 are both within their respective Expected Range. The Object (142) is accepted by Controller since its initial "X-profile", as two consecutively blocked Sensors, is within Expected Range.

T6—time mark, Object (131) advanced along the Track on the top of moving Conveyor (122), and in its new position, blocked OFTS Sensors 6 and 7. Object (142) has reached the top of the Entry Module Conveyor (122). While Object's (131) speed V3=V1, Object's (142) speed V7 is presumed to be equal to V1, since its LoW-profile is not "visible" by OFTS at this point. Controller, based on speed of the Entry Module Conveyor (122), could estimate the maximum time required for Object (142) to be detected by OFTS at the next Transition Point between Entry and Transfer Module Conveyors, which is not shown here for simplicity. The Object (131) is accepted by Controller since it's:
a) Verified "X-profile", as two consecutively blocked Sensors, is within Expected Range, and
b) Obtained from Scale (124) readings of the combined "Weight-profile" of both Object (131) and Object (142) are within Expected Range, which is P2+P3

Remaining elements are labeled same as on FIG. 38.

FIG. 40 through FIG. 45—Illustrates abilities of IMTS Controller via OFTS (133) and Scale (124) components of the Entry Module to perform effectively Dynamic Traffic Management of Objects being Processed through, per respective Active Transactions. The main Objective of the Dynamic Traffic Management could include maintaining Objects Quality, which they had, prior to being introduced into IMTS, while achieving maximum throughput of Transactions through IMTS. As shown in this example, IMTS consists of four Modules, represented for simplicity by their main components: Entry Conveyor (122) and Scale (124), Transfer Conveyor (126) with its OFTS (127), Exit Conveyor (146) with its OFTS (145), and OFTS of Pick-up Module (147). Addition of Exit Conveyor (146), could allow Controller to achieve the most effective Dynamic Traffic Management by executing Algorithm, which could among other parameters, vary the speed of each Conveyor, as needed, to achieve required Object separation. It is important to emphasize, that Customers in time, based on previous experiences with this and other Systems, will follow directions presented by IMTS, since it will deliver the most reliable and efficient service to them.

For simplicity, all Objects are:
a) Placed by one Customer per respective directions from Main Traffic Light (3) and per respective instructions displayed on Monitor (157)
b) Considered as accepted by the Controller per respective Object Dynamic Behavioral parameters, established for each Object by Controller via OFTS (143) and Scale (124)
c) Objects, in proportion to real size of respective Conveyors, are shown much larger that most Objects are in any given business. As result, the illustrated Transactions by one Customer in reality would occupy significantly smaller area of the IMTS Track.

Also, the Pick-up Module could have Rollers (160) instead of a steady surface, which could gradually advance an Object further down the Track under the kinetic energy the Object retained at the Transition location between Exit and Pick-up Modules.

Figure 40:
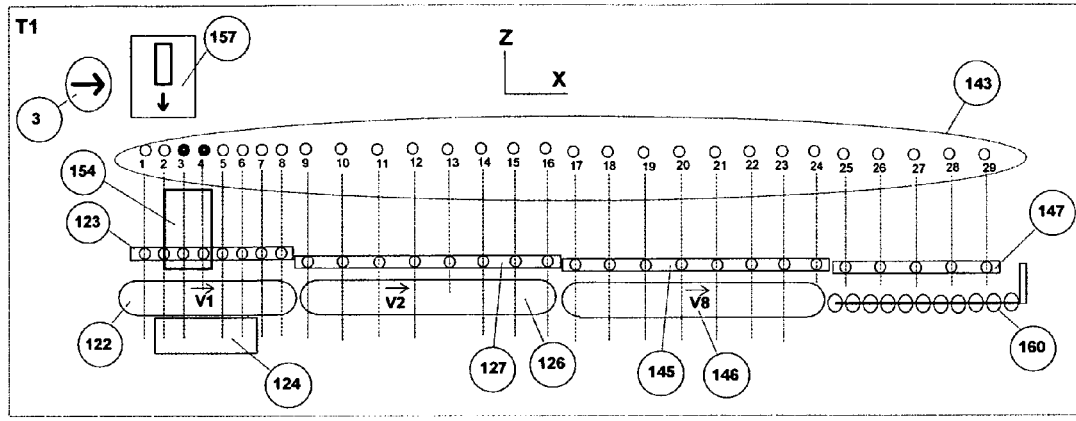

FIG. 40—Illustrates introduction of the 1-st Object (154) into OFTS section of the Entry Module Figure elements are labeled as follows:

T1—time mark, reflecting:
a) Traffic Light (3) arrow is pointing toward placing the Object
b) Respective placement Instructions are displayed on Monitor
c) Object (154) just entered the OFTS section of the Entry Module
d) Entry Module Conveyor could be moving at the speed of V1.

Figure 41:
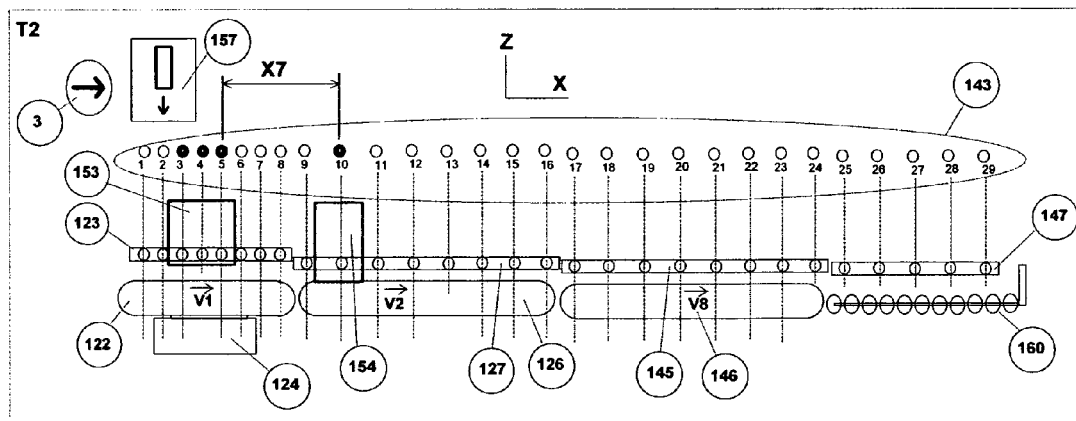
Figure 42:
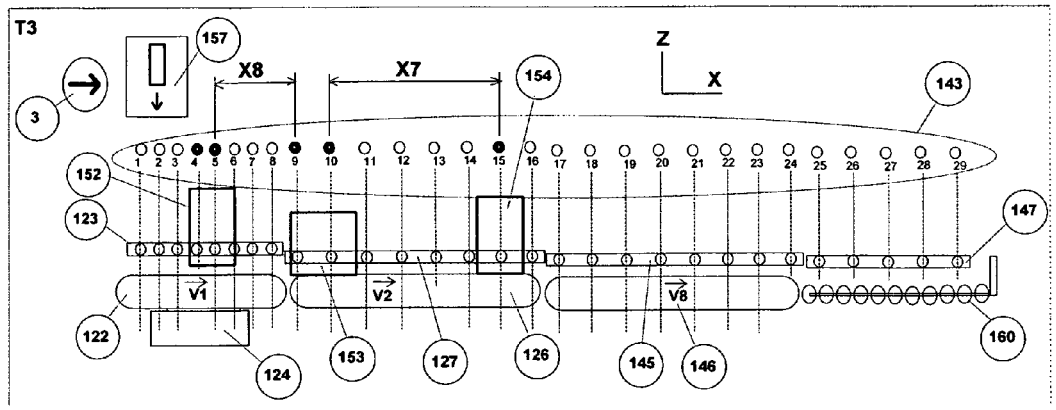

FIG. 41—Illustrates introduction of the 2-nd Object (153) into OFTS section of the Entry Module, while the Object (154) has advanced along the Track Figure elements are labeled as follows:

T2—time mark, reflecting:
a) Object (154) moving on top of Transfer Conveyor (126) at speed V2, as Object (153), per respective instructions displayed on Monitor (157) and directions provided by Main Traffic Light (3), has just entered the OFTS section of the Entry Module.
b) Entry Module Conveyor could be moving at the speed of V1, while Transfer Conveyor could be moving at speed V2, greater than V1, to achieve required separation at the Transition location between Entry and Transfer Modules
c) The measured distance in-between Objects (154) and (153)—X7, measured in OFTS terms of unblocked Sensors, is equal to four FIG. 42—Illustrates introduction of the 3-rd Object (152) into OFTS section of the Entry Module, while the Objects (154) and (153) have advanced along the Track Figure elements are labeled as follows:

T3—time mark, reflecting:
a) Objects (154) and (153) moving on top of Transfer Conveyor (126) at speed V2, as new Object (152), per respective instructions displayed on Monitor (157) and directions provided by Main Traffic Light (3), has just entered the OFTS section of the Entry Module.
b) The measured distance in-between Objects (154) and (153)—X7, measured in OFTS terms of unblocked Sensors, remained equal to four, while distance X8 between Objects (153) and (152) is equal three.

Figure 43:
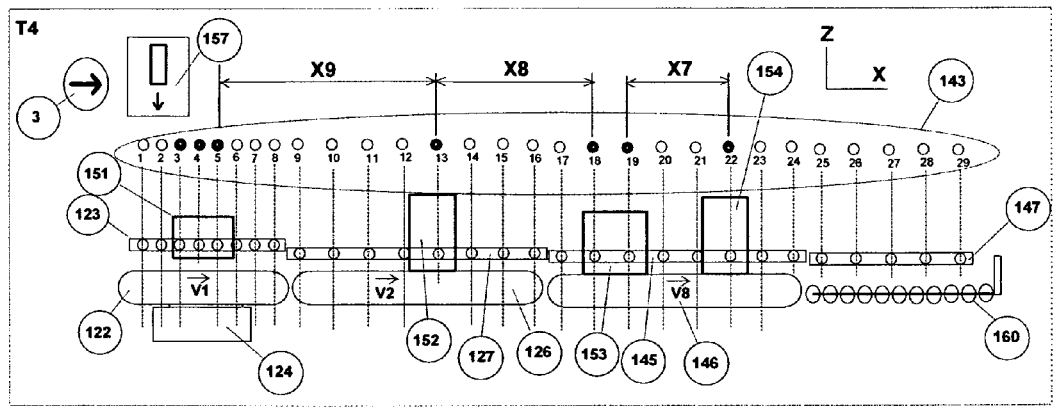

FIG. 43—Illustrates introduction of the 4-th Object (151) into OFTS section of the Entry Module, while the Objects (154) and (153) have advanced along the Track Figure elements are labeled as follows:

T4—time mark, reflecting:

a) Objects (154) and (153) moving on top of Exit Conveyor (146) at speed V8, and Object (152) moving on top of Transfer Conveyor (126) at speed V2, as new Object (151), per respective instructions displayed on Monitor (157) and directions provided by Main Traffic Light (3), has just entered the OFTS section of the Entry Module.

b) The measured distance in-between Objects (154) and (153)—X7, measured in OFTS terms of unblocked Sensors, has been reduced to two, since the Exit Conveyor (146) speed V8 could be lower than the speed V2 of the Transfer Conveyor (126), to lower the kinetic energy of the Objects approaching the Transition location between Exit and Pick-up Modules.

c) The distance X8 between Objects (153) and (152) is equal to four d) The distance X9 between Objects (152) and (151) is equal to seven.

Figure 44:
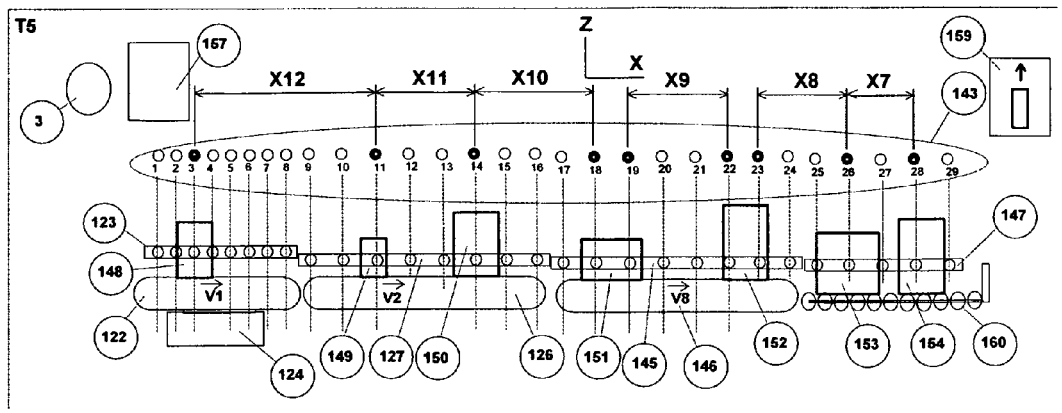

FIG. 44—Illustrates position of all Objects, after the last three Objects (150), (149) and (148) were introduced into OFTS section of the Entry Module, while previously placed Objects (154), (153) have reached the Pick-up Module, and Objects (152) and (151) advanced along the Track Figure elements are labeled as follows:

T5—time mark, reflecting:

a) Objects (154) and (153) are ready to be picked-up by Customer, which could be signaled by Controller to the Customer by respective display on the Exit Instruction Device (159).

b) Since Object (148) was the last Processed by the Customer, the Controller could signal to the Customer, no more Objects could be placed onto Entry Module Conveyor, by turning off the Traffic Light (3) and Entry Instruction Device (157).

c) As part of dynamic Traffic Management, Controller could lower the speed V8 of the Exit Conveyor (146), lower the speed V2 of the Transfer Conveyor (126), while could increase the speed of Entry Conveyor V1, while maintaining minimum Clearance between Objects of one un-blocked Sensor.

d) The distances X7 through X12 between respective Objects, as shown.

Figure 45:
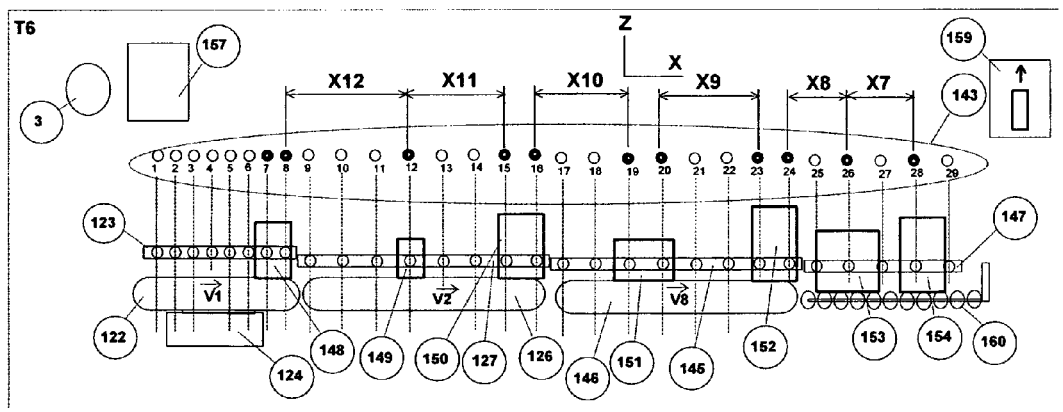

FIG. 45—Illustrates position of all Objects, after Controller had advanced them along the Track to achieve minimum Clearance between them, based on the timing sequence of each Object being introduced into IMTS by Customer. At this point in time, all Conveyors could be stopped. A warning signal visual and/or audible could be issued by Controller to inform the Customer to start removing Objects from the Pick-up Module as soon as possible. As Customer begins to remove Objects from the Pick-up Module, Controller could begin advancing remaining Objects along the Track toward the Pick-up Module. This Process could continue until all Objects have been successfully removed by the Customer, at which point Controller could signal via Traffic Light (3) that IMTS is available for a new Transaction by the next Customer.

Figure elements are labeled as follows:

T6—time mark, reflecting:

a) Objects (154) and (153) are ready to be picked-up by Customer, which could be signaled by Controller to the Customer by respective display on the Exit Instruction Device (159).

b) Since Object (148) was the last Processed by the Customer, the Controller could signal to the Customer, no more Objects could be placed onto Entry Module Conveyor, by turning off the Traffic Light (3) and Entry Instruction Device (157).

c) As part of dynamic Traffic Management, Controller could lower the speed V8 of the Exit Conveyor (146), lower the speed V2 of the Transfer Conveyor (126), while could increase the speed of Entry Conveyor V1, while maintaining minimum Clearance between Objects of one un-blocked Sensor.

d) The distances X7 through X12 between respective Objects, as shown.

FIG. 46 through FIG. 50—Illustrates abilities of IMTS Controller via OFTS (133) and Registered Transition (156) components, shown in between Entry and Exit Module Conveyors, to detect and keep track of Low-profile Objects, such as (155) described in these illustrations. In order to achieve this Objective, OFTS sections for each Module could be shaped, in general, where a number of Emitter-Sensor couples at the point of Transition, could be located lower toward the top surface of its respective Registered Transition. Since Transition surface itself is Registered, the accuracy of placing Emitter-Sensor couples in relation to it, could be significantly higher, compared to remaining Emitter-Sensor couples of the OFTS. In example shown, for simplicity, one OFTS couple (21) is positioned at the Transition (156), which could detect Low-profile Objects with minimum vertical profile Z3, when they pass through on top of the Registered Transition (156). The information, that an Object, Expected next, is a Low-profile type, could be provided to Controller by the Host Computer, together with its Expected "X-profile" and "Weight-profile", as important parameters stored in the Objects Data Base. Based on this information, Controller could expect to detect the Object briefly during its initial placement on the top of the Entry Module Conveyor, and then keep track of it, as it is Expected to pass through Transitions points within certain time window, which depends on speed of the feeding Conveyor, advancing the Object toward the Transition.

Figure 46:
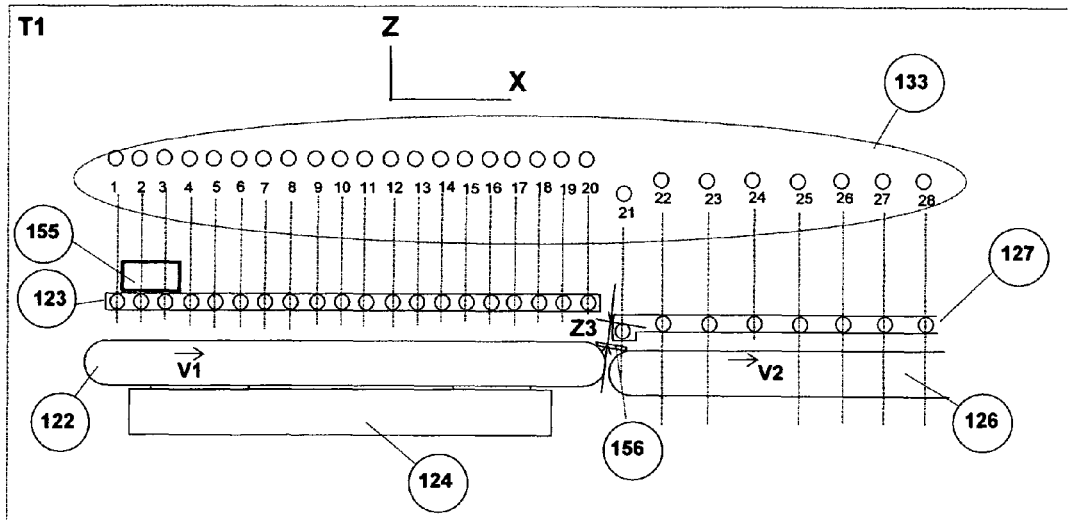

FIG. 46—Illustrates position of the Low-profile Object (155) just prior to be detected by OFTS section (123) of the Entry Module. Controller is informed by the Host Computer, that the Expected Object, whose barcode was just scanned in by a Customer, is a Low-profile type.

Figure elements are labeled as follows:

T1—time mark, reflecting:

a) Low-profile Object (155) located just above the OFTS section of the Entry Module e) Entry Module Conveyor could be moving at the speed of V1, while Exit Conveyor at speed V2.

Figure 47:
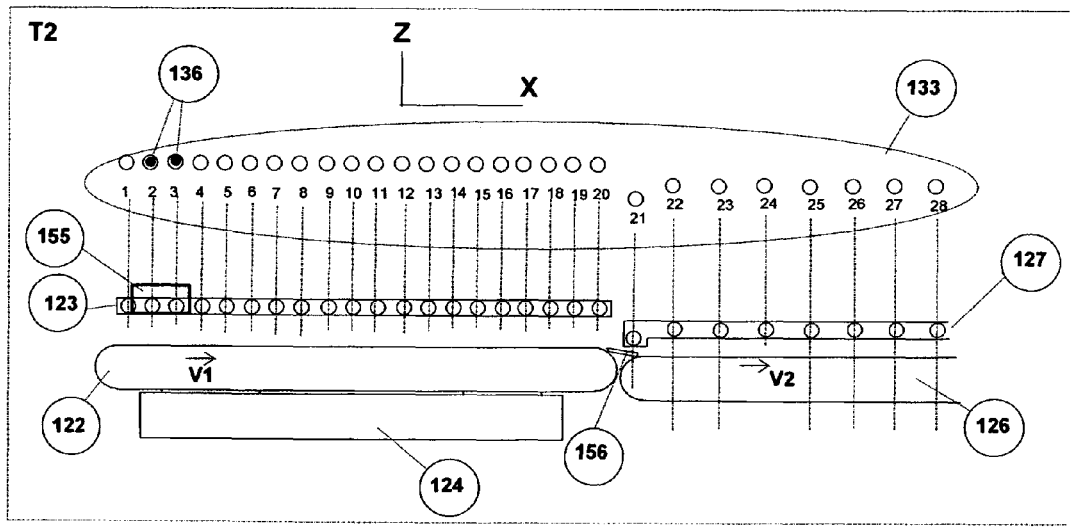

FIG. 47—Illustrates position of the Low-profile Object (155) at the time mark (T2), when it is detected by OFTS section (123) of the Entry Module, and has produced "X-profile" equal to 2 Blocked Sensors (2) and (3), which is within the Expected range.

Figure 48:
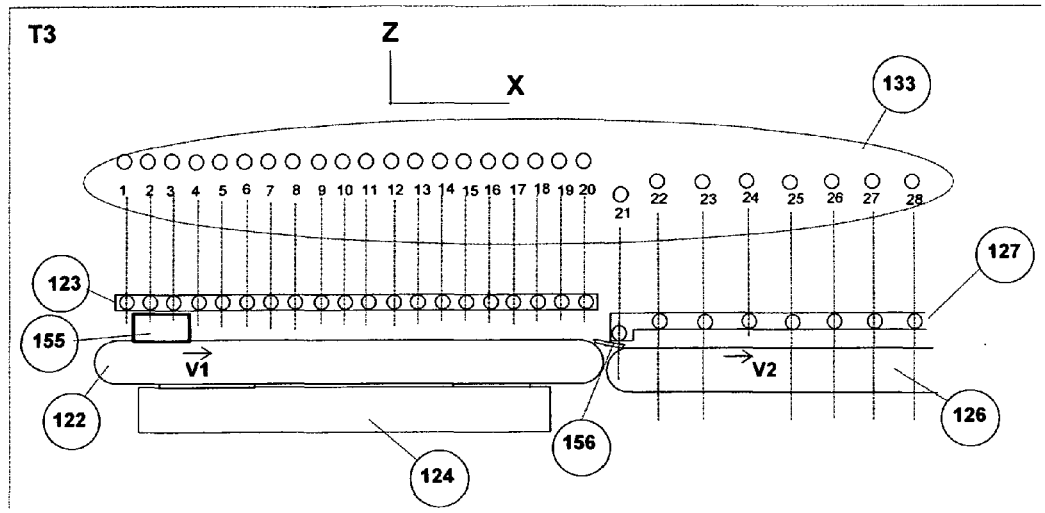

FIG. 48—Illustrates time mark (T3), when position of the Low-profile Object (155) is on top of the Entry Module Conveyor (122), but it is no longer detectable by the OFTS section (123) of the Entry Module. Controller, based on initial location of the Object (155) upon entry and the speed V1 of the Entry Module Conveyor, could calculate an Expected "arrival" time window of the Object (155) at the next Transition (156).

Figure 49:
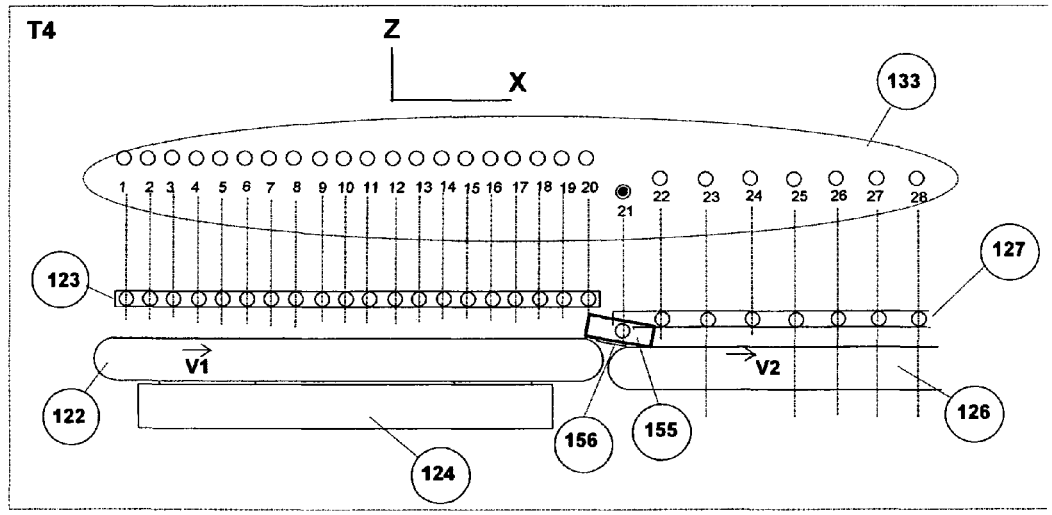

FIG. 49—Illustrates time mark (T4), when position of the Low-profile Object (155) is on top of the Registered Transition (156), and is detected by the OFTS Emitter-Sensor couple (21). The "arrival" time, which is equal to (T4−T3), is within the estimated time window, and since the "X-profile" is equal to 1, which is within the Expected range, the Low-profile Object (155) is recognized, and is allowed to continue advancing along the IMTS Track.

Figure 50:
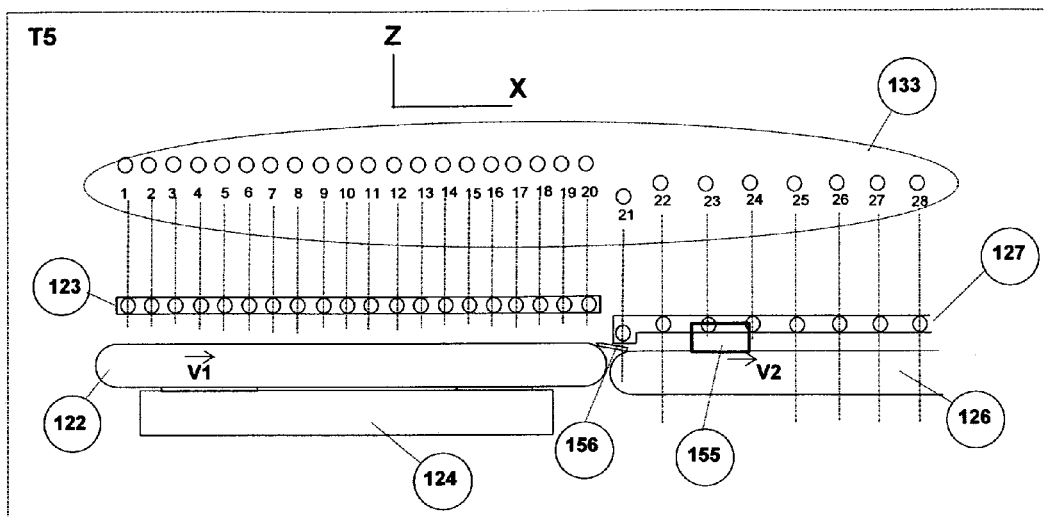

FIG. 50—Illustrates time mark (T5), when position of the Low-profile Object (155) is on top of the Exit Module Conveyor (126), but it is no longer detectable by the OFTS section (127) of the Exit Module. Controller, based on initial time T4 of Object (155) passing through Transition (156) and the speed V2 of the Exit Module Conveyor, could calculate an Expected "arrival" time window of the Object (155) at the next Transition, which is not shown, for simplicity.

Figure 51:
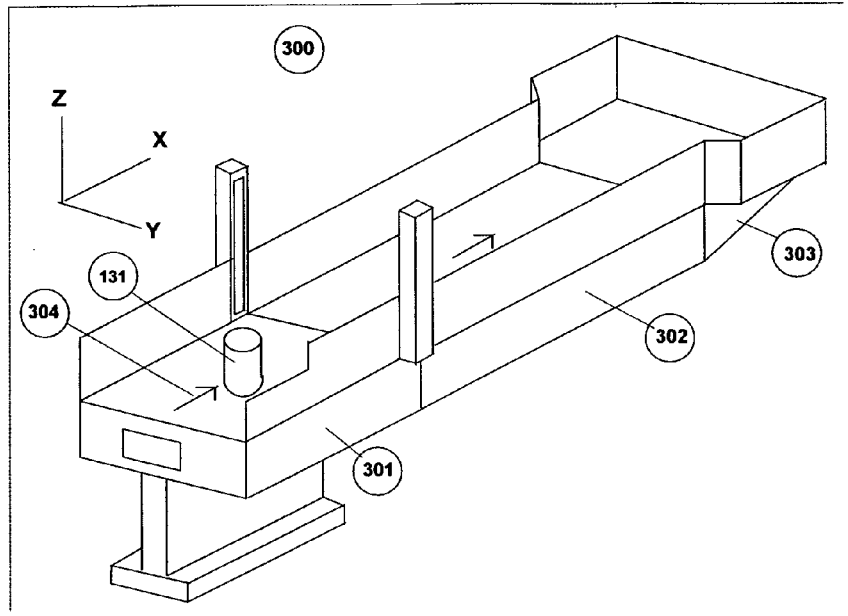
Figure 52:
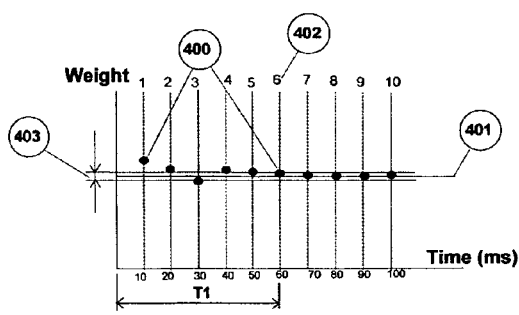
Figure 53:
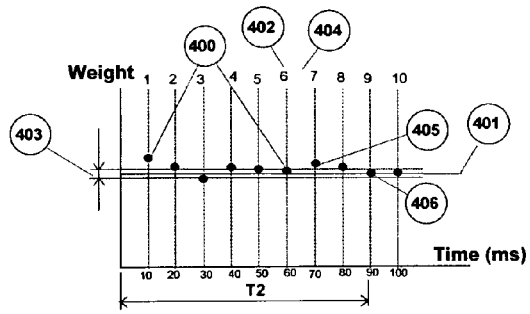
Figure 54:
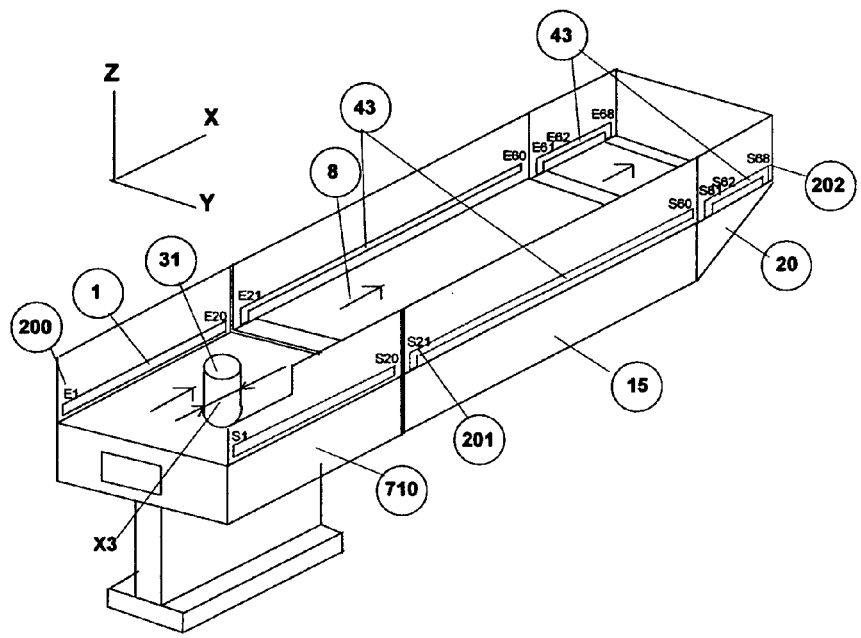

FIG. 51 through FIG. 53—Illustrates the problems experienced by existing Systems, which result in negative impact on important System performance parameters, including System throughput.

FIG. 51—Illustrates typical arrangement of an existing automatic check-out line, which relies on scale alone to identify properly an Object placed on top of its entry section.

Figure elements are labeled as follows:
131—Test Object
300—Existing System layout
301—Entry section with scale under the conveyor
302—Transfer conveyor
303—Object pickup section
304—Direction of conveyor motion FIG. 52—Illustrates measured weight fluctuations in time as an Object is placed on top of Scale Conveyor of the Entry Module. Fluctuations could be result of:
a) Object bouncing after being placed on top of conveyor
b) Object having liquid inside, etc.

This will force the System to wait T1 for weight measurement to stabilize, and then compare it to the acceptable range to either accept or reject the Object. For simplicity, the figure's example has weight readings every 10 ms.

Figure elements are labeled as follows:
400—Dynamic weight samples of the placed Object, as measured by the System every 10 ms
401—Expected weight of the Object placed on conveyor, based on information about the Object stored in the System data base
402—1-st sample of the weight measurement, which falls within the acceptable range (403)
403—Acceptable weight range, which is established based on required System performance criteria in terms of proper recognition of Objects. The range, which could be set in percentages, i.e. ±10% as an example, could vary for each Object, as needed.

FIG. 53—Illustrates measured weight fluctuations, as result of conveyor starting to move after T1. The existing Systems could interpret these fluctuations as result of another Object being placed on top of scale conveyor, which if true, must be detected as Violation. The motion related fluctuations will force the existing System to stop the conveyor and verify the weight of the Object once again, extending the "decision" time to T2, whether to accept or reject the Object. This negatively impacts the System performance, including throughput.

Figure elements are labeled as follows:
404—time, which is slightly greater than T1, and as shown, is around 65 ms, when conveyor started to move the placed Object on top of it.
405—first reading of the Object weight after conveyor started to move, which is outside the acceptable range. There could be several reasons the weight reading is outside the range, which include: conveyor vibrations during acceleration, conveyor belt bouncing during acceleration forcing the Object bouncing on top of it, etc.
406—first reading of the Object weight at T2 after conveyor started to move, which is within the acceptable range.

Remaining elements are labeled same as on FIG. 52.

FIG. 54 through FIG. 61—Illustrates advantages of IMTS with OFTS Object Tracking.

OFTS for each IMTS Module could be configured to effectively provide required Scan Data. In general, the point of entry of an Object into the Entry Module of an IMTS, is one of the most critical locations, and result, the respective OFTS could be designed for the most optimum configuration, in terms of:
a) Ability to detect specific or unique characteristics of Objects lower section
b) Detection accuracy
c) Processing speed of providing and analyzing Scan Data by Controller FIG. 54—IMTS configuration example consisting of an Entry Module with Scale component (710), Transfer (15) and Exit (20) Modules. Respective Modules OFTS components are referenced for illustration purposes. The total number of Sensors in this example is 68.

Figure elements are labeled as follows:
710—Entry Module, which could include Conveyor and Scale, as needed, As shown, this Module could have quantity 20 of OFTS Emitter-Sensor pairs, spaced along the "X-axis" at resolution specific to this Module. Also, the vertical "Z-positioning" of the OFTS section for this Module could be higher, as shown, compared to other Modules, to allow detection of Objects "X-profile" by Controller far in advance in time before Object(s) are placed on top of Entry Module Conveyor. This feature, could allow Controller to get the first "look" at the Object's in terms of its "X-profile", and make the first conclusion, whether the Object "X-profile" is within acceptable range. If the Object's "X-profile" is out of range, the Object could be rejected by the System without a need to measure and verify whether its "Weight-profile" is within required range. This feature also allows detection of other Object(s) in Process of being placed toward the top of the Scale Conveyor of the Entry Module, and as result, could allow Controller to distinguish whether fluctuations in measured weight was result of:
a) Unexpected new Object(s) placed on top, or
b) Conveyor motion related vibrations, jolts, etc.

15—Transfer Module. As shown, this Module has quantity 40 of OFTS Emitter-Sensor pairs, spaced along the "X-axis" at resolution specific to this Module. The Modules first Emitter-Sensor pair (21), could be placed lower along "Z-axis", with an Objective to detect transition of Low-profile Objects from Entry Module to Transfer Module.

20—Exit Module. As shown, this Module has quantity 8 of OFTS Emitter-Sensor pairs, spaced along the "X-axis" at resolution specific to this Module. The Modules first Emitter-Sensor pair (61) could be placed lower along "Z-axis", with an Objective to detect transition of Low-profile Objects from Transfer Module to Pick-up Module.

43—OFTS of the entire IMTS, which consists of total of 68 Emitter-Sensor pairs.

131—Object, which has a cylindrical shape, with "X-profile", as shown, equal to X3. This Objects "X-profile" could vary significantly depending how the Object is placed, i.e. vertical vs. horizontal, which could also cause the Object to roll. To avoid unnecessary complications, the respective Object Placement Instructions could be displayed to the Customer by Controller via Instruction Device (157), which in this example could be an LCD monitor, as shown. The specific Instructions could be received by Controller from the Host Computer based on the scanned Object's Data stored in the central Data Base.

159—Exit Instructions Device, which could be used by Controller to inform Customer, that it is time to start picking up Objects accumulated in the Pick-up Module. As shown, the respective instructions could be displayed using LCD-type scrolling one-line message monitor.

200—OFTS Emitter-Sensor pair #1

201—OFTS Emitter-Sensor pair #21, which is the first one of the Transfer Module, and as shown, could be located lower along the "Z-axis" for detection of Low-profile Objects at the transition point across Registered Surface (not shown), in-between the Entry Module and Transfer Module.

Figure 55:
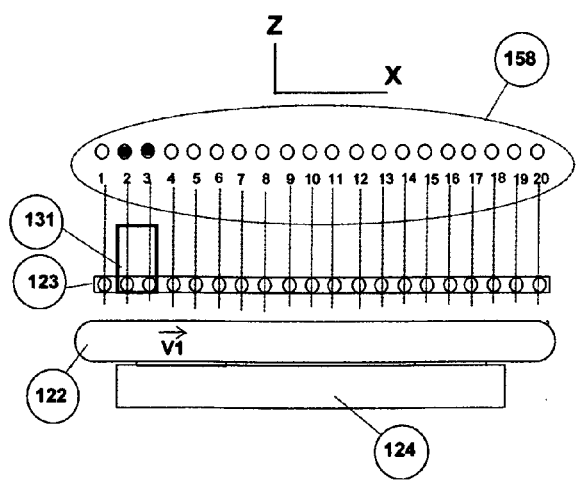

202—OFTS Emitter-Sensor pair #68, which is the last, located at the end of Pick-up Module FIG. 55—Illustrates measured by Controller Objects "X-profile" as the Objects (131) lower section is just reached the Entry Modules OFTS (123), while still distance away from the top surface of the Entry Modules Conveyor (122).

Figure elements are labeled as follows:

124—Entry Modules Scale component for establishing Objects "Weight-profile"

158—Reference representation of the status of OFTS Sensors of Entry Module at the time Objects (31) lower section has reached the Sensors. As shown, the Objects (131) established "X-profile" is equal to 2.

Figure 56:
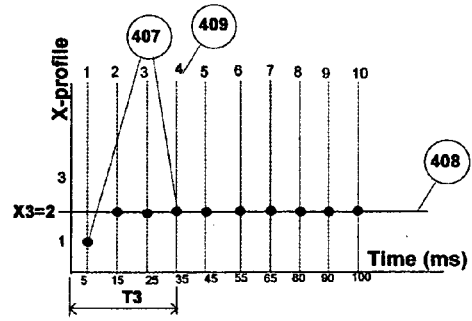
Figure 57:
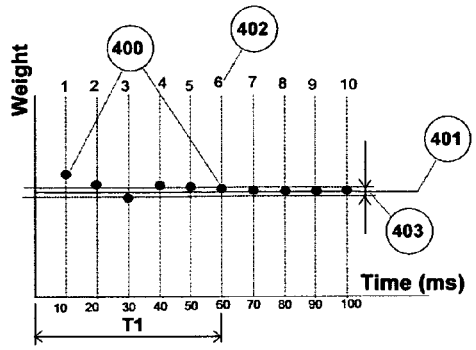

FIG. 56—Illustrates measured by Controller Objects "X-profile" as the Object passed through the Entry Modules OFTS, and then landed on top surface of the Entry Modules Conveyor. The measurements, for illustration purposes, are shown to be taken every 10 ms, with the 1-st reading at 5 ms. It is quite possible, that Object (131), prior to reaching the top of the Entry Modules Conveyor, could have been passing through OFTS under a slight angle, causing one of Sensor to trigger ahead of the other Sensor, as shown by result of the first reading at 5 ms.

Figure elements are labeled as follows:

407—Dynamic sample readings by Controller of the Objects "X-profile". Fluctuations could occur, as result of:
   a) Object being placed under an angle
   b) Object, while being placed, partially blocking a Sensor enough to change the Sensors State 408—Expected Objects "X-profile", based on information obtained by Controller from respective Data Base 409—The 4-th reading by Controller of the Objects "X-profile" at 35 ms, which has indicated that the "X-profile" at time marked T3 has stabilized, and the obtained Objects "X-profile" could be compared to Expected "X-profile", to whether accept or reject the Object FIG. 57—Illustrates measured by Controller weight fluctuations in time as an Object is placed on top of Entry Module Conveyor, equipped with Scale. The measurements, for illustration purposes, are shown to be taken every 10 ms, with the 1-st reading at 10 ms. It is quite possible, that Object (131), upon reaching the top of the Entry Modules Conveyor, could have bounced, causing the Scale to produce variable readings. Fluctuations, in general, could be result of:
   a) Object bouncing after being placed on top of conveyor
   b) Object having liquid inside
   c) Environment
   d) Faulty component, such as Weight Sensor, etc.

This could force the Controller to wait T1 for weight measurement to stabilize. The stabilized weight (401) could be then compared to the acceptable range (403), obtained from the respective Data Base per Objects barcode information, to either accept or reject the Object (31). All obtained weight readings of Object (131) could be considered as Objects (131) "Weight-profile".

Figure elements are labeled as follows:

400—Dynamic weight samples, part of Object (131) "Weight-profile", as measured by the System every 10 ms 401—Expected weight of the Object (131), based on information about the Object, which was previously stored in the System Data Base 402—1-st sample of the weight measurement, which falls within the acceptable range (403)

403—Acceptable weight range, which is established based on required System performance criteria in terms of proper recognition of Objects. The range, which could be set in percentages, i.e. ±10% as an example, could vary for each Object, as needed.

Figure 58:
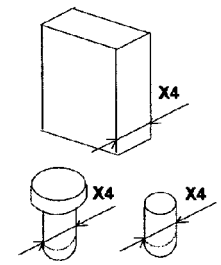

FIG. 58—Illustrates 3 different Objects, which could produce the same "X-profile". In this type of cases, the System could, in addition to "X-profile", rely on using the "Weight-profile" to properly identify the Object.

Figure 59:
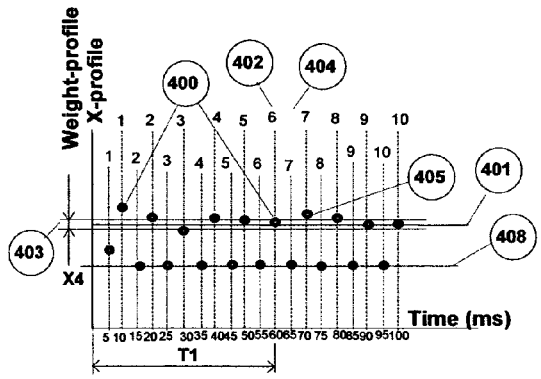

FIG. 59—Illustrates how the IMTS solves the problem, experienced by existing Systems.

As shown, the "decision time" T1, is no longer affected by the start of motion of the Entry Module Conveyor (404). The OFTS during the entire Object evaluation Process, had indicated to Controller, that only one Object, (131) in this case, with acceptable "X-profile" (408) has been placed and remained on top of the Entry Module Conveyor. As result, any fluctuations in weight measurements after T1, such as a reading (405), could be associated with:
   a) Object (131) having liquid inside
   b) Environment
   c) Faulty component, such as Weight Sensor, etc.

For a System with proper self-diagnostics, the (c) could be verified by other means, which leaves only (a) and (b), and neither could impact the acceptance of the Object (131) at this point.

Figure 60:
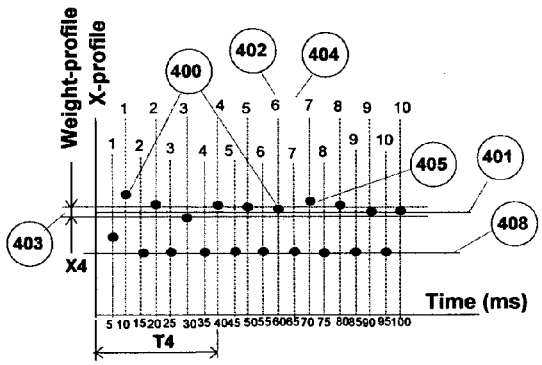

FIG. 60—Illustrates how the IMTS could further improve System performance. The System could now rely on two independent measured parameters "Weight-profile" and "X-profile" of an Object to comply, respectively, with Expected data. As result, the acceptable range for "Weight-profile" could be extended from static range (403) to dynamic range (410), while maintaining the Objects acceptance/rejection criteria within practical Objectives. As result, the System throughput has been increased, since the Objects accept/reject "decision time", as shown, has been reduced from T1 (FIG. 59) to T4.

Figure 61:
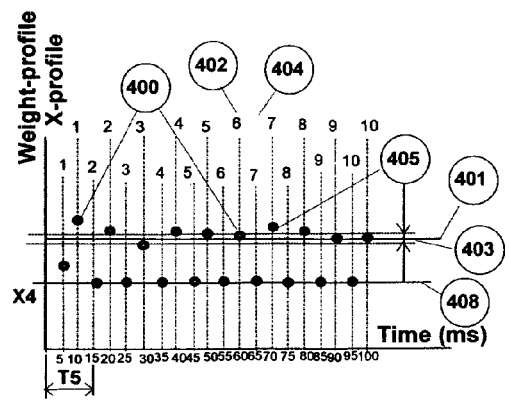

FIG. 61—Illustrates how the IMTS could maximize the System performance.

As shown in the illustrated example, the Controller could accept Object (31) based on:
   a) The first dynamic reading of the Object's "X-profile" within Expected range, which as shown, occurred on second reading of the "X-profile" at 15 ms, and b) The first dynamic reading of the Object's "Weight-profile" within its Expected range, which as shown, occurred on second reading of the "Weight-profile" at 20 ms.

As result, the throughput of the System could now be significantly increased, since the decision time to either accept or reject an Object, in illustrated examples, has been reduced from T2 (90 ms for existing Systems) down to T5 (15 ms for IMTS). For an existing System Processing, on average, 500 Objects per hour, the IMTS could potentially double (or more) the throughput to 1000 Objects per hour, using Dynamic Object Behavioral Recognition approach, described in this application.

FIG. 62 through FIG. 70—Illustrates examples of System Logic Flow Charts.

For simplicity:
a) Each Logical Step on a Flow-chart is referred to as Function with a unique label
b) A high-throughput IMTS for either Object Transaction or Object Processing is considered, with the respective sections of the Transport System moving at all times, unless noted otherwise
c) Not all "time-out" procedures are shown, which could be added, as needed, to make sure that the System safely recovers from any Unexpected delays, etc.
d) A pointing arrow is indicating the flow from the previous Function to the next Function
e) All Transactions include proper identification of an Object, whether it is the one Expected or not, based on comparison analysis of an Object Real-time Behavioral Parameters to the respective Expected Ranges, and as result—being either Accepted by the System, or Rejected.

Figure 62:
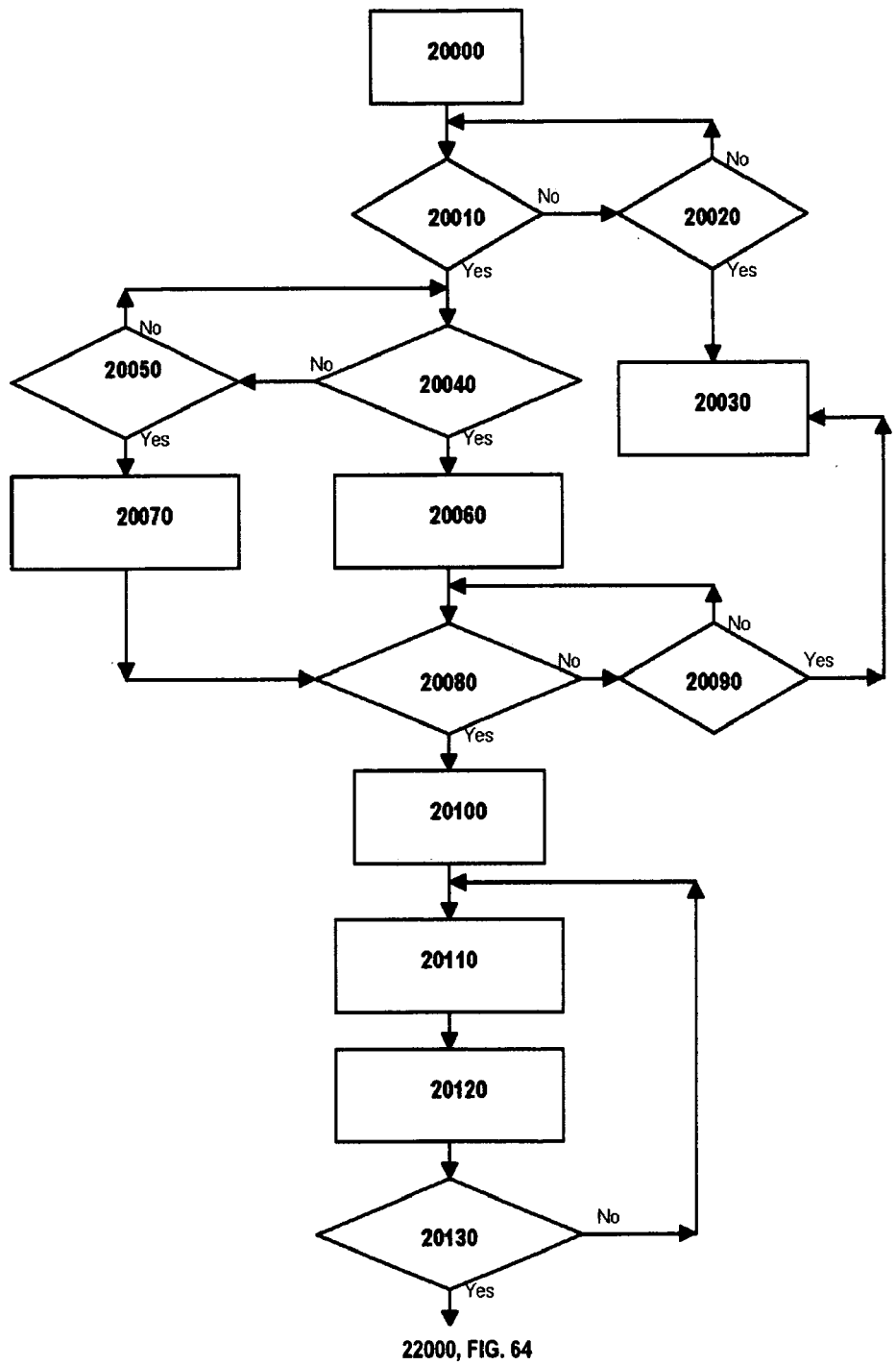
Figure 63:
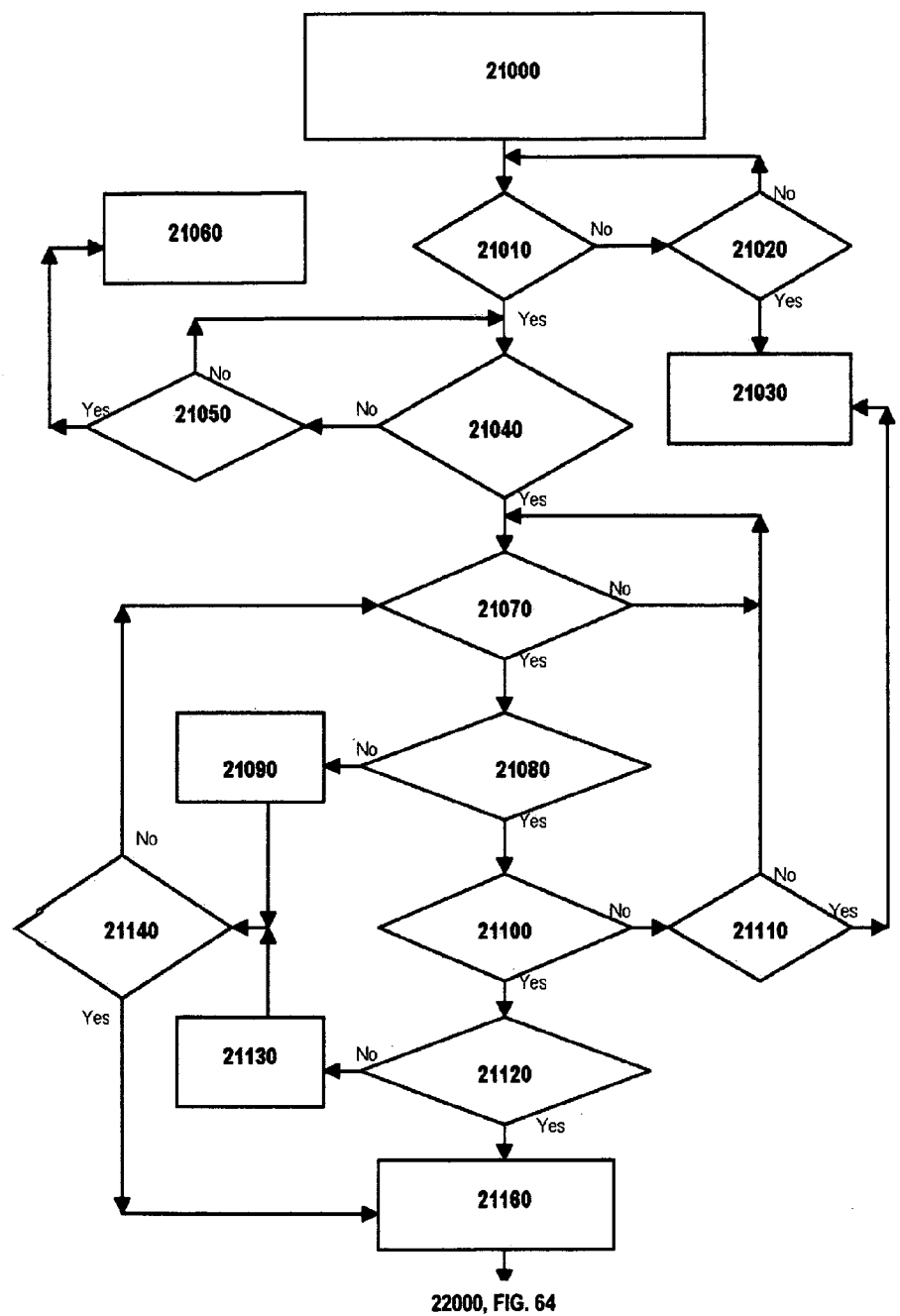
Figure 64:
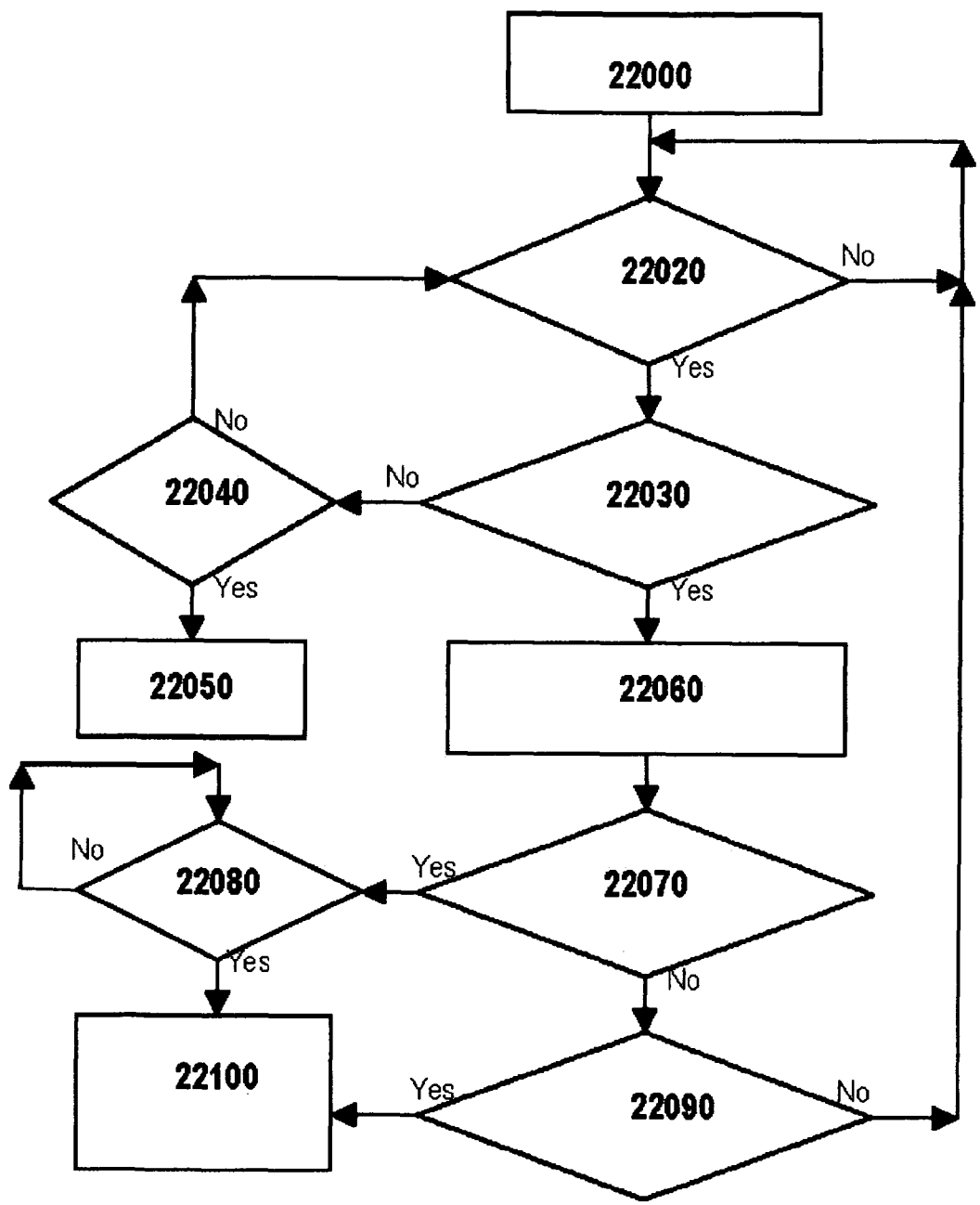

FIG. 62 through FIG. 64: Illustrate System Logic Flow-charts, which could include a number of Learning Transactions for establishing a Data Base of behavioral Parameters for each of selected Objects, or a group of Objects, based on which Expected Behavioral Parameters could be calculated, as needed.

For simplicity, a Learning Process could be considered as building up the Expected Behavioral Data base for Objects to be handled by IMTS during regular Transactions.

An example of a sequence of Learning steps of Object Behavioral Patterns for an IMTS for a business like grocery stores could include:

a) Select Objects, which should have the same Expected Behavioral Data (size, weight, shape), such as: variety of soup cans, variety of water bottles, etc.
b) Run selected Objects through a learning Transaction
c) Controller to record time-based Initial "X-profile" and "W-profile"
d) Controller to start conveyors
e) Controller to record time-based samples of Dynamic "X-profile", which produced by Objects Leading Edge Trigger
f) Controller to upload recorded Object Behavioral Data to a Host Computer
g) Repeat steps (b) through (f) for as many Transactions as needed to collect sufficient Data
h) Program on Host Computer to analyze Data for each stored Transaction Record, and calculate Expected Behavioral Parameter ranges, such as:
Min/max number of Beams broken for each Record of "Initial X-profile"
Number of Gaps for each Record of "Initial X-profile"
Size of each Gap for each Record of "Initial X-profile"
Min/max weight for each Record of "Initial W-profile"
Average weight of all Records of the "Initial W-profile"
Min/max number of Beams broken for each Record of "Dynamic X-profile"
Number of Gaps for each Record of "Dynamic X-profile"
Size of each Gap for each Record of "Dynamic X-profile"
and other, as needed.
i) Repeat steps (a) through (h) for other Objects or group of Objects, as needed Notes:
1. In this particular example the "W-profile" is only Recorded during Initial phase, when Scale or Entry Module Conveyor is OFF
2. "Dynamic Recording of X-profiles" could be synchronized for all Objects, since only "Leading Edge Trigger" based "X-profiles" are recorded
3. In practical terms, Learning Transactions or Learning of Object Behavioral Patterns could be conducted during a limited number of regular Transactions under Learning Algorithm (no Violations processing) for each new Object, until required Data base is generated and Expected Behavioral Parameters for each new Object have been established.

FIG. 62 logical Functions are labeled as follows:
Function (20000)—System status: Ready for Transactions-Scale and OFTS are active, Entry Module Conveyor OFF, Transfer Module Conveyor OFF Function (20010)—Verification if an Object identification barcode label was scanned, and if it was (20010 YES), then Function (20040) is invoked; otherwise (20010 NO)—Function (20020) is invoked to monitor if the time limit for an Object barcode scan has elapsed, and if it has not—return to Function (20010), otherwise—execute Function (20030) Time Out Procedure.

Function (20040)—Verification if Object was detected by OFTS, and if it was (20040 YES), then Function (20060) is invoked—Record sample #1 of Objects "X-profile" and continue with Function (20080); otherwise (20040 NO)—Function (20050) is invoked to verify if attempt or time limit to detect an Object by OFTS has been exceeded, and if has not—return to Function (20040), otherwise—invoke Function (20070) "Object out of range" Procedure and continue with Function (20080)

Function (20080)—Verification if Object was detected by Scale, and if it was (20080 YES), then Function (20100) is invoked—Record sample #1 of Objects "W-profile" and continue with Function (20110); otherwise (20080 NO)—Function (20090) is invoked to verify if time limit to detect an Object by Scale has been exceeded, and if has not—return to Function (20080), otherwise—invoke Function (20030) "Time Out" Procedure Function (20110)—record next sample of Objects "X-profile", and continue with Function (20120) to record the next sample of Objects "W-profile", and continue with Function (20130)

Function (20130)—Verification if sample count of Static Object Data has been exceeded, and if it was (20130 YES), then Function (22000, FIG. 64) is invoked; otherwise (20130 NO)—return to Function (20110) and continue sampling Objects Behavioral Data FIG. 63 logical Functions are labeled as follows:
Function (21000)—System status: Ready for Transactions-Scale and OFTS are active, Entry Module Conveyor OFF, Transfer Module Conveyor OFF Function (21010)—Verification if an Object identification barcode label was scanned, and if it was (21010 YES), then Function (21040) is invoked; otherwise (21010 NO)—Function (21020) is invoked to monitor if the time limit for an Object barcode scan has elapsed, and if it has not—return to Function (21010), otherwise—execute Function (21030) Time Out Procedure.

Function (21040)—Verification if Object was detected by OFTS, and if it was (21040 YES), then Function (21070) is invoked; otherwise (21040 NO)—Function (21050) is invoked to verify if attempt or time limit to detect an Object by OFTS has been exceeded, and if has not—return to Function (21040), otherwise—invoke Function (21060) "Object out of range" Procedure Function (21070)—Verification if it is time to sample Object Behavioral Data, and if it was (21070 YES), then Function (21080) is invoked; otherwise (21070 NO)—return to Function (21070) Function (21180)—Verification if it Object's Initial "X-profile" was set, and if it was (21180 YES), then Function (21100) is invoked; otherwise (21080 NO)—Function (21090) is invoked to continue recording of Object's Initial "X-profile"

Function (21100)—Verification if it Object was detected by Scale, and if it was (21100 YES), then Function (21120) is invoked; otherwise (21100 NO)—Function (21110) is invoked to monitor if the time limit has elapsed, and if it has not—return to Function (21070), otherwise—execute Function (21030) Time Out Procedure.

Function (21120)—Verification if it Object's Initial "W-profile" was set, and if it was (21120 YES), then Function (21160) is invoked to "End Initial Recording" and continue with Function (22000, FIG. 3); otherwise (21120 NO)—Function (21130) is invoked continue recording of Object's Initial "W-profile"

Function (21140)—Verification if it Object's Initial Recording sample limit has been exceeded, and if it was (21140 YES), then Function (21160) is invoked to "End Initial Recording"; otherwise (21140 NO)—return to Function (21070)

FIG. 64 logical Functions are labeled as follows:

Function (22000)—System status: Object's Initial Data Recording was completed, and Controller could start Entry and Transfer Module Conveyors Function (22020)—Verification if it is time to sample Object Behavioral Data, and if it was (22020 YES), then Function (22030) is invoked; otherwise (22020 NO)—return to Function (22020)

Function (22030)—Verification if Object has moved along a Track and caused a "Leading Edge Trigger", and if it did (22030 YES), then Function (22060) Record "Dynamic X-profile" is invoked, followed by Function (22070); otherwise (22030 NO)—Function (22040) to monitor if the time limit has elapsed, and if it has not—return to Function (22020), otherwise—execute Function (22050) Time Out Procedure.

Function (22070)—Verification if Object is at the Exit Module, and if it is (22070 YES), then Function (22080) is invoked; otherwise (22070 NO)—Function (22090) is invoked Function (22080)—Verification if Object at the Exit Module and has stopped, and if it did (22080 YES), then Function (22100) is invoked to "End Recording"; otherwise (22080 NO)—return to Function (22080)

Function (22090)—Verification if Transaction time limit was exceeded, and if it did (22090 YES), then Function (22100) is invoked to "End Recording"; otherwise (22090 NO)—return to Function (22020)

Figure 65:
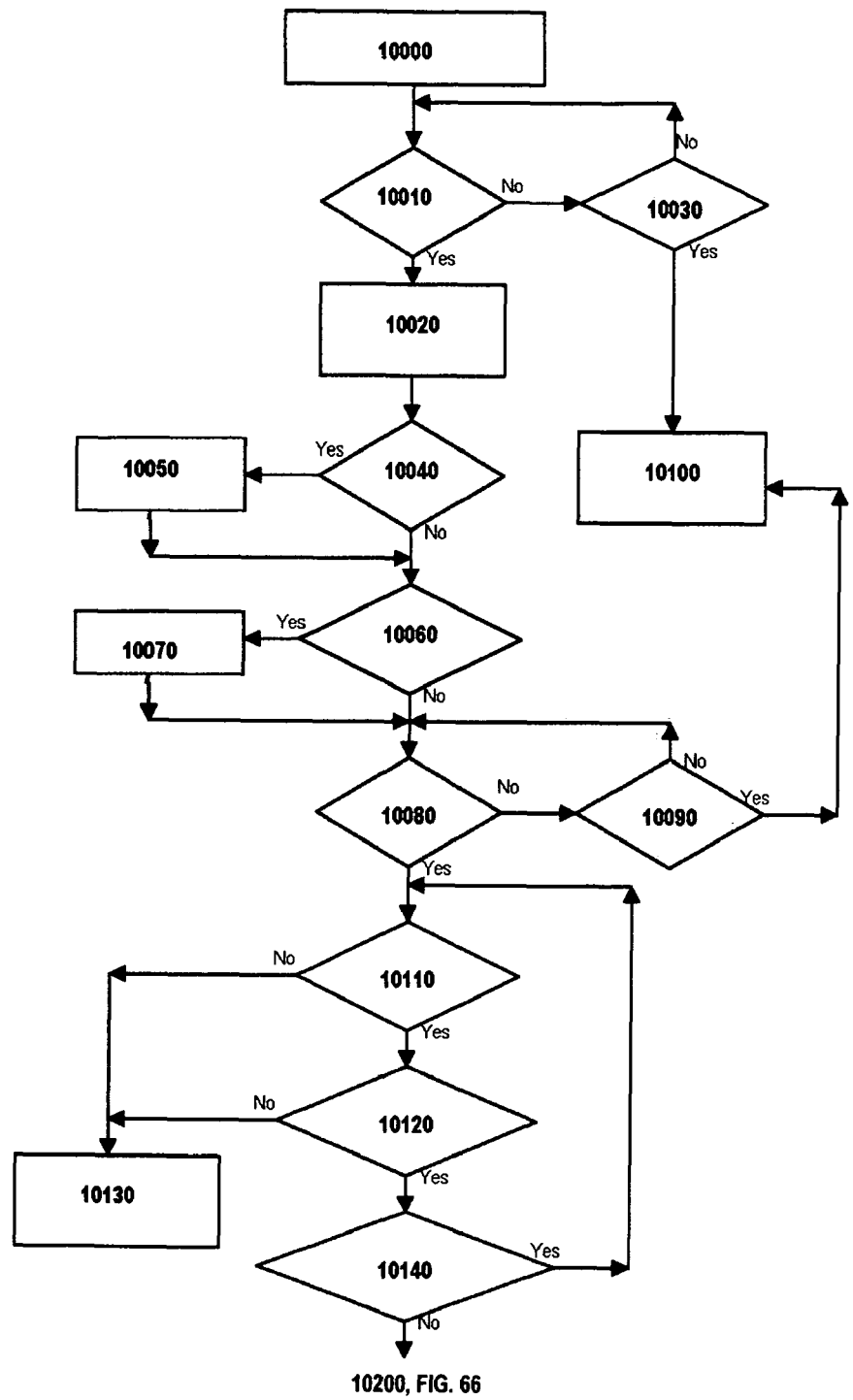
Figure 66:
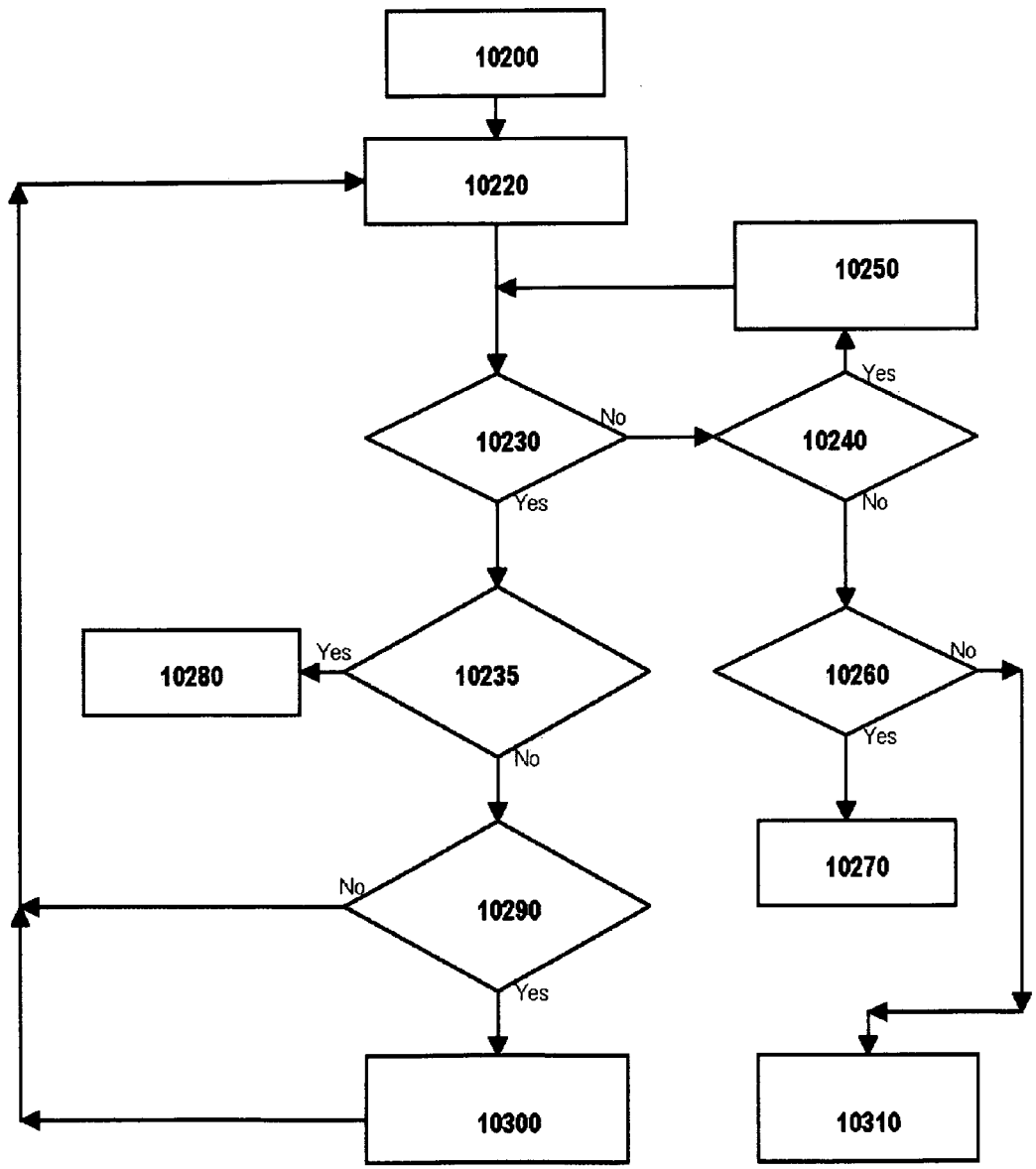

FIGS. 65 and 66—Illustrate simplified System Logic Flow-chart, which could be executed by Controller or Controllers for proper identification of Objects at the Entry Module of an IMTS of an Object Transaction System, which could be equipped with OFTS and SCALE components, and then continue monitoring Object's Behavioral Parameters throughout the entire Transaction, as needed, with proper actions invoked to insure safe, efficient and effective Transactions.

FIG. 65 logical Functions are labeled as follows:

Function (10000)—Transaction System is ready to accept an Object or Objects, and a Transaction started by a User Function (10010)—Verification if an Object identification barcode label was scanned, and if it was (10010 YES), then Function (10020) is invoked—based on obtained Object identification, respective Object Expected Behavioral Parameters or range of Parameters is downloaded from the Object Data Base into Controller memory; otherwise (10010 NO)—Function (10030) is invoked to monitor if the time limit for an Object to be scanned by the User, has been exceeded. If time has not been exceeded (10030 NO)—return to Function (10010), continue waiting for an Object barcode label to be scanned; otherwise (10030 YES)—invoke Function (10100) and execute respective "Time-out Procedure".

Function (10040)—Verification if the Object scanned is of type "Fragile", and if it is (10040 YES), then invoke respective Function (10050)—"Fragile Procedure", which could include setting special criteria for Traffic Management while this Object is present on the Tracks and continue with Function (10060); otherwise (10040 NO)—continue with Function (10060).

Function (10060)—Verification if an Object scanned is of type "Low-profile", and if it is (10060 YES), then invoke respective Function (10070)—"Low-profile Procedure", which could include setting special criteria for Traffic Management while this Object is present on the Tracks and continue with Function (10080); otherwise (10060 NO)—continue with Function (10080).

Function (10080)—Verification if an Object scanned has been detected by OFTS and/or Scale components of the Entry Module, and if it is (10080 YES), then invoke respective Function (10110); otherwise (10080 NO)—continue with Function (10090).

Function (10090)—monitor if the time limit for Object detection by the System has been exceeded. If time has not been exceeded (10090 NO)—return to Function (10080); otherwise (10090 YES)—invoke Function (10100) and execute respective "Time-out Procedure".

Function (10110)—verification of detected Object "X-profile" during Object entry and presence at Entry Module, if it falls within Expected Range (10110 YES), then continue with Function (10120); otherwise (10110 NO)—invoke Function (10130), and execute respective "Violation Procedure".

Function (10120)—verification of detected Object Dynamic and Static "W-profile", if it falls within Expected Range (10120 YES), then continue with Function (10140); otherwise (10120 NO)—invoke Function (10130), and execute respective "Violation Procedure".

Function (10140)—verification if detected Object remains within the Entry module, if it is (10140 YES), then continue with Object Behavioral Monitoring and Analysis starting with Function (10110); otherwise (10140 NO)—invoke Function (10200, FIG. 66), and execute respective "Traffic Management Procedure", which could include: proper separation of Fragile Objects; special detection of Low-profile Objects at Transition Points; etc.

FIG. 66 logical Functions are labeled as follows:

Function (10200)—invoke "Traffic Management" procedure, which could have been active since the start of Transaction, as needed, to manage traffic of Objects through the entire Track of the IMTS.

Function (10220)—"Continue Transaction" in-progress, while performing all invoked Functions, including: Object detection; Object Recognition; Traffic Management, etc.

Function (10230)—verification of detected Object "X-profile" as Object continues to advance along the Tracks by the Transport System, if it falls within Expected Range (10230 YES), then continue with Function (10235); otherwise (10230 NO)—invoke Function (10240)

Function (10240)—verification if detected Object is rolling along the Track, if yes (10240 YES), then invoke Function (10250) "Rolling Procedure" and continue with Function (10230); otherwise (10240 NO)—invoke Function (10260). NOTE: Once "Rolling Procedure" is invoked, the Object will pass the Function (10230) and the logic will continue with Function (10235).

Function (10260)—verification if detected Object is stuck on the Track, if yes (10260 YES), then invoke Function (10270) "Track Obstruction", which could include: Stopping Transport System; Issuing a warning to Operator; etc.; otherwise (10260 NO)—invoke Function (10310) "Invalid Activity", which could include: Stopping Transport System; Issuing an alarm warning to Operator; etc.

Function (10235)—verification if Transaction ended, if yes (10235 YES), then invoke Function (10280) "End of Transaction"; otherwise (10235 NO)—invoke Function (10290).

Function (10290)—verification if Object at the "Exit Module", if yes (10290 YES), then invoke Function (10300) "Object at Exit"; otherwise (10290 NO)—return to Function (10220) to "Continue Transaction". NOTE: when Object reached the end of Exit Module, Controller could inform User, or issue a warning—an Object is ready to be removed from the Track.

Figure 67:
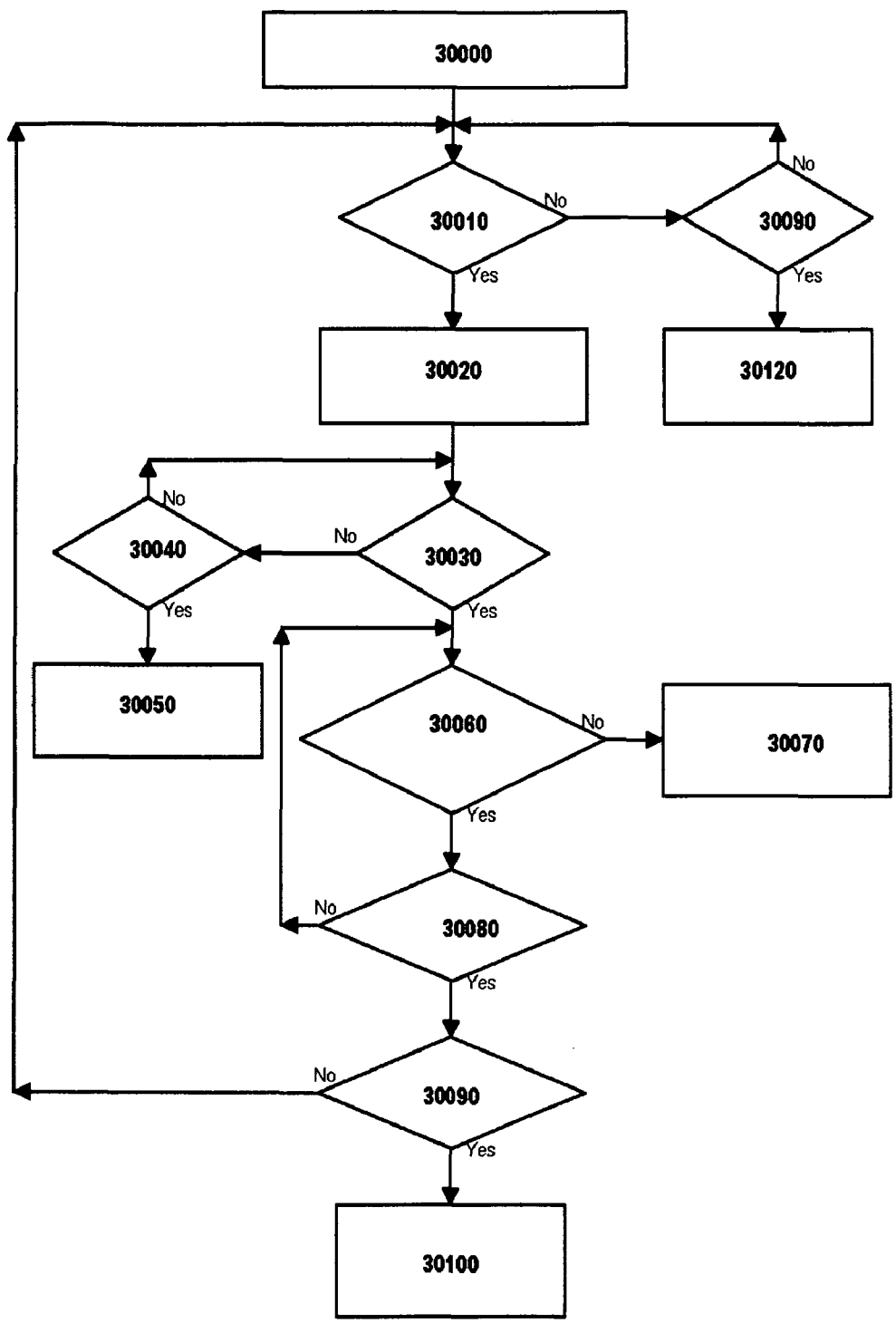

FIG. 67—Illustrate primarily Event-driven System Logic Flow-chart, which could be executed by Controller or Controllers for Object Transactions. Event-driven logic could be implemented by Controller by utilizing polling routines, which could continuously poll or monitor status of available Sensors, including: Scales, OFTS, etc. and then depending on obtained status, could execute respective function, as instructed. FIG. 67 logical Functions are labeled as follows:

Function (30000)—Transaction System is ready to accept an Object or Objects

Function (30010)—Verification if an Object identification barcode label was scanned, and if it was (30010 YES), then Function (30020) is invoked—based on obtained Object identification, respective Object Expected Behavioral Parameters or range of Parameters is downloaded from the Object Data Base into Controller memory; otherwise (30010 NO)—Function (30090) is invoked to verify if an Object or Objects detected (30090 YES), then invoke respective Function (30120)—"Violation Procedure"; otherwise (30010 NO)—return to Function (30010)

Function (30030)—Verification if an Object scanned has been detected by OFTS and/or Scale components of the Entry Module, and if it is (30030 YES), then invoke respective Function (30060); otherwise (30030 NO)—continue with Function (30040) to verify if time-out limit set from the point an Object was scanned-in till it is Expected to be detected has been exceeded, and if it did (30040 YES) invoke respective Function (30050)—"Time-out Procedure"; otherwise—continue with Function (30030).

Function (30080)—verification if Object at the "Exit Module", if yes (30080 YES), then invoke Function (30090); otherwise (30080 NO)—return to Function (30060).

Function (30090)—Verification if Transaction is completed, and if it was (30090 YES), then invoke Function (30100)—"Transaction Complete Procedure"; otherwise (30090 NO)—return to Function (30010)

Figure 68:
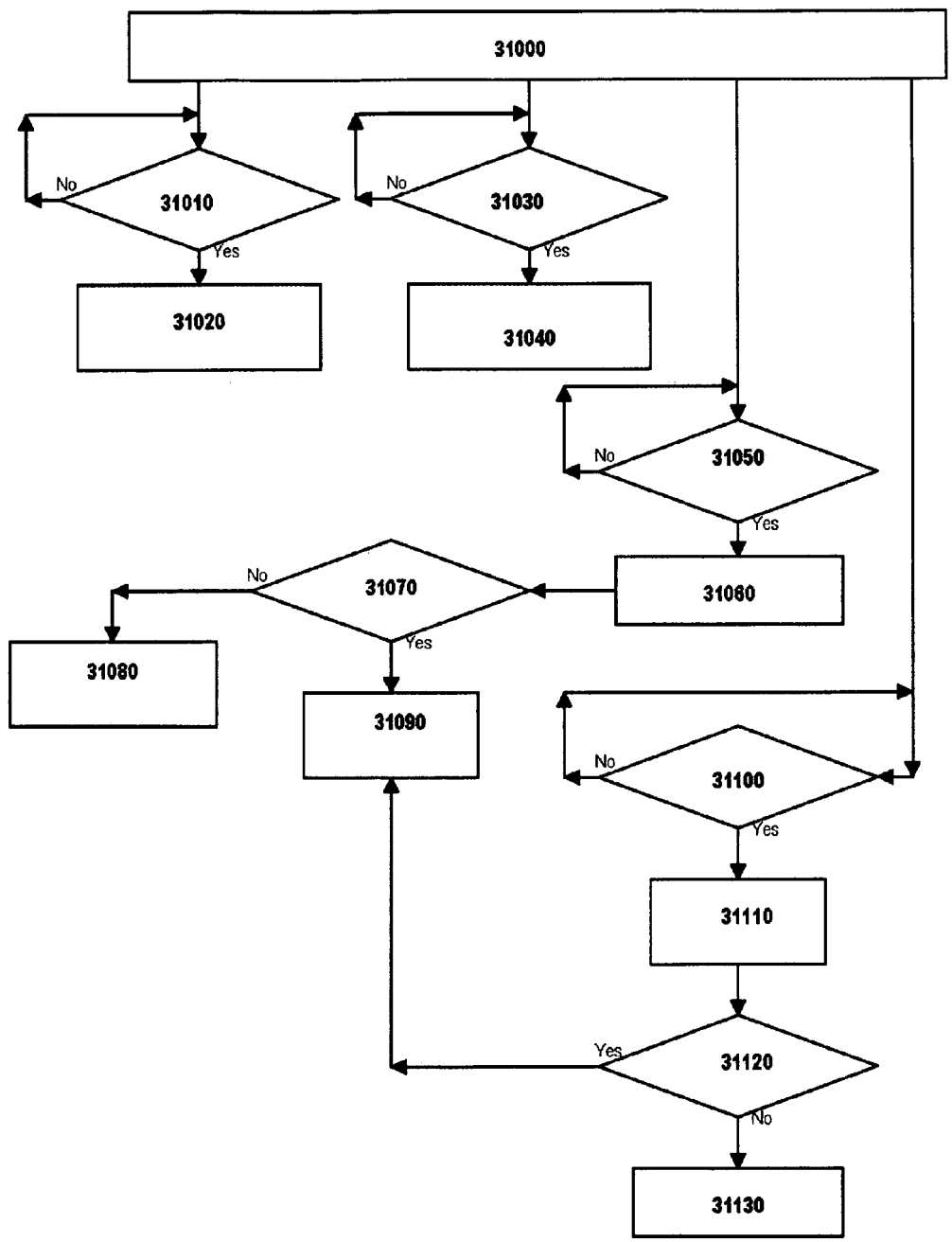

FIG. 68—Illustrate primarily Time-driven System Logic Flow-chart, which could be executed by Controller or Controllers for Object Transactions. Time-driven logic could be implemented by Controller by utilizing available time-based interrupt resources, which could be configured to cause respective interrupts, which in turn could execute respective function, as instructed. This method could be more effective, and could synchronize the entire Process of: gathering real-time Object Behavioral Data; analyzing obtained real time Object Behavioral Data vs. Expected Behavioral Data, and making appropriate decisions; performing other tasks, as needed. FIG. 68 logical Functions are labeled as follows:

Function (31000)—Transaction System is ready to accept an Objector Objects

Function (31010)—Verification if a time-based interrupt to sample status of Scale has occurred, and if it did (30010 YES), then Function (31020) is invoked to obtain and store Data from Scale; otherwise (30010 NO)—return to Function (31010)

Function (31030)—Verification if a time-based interrupt to sample status of OFTS has occurred, and if it did (31010 YES), then Function (31040) is invoked to obtain and store Data from OFTS; otherwise (31010 NO)—return to Function (31030)

Function (31100)—Verification if a time-based interrupt to perform System self-diagnostics has occurred, and if it did (31100 YES), then Function (31110) is invoked to check overall System status; otherwise (31100 NO)—return to Function (31100)

Function (31120)—Verification if System self-diagnostics are within Expected range, and if they are (31120 YES), then Function (31090); otherwise (31120 NO)—invoke Function (31130) to execute respective "Recovery Procedure"

Function (31050)—Verification if a time-based interrupt to perform Object Profiling has occurred, and if it did (31050 YES), then Function (31060) is invoked to analyze Object Profile based on real-time Object Behavioral Data obtained during Transaction; otherwise (31050 NO)—return to Function (31050)

Function (31070)—Verification if real-time Object Behavioral Parameters are within Expected Behavioral Parameters or range of Parameters, and if they are—Function (31090) "Continue Transaction"; otherwise Function (31080)—"Violation Procedure"

Figure 69:
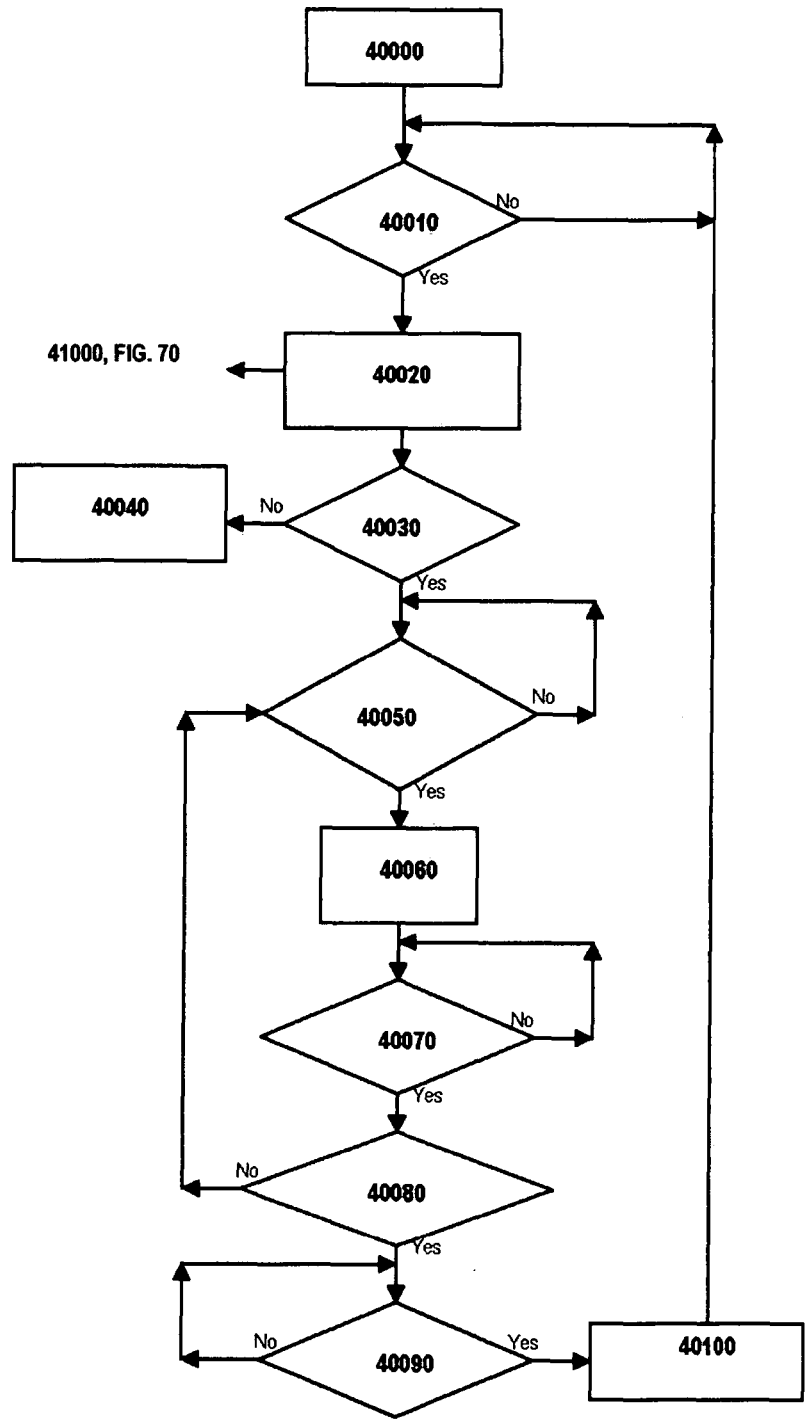
Figure 70:
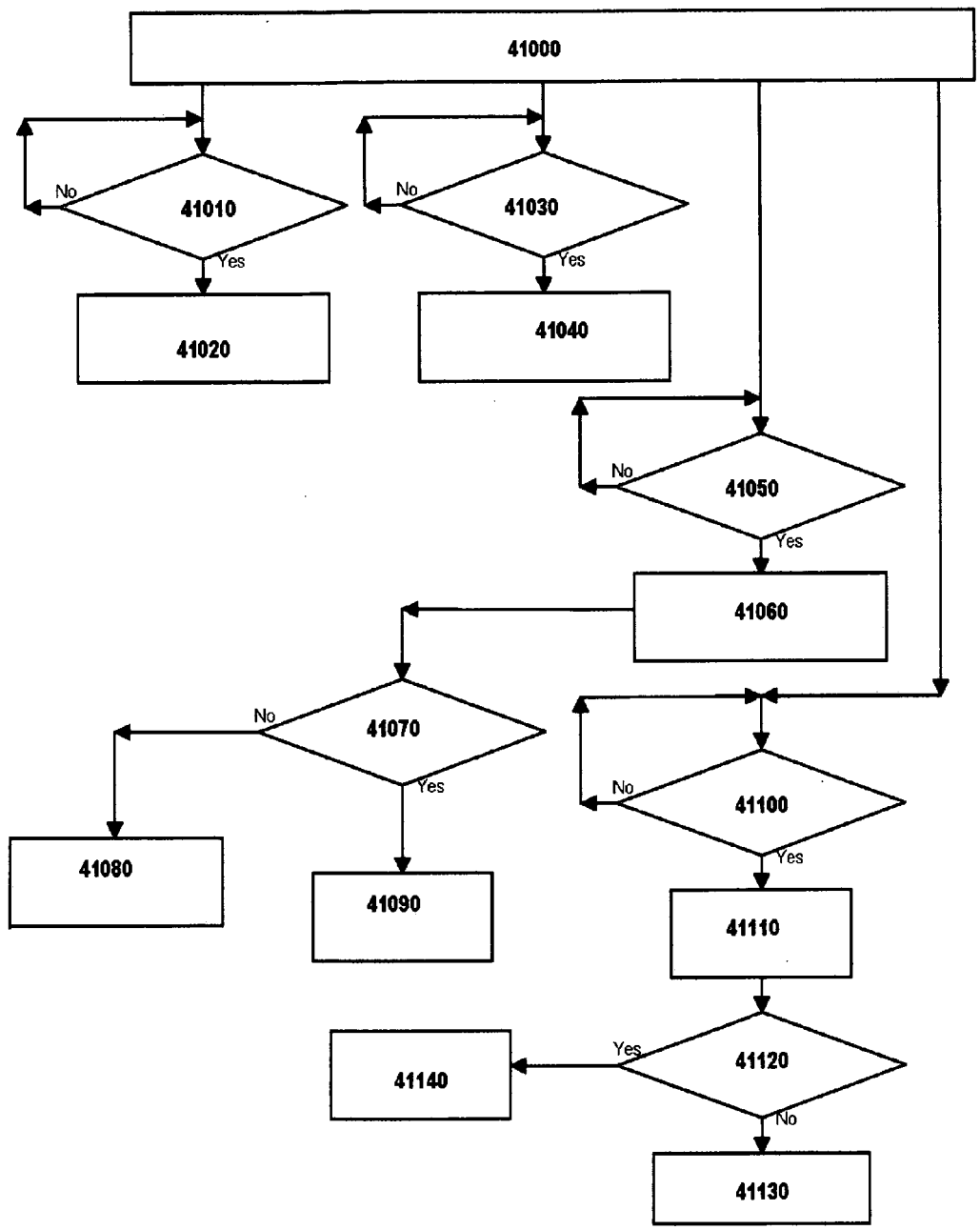

FIGS. 69 and FIG. 70—Illustrate System Logic Flow-chart, which could be executed by Controller or Controllers for Object Processing. For simplicity, the example includes: Processing of one Object out of a group of Objects with one or common set of Object Expected Behavioral Parameters, which could be pre-loaded into Controller's memory once at the start of the Process; the Track of the Processing System is constantly moving at the speed required to conduct respective Processes, and could be stopped as needed, to clear Violation, or execute other functions not covered in this example; Each Process is labeled as "X", to reflect that a multi-Processing System could be implemented using the flow-chart. FIG. 69 logical Functions are labeled as follows:

Function (40000)—Object Processing System is ready to accept an Object or Objects Function (40010)—Verification if an Object is present, and if it is (40010 YES), then Function (40020) is invoked to start respective Time-based interrupts and functions, as shown on FIG. 70; otherwise (40010 NO)—return to Function (40010).

Function (40030)—Verification if detected Objects Behavioral Parameters match the Expected, and if they do not (40030 NO), then invoke respective Function (40040)—"Violation Procedure"; otherwise (40030 NO)—continue with Function (40050)

Function (40050)—Verification if Object has reached the Processing Location #1, and if it did (40050 YES), then invoke respective Function (40060) to execute "Process #1" and continue with Function (40070); otherwise (40050 NO)—return back to (40050)

Function (40070)—Verification if "Process #1" has been completed, and if it has (40070 YES), then continue with Function (40080); otherwise (40070 NO)—return back to (40070)

Function (40080)—Verification if "Object Processing", which could consist of several Processes, has been completed, and if it has (40080 YES), then continue with Function (40090); otherwise (40080 NO)—return back to (40050) to detect if the Object reached the next "Process Location"

Function (40090)—Verification if "Object Exited" or reached the final destination on the Track and was removed, and if it did (40090 YES), then invoke Function (40100) "Object Process Complete Procedure" and return to Function (40010); otherwise (40090 NO)—return back to (40090)

FIG. 70—Illustrate Time-driven System Logic Flow-chart, which could be used by Controller in support of Object Process Transactions, described on FIG. 69. For simplicity, sampling of OFTS includes all required steps in executing selected scanning sequence, to achieve the most effective Object detection for a specific application. FIG. 70 logical Functions are labeled as follows:

Function (41010)—Verification if it is "Time to conduct sampling of Scale Sensors", and if it is (41010 YES), then invoke Function (41020) to "Obtain and store Data from Scale Sensors"; otherwise (41010 NO)—return back to (41010)

Function (41030)—Verification if it is "Time to conduct sampling of OFTS Sensors", and if it is (41030 YES), then invoke Function (41040) to "Obtain and store Data from OFTS Sensors"; otherwise (41030 NO)—return back to (41030)

Function (41050)—Verification if it is "Time to analyze Object's Profile", and if it is (41050 YES)—then invoke Function (41060) to "Analyze Object Profile per Acceptance Algorithm" based on accumulated Data obtained by Functions (41020) and (41040), and then continue with Function (41070); otherwise (41050 NO)—return back to (41050)

Function (41070)—Verification if based on applied Acceptance Algorithm established "Object's Profile has been accepted", and if it is—then Function (41090) "Continue with Processing" of the Object accepted; otherwise—invoke Function (41080) "Object Rejection Procedure"

Function (41100)—Verification if it is "Time to conduct self-diagnostics", and if it is (41100 YES), then invoke Function (41110) to "Perform self-diagnostics", which could include verification of status of various devices of IMTS, including Scale and OFTS when Object is not present, etc.; otherwise (41100 NO)—return back to (41100)

Function (41120)—Verification if "Self-diagnostics" conducted by Function (4110) are within safety limits, and if they are (41120 YES), then invoke Function (41140) to "Report Status to Host Computer", as required; otherwise (41120 NO)—invoke Function (41130) "Recovery Procedure", which could include attempts to correct faulty statuses, which, depending on the nature of problem, could include self-calibration of Scales, OFTS, etc. and if not successful, Controller could report the faulty status to Host Computer, as needed.

Figure 71:
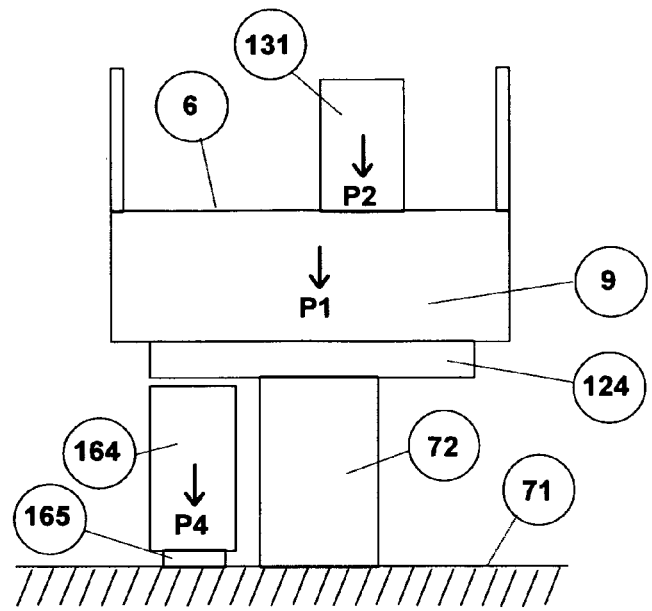
Figure 72:
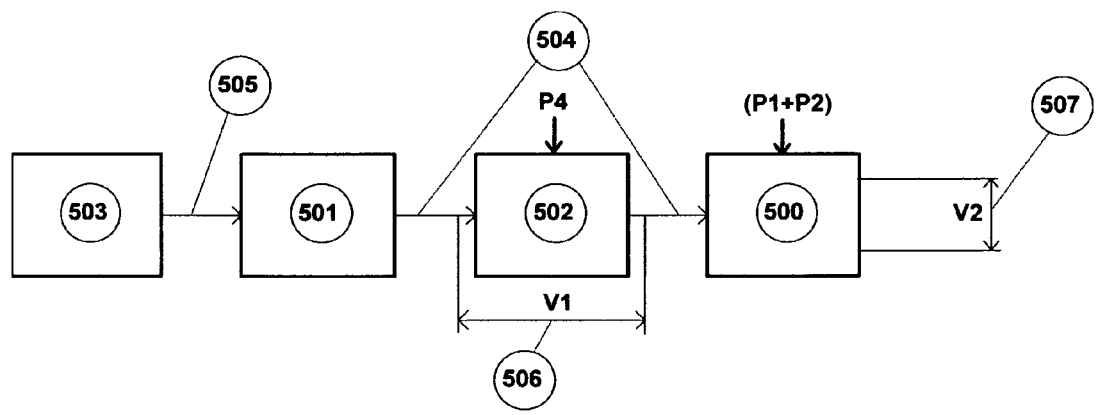
Figure 73:
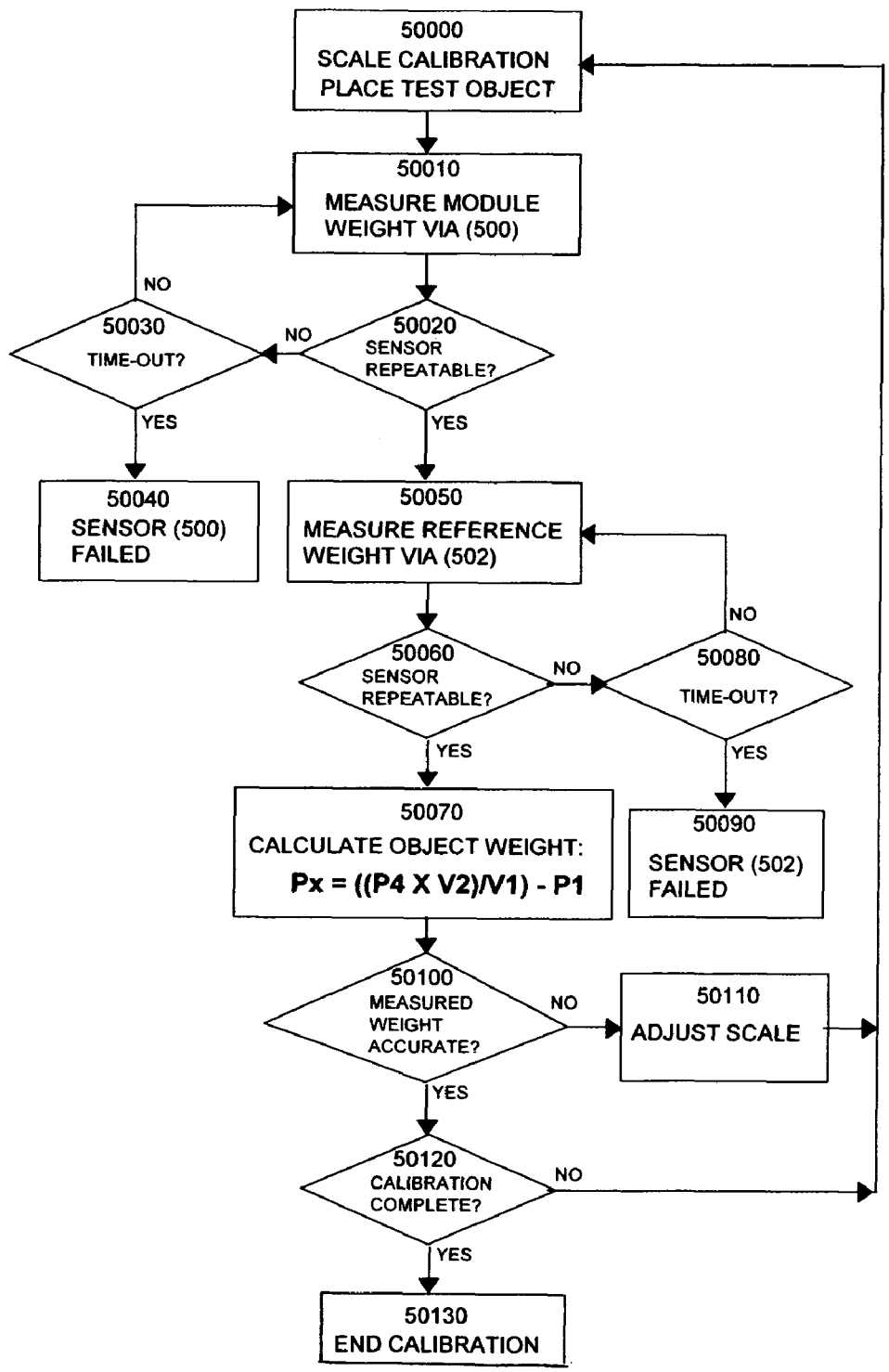

FIG. 71 through FIG. 73—Illustrates an example of an automatic Self-tuning of Scale Module of IMTS, which could be used for maintaining proper Object's Weight measurements during Object Transactions and Processing. In general, OFTS for every Module of an IMTS could be calibrated and self-tuned by conducting number of Test Transactions on Objects with known and stable "X-profiles", which could be properly introduced into the System without causing any unnecessary deviations between Transactions. In general, the following calibration methods of an IMTS could be used:

a) Manual calibration via Test Objects, which could be used during initial calibration and for in-field verification/calibration. Number of Test Objects with known Dynamic and Static Behavioral parameters could be used. Respective Transaction data could be compared to known Expected data, and adjustments to IMTS could take place until the actual data fall within the range of Expected data.

b) Semi-automatic calibration via specially designed Static/Dynamic Test fixtures, which could be used to: apply a known force to designated locations on top of the Entry Module Conveyor, with Objectives to calibrate/verify operation of the Scale; place selected Test Objects on top of the Entry Module Conveyor, with Objectives to calibrate/verify operation of the Entry Module OFTS. This fixture could also be used to verify OFTS operation of other Modules, as needed.

c) Automatic calibration, which could be based on Static/Dynamic Test fixtures modified to allow automatic indexing along X and Y axis.

FIG. 71—Illustrates IMTS configuration of the Entry Module, which could be used to adjust/self-tune measurements of Scale Sensors for proper measurement of Objects "Weight-profile", as needed, to compensate for changing environments, which could otherwise impact the respective measurement. Figure elements are labeled as follows:

6—Top of the Conveyor of Entry Module (9), with Object (131) placed on it

9—Entry Module with Scale (124), Floor Support (72).

124—Scale, which assumed to be initially calibrated, and which is Expected to measure combined weight of the Entry Module (9)—P1 and Object (131)—P2

164—Reference Load with its weight P4 established at specified location, which could be used by Controller, as reference. The weight of this load, as for any Object, will change with its location in regard to altitude/longitude position.

165—Weight Sensor for measuring Reference Load weight P4

FIG. 72—Illustrates block-diagram of the principal, which could be used by Controller, for measuring Objects "Weight-profile" when they are placed on top of the Conveyor of the Entry Module of IMTS.

500—Weight measuring Sensors, such as: strain-gauge, etc., which could be configured per known reliable weight measurement methods, such as: Whetstone Bridge, etc., and which could be used for measuring the combined weight of the Entry Module (9)—P1 and Object(s) placed on top of its Conveyor, Object (131) with its weight P2 shown in this example.

502—Weight measuring Sensors, such as: strain-gauge, etc., which could be configured per known reliable weight measurement methods, such as: Whetstone Bridge, etc., and which could be used for measuring the weight of Reference Load (502)

503—Power source, which could provide sufficient amounts of Voltage and Current for respective weight-measuring Sensors (502) and (500)

501—Current regulator, which could sustain required constant Current (504) through weight measuring Sensors (502) and (500)

506—Voltage V1, generated by Sensor (502), which could represent the respective measured value of the weight of the Reference Load (164)

507—Voltage V2, generated by Sensor (500), which could represent the respective measured value of the combined weight of the Entry Module (9) and Object (131) placed on top of the Entry Module Conveyor FIG. 73—Illustrate Logic Flow-chart, which could be used by Controller to calibrate, or verify calibration of a Scale component of an Entry Module, described on FIG. 71 and FIG. 72. For simplicity:

a) The Scale Sensor (165) for Reference Load (164) has been calibrated b) The Entry Module's Static Weight without any Objects placed on its Track (P1) and Static Weight of the Reference Load (P4) have been established by Controller via respective Scale Sensors.

c) All weight measurements could include Dynamic and Static measurements of Data from respective Scale Sensors, as needed d) Selected Test Objects were profiled in terms of their Expected Dynamic and Static "W-profiles" at a calibrated IMTS, or generated by respective CAD models e) The Track of the Entry Module could be turned ON or OFF by Controller, as needed to conduct respective measurements FIG. 73 logical Functions are labeled as follows:

Function (50000)—Entry Module is ready for Calibration of its Scale Sensors. Selected Test Object with previously established Dynamic and Static "W-profiles" could be placed on the Track of the Entry Module with a purpose to verify a specific operation of Scale Sensors in their ability to properly detect Dynamic and Static "W-profiles" of the Test Object.

Function (50010)—Controller to measure Dynamic and Static "W-profile" of Entry Module with the Test Object on top of its Track, which could be obtained from respective Scale Sensors (500), FIG. 72

Function (50020)—Verification if Data obtained from Scale Sensors (500) is stable within pre-defined range, and if it is (50020 YES), then invoke Function (50050) to "Measure Reference Weight" via Scale Sensors (502); otherwise (50020 NO)—invoke Function (50030) to verify if the Time limit set for the respective Scale Sensor (500) to stabilize its signal has expired Function (50030)—Verification if the Time limit set for Scale Sensor (500) to stabilize its signal has expired, and if it did (50030 YES), then invoke Function (50040) "Sensor (500) Failed", which could require manual verification of mechanics and/or electronics associated with respective Sensors (500); otherwise—return to Function (50010)

Function (50050)—Controller to measure Dynamic and Static "W-profile" of Reference Weight (P4), which could be obtained from respective Scale Sensors (502), FIG. 72

Function (50060)—Verification if Data obtained from Scale Sensors (502) is stable within pre-defined range, and if it is (50060 YES), then invoke Function (50070) to "Calculate Test Object's Weight", which could be done via formula Px=((P4*V2)/V1)−P1, where V1, V2 respective Voltages described for FIG. 72; otherwise (50060 NO)—invoke Function (50080) to verify if the Time limit set for the respective Scale Sensor (502) to stabilize its signal has expired Function (50080)—Verification if the Time limit set for Scale Sensor (502) to stabilize its signal has expired, and if it did (50080 YES), then invoke Function (50090) "Sensor (502) Failed", which could require manual verification of mechanics and/or electronics associated with respective Sensors (502); otherwise—return to Function (50050)

Function (50100)—Verification if measured/calculated Dynamic and Static "W-profile" of the Test Object are within set accuracy range from the Expected Dynamic and Static "W-profile", and if they are (50100 YES), then invoke Function (50120) to verify if "Calibration is complete"; otherwise (50100 NO)—invoke Function (50110) "Adjust Scales" to perform necessary adjustments of respective Scales to achieve required performance, which could include: accuracy, repeatability, etc., and then return back to Function (50000) to continue Calibration steps Function (50120)—Verification if Calibration is complete, which could be based on required number of Transactions of selected Test Objects, and if it is (50120 YES), then invoke Function (50130) to "End Calibration"; otherwise (50120 NO)—return back to Function (50000) to continue Calibration steps

I claim:

1. An apparatus comprising: at least four discrete sensors, at least one controller, at least one non-volatile memory device for storing and retrieving data, wherein the discrete sensors placed along at least one transport track or at least one path, wherein discrete sensors are connected to controller, wherein at least one controller is connected and will have access to at least one non-volatile memory for storing and retrieving data, wherein controller will activate and monitor the discrete sensors and based on sensor status the controller will calculate a real-time profile of a moving object along the track or path, wherein controller will activate and monitor the discrete sensors and based on sensor status the controller will calculate a real-time profile of the traffic created by moving objects along the track or path, wherein controller will analyze real-time object profiles and calculate acceptable range of object profiles, wherein controller will analyze real-time traffic profiles and calculate acceptable range of traffic profiles, wherein controller will store acceptable range of object profiles and acceptable range of traffic profiles in at least one non-volatile memory, wherein controller in real-time will compare the real-time object profile to respective acceptable range of object profiles stored in non-volatile memory, and based on results of the comparison the controller will, without intervention by an operator, execute real-time controls directly affecting moving object based on whether a moving object is recognized and accepted by controller, or rejected by controller with an objective to prevent rejected object from being processed, wherein controller in real-time will compare the real-time traffic profile to respective acceptable range of traffic profiles stored in non-volatile memory, and based on results of the comparison the controller will, without intervention by an operator, execute real-time controls directly affecting traffic based on whether a traffic condition is recognized and accepted by controller, or rejected by controller with an objective to prevent rejected traffic condition from being processed, wherein the major components of the apparatus including controller, sensors, non-volatile memory are interconnected as a real-time closed-loop system, and the system will directly and automatically control motion of an object and objects within a traffic without intervention by an operator.

2. Discrete sensors of claim 1, wherein the sensors could be of optical type, with emitting portion of the sensor located on one side of the track, and receiving portion of the sensor located on the opposite side across the track.

3. Discrete sensors of claim 1, wherein the sensors could be stacked perpendicular to the track, and used by controller to calculate a vertical profile of an object moving along the track and to calculate a vertical profile of a traffic created by moving objects along the track.

4. Discrete sensors of claim 1, wherein the sensors could be spaced along the track, and used by controller to calculate a horizontal profile of an object moving along the track and to calculate a horizontal profile of a traffic created by moving objects along the track.

5. Discrete sensors of claim 1, wherein the sensors are connected to a controller, and the controller will in real-time control and monitor status of the sensors, and the controller in real-time will analyze status of the sensors.

6. Transport track of claim 1, wherein the track could be a conveyor, which could advance objects along the track.

7. Transport track of claim 1, wherein the track could be a surface a road, a water path, a conveyor, and the track could be used for transporting objects, cars, boats, grocery items to advance objects along the track.

8. Controller of claim 1, wherein the controller will utilize information obtained from the discrete sensors, and based on information the controller will calculate vertical and horizontal profiles of an object moving along the track, and based on information the controller will calculate vertical and horizontal profiles of a traffic created by moving objects along the track, and the controller will record and store these profiles into non-volatile memory.

9. Controller of claim 8, wherein the controller will analyze the vertical and the horizontal profiles of an object, and the controller will calculate an acceptable range of object profiles, and the controller will store the acceptable range of object profiles into non-volatile memory.

10. Controller of claim 8, wherein the controller will analyze the vertical and the horizontal profiles of a traffic created by a number of moving objects, and the controller will calculate a range of acceptable traffic profiles, and the controller will store the acceptable range of traffic profiles into non-volatile memory.

11. Controller of claim 8, wherein the controller will compare the real-time vertical and real-time horizontal profiles calculated for an object moving along the track with respective acceptable range of horizontal and vertical object profiles stored in the non-volatile memory, and the controller directly, without operator assistance, will execute real-time controls to affect the motion of the moving object, depending on whether the moving object is recognized and accepted, or rejected by the controller.

12. Controller of claim 8, wherein the controller will compare the real-time vertical and real-time horizontal profiles calculated for a traffic of moving objects along the track with respective acceptable range of vertical and horizontal traffic profiles stored in the non-volatile memory, and the controller directly, without operator assistance, will execute real-time controls to affect the motion of the traffic, depending on whether the real-time traffic is recognized and accepted, or rejected by the controller.

13. Controller of claim 8, wherein the controller, sensors, non-volatile memory are interconnected as a real-time closed loop control system, and the control system directly, without operator assistance, will execute real-time controls to direct, start or stop, accelerate or decelerate motion of an object and objects within a traffic of moving objects along a track to avoid state of rejection for a moving objects and for a moving traffic.

* * * * *